US012131552B2

(12) United States Patent
Hirata et al.

(10) Patent No.: US 12,131,552 B2
(45) Date of Patent: Oct. 29, 2024

(54) IMAGING SYSTEM, METHOD FOR CONTROLLING IMAGING SYSTEM, AND OBJECT RECOGNITION SYSTEM

(71) Applicant: SONY GROUP CORPORATION, Tokyo (JP)

(72) Inventors: Ayaka Hirata, Tokyo (JP); Kei Nakagawa, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 373 days.

(21) Appl. No.: 17/593,355

(22) PCT Filed: Mar. 17, 2020

(86) PCT No.: PCT/JP2020/011707
§ 371 (c)(1),
(2) Date: Sep. 16, 2021

(87) PCT Pub. No.: WO2020/196092
PCT Pub. Date: Oct. 1, 2020

(65) Prior Publication Data
US 2022/0172488 A1 Jun. 2, 2022

(30) Foreign Application Priority Data
Mar. 27, 2019 (JP) ................. 2019-059697

(51) Int. Cl.
*G06V 20/58* (2022.01)
*G01W 1/10* (2006.01)
*G06V 10/28* (2022.01)
(52) U.S. Cl.
CPC ............... *G06V 20/58* (2022.01); *G01W 1/10* (2013.01); *G06V 10/28* (2022.01)

(58) Field of Classification Search
CPC ........ G06V 20/58; G06V 10/28; G06V 20/44; G01W 1/10; H04N 25/74; H04N 25/75;
(Continued)

(56) References Cited

U.S. PATENT DOCUMENTS

2013/0085642 A1    4/2013  Dankers
2018/0060675 A1*   3/2018  Ji ........................... H04N 23/75
2020/0050869 A1*   2/2020  Aoyama ............. G06F 18/2433

FOREIGN PATENT DOCUMENTS

CN    107797549 A    3/2018
CN    110546945 A    12/2019
(Continued)

OTHER PUBLICATIONS

International Search Report and Written Opinion of PCT Application No. PCT/JP2020/011707, issued on Jun. 9, 2020, 10 pages of ISRWO.

*Primary Examiner* — Matthew C Bella
*Assistant Examiner* — Janice E. Vaz
(74) *Attorney, Agent, or Firm* — CHIP LAW GROUP

(57) ABSTRACT

An imaging system of the present disclosure includes: an event detection device that detects an event; and a controller that controls the event detection device. The controller then controls the detection sensitivity of event detection being performed by the event detection device, on the basis of external information. Further, an object recognition system of the present disclosure includes: an event detection device that detects an event; a controller that controls the detection sensitivity of event detection being performed by the event detection device, on the basis of external information; and a recognition processing unit that performs object recognition in an event, on the basis of an event signal output from the event detection device.

13 Claims, 29 Drawing Sheets

(58) Field of Classification Search
CPC .......... H04N 23/00; H04N 25/50; H03F 3/08; H03F 3/085; H03F 1/22; H03F 3/005; H03G 3/3084; H03H 19/004
See application file for complete search history.

(56) References Cited

FOREIGN PATENT DOCUMENTS

| | | | |
|---|---|---|---|
| EP | 2574511 A1 | 4/2013 | |
| EP | 3291134 A1 | 3/2018 | |
| JP | 2006279464 A | * 10/2006 | |
| JP | 2013-079937 A | 5/2013 | |
| JP | 2018-037061 A | 3/2018 | |
| JP | 2018186478 A | * 11/2018 | .............. H03M 1/56 |
| KR | 10-2018-0025591 A | 3/2018 | |

* cited by examiner

TO ANALOG-DIGITAL CONVERSION UNIT

IMAGING SYSTEM, METHOD FOR CONTROLLING IMAGING SYSTEM, AND OBJECT RECOGNITION SYSTEM

CROSS REFERENCE TO RELATED APPLICATIONS

This application is a U.S. National Phase of International Patent Application No. PCT/JP2020/011707 filed on Mar. 17, 2020, which claims priority benefit of Japanese Patent Application No. JP 2019-059697 filed in the Japan Patent Office on Mar. 27, 2019. Each of the above-referenced applications is hereby incorporated herein by reference in its entirety.

TECHNICAL FIELD

The present disclosure relates to an imaging system, a method for controlling the imaging system, and an object recognition system.

BACKGROUND ART

Examples of event-driven imaging devices include an asynchronous imaging device called a dynamic vision sensor (DVS). An asynchronous imaging device can detect an event that a change in the luminance of a pixel that photoelectrically converts incident light exceeds a predetermined threshold. Accordingly, this type of asynchronous imaging device can also be referred to as an event detection device. Conventionally, an event detection device has been used as an event-based visual sensor that is mounted on a vehicle and monitors the road surface on which the vehicle is traveling (see Patent Document 1, for example).

CITATION LIST

Patent Document

Patent Document 1: Japanese Patent Application Laid-Open No. 2013-79937

SUMMARY OF THE INVENTION

Problems to be Solved by the Invention

Meanwhile, in a case where an event detection device is mounted on a mobile unit such as a vehicle, appearance of a large number of water droplets or the like might be detected as an event in bad weather such as rain or snow. The event such as the water droplets detected at this time might then become noise in the object (a vehicle, a pedestrian, or the like) originally intended to be detected as an event by the event detection device, and there is a possibility that this will cause a decrease in the accuracy of object recognition.

The present disclosure aims to provide an imaging system capable of accurately recognizing an object in an event without being affected by bad weather such as rain or snow, a method for controlling the imaging system, and an object recognition system using the imaging system.

Solutions to Problems

An imaging system of the present disclosure for achieving the above object includes:
an event detection device that detects an event; and
a controller that controls the event detection device.

The controller then controls the detection sensitivity of event detection being performed by the event detection device, on the basis of external information.

Further, a method for controlling an imaging system of the present disclosure for achieving the above object is a method for controlling an imaging system including an event detection device that detects an event,
the method including
controlling the detection sensitivity of event detection being performed by the event detection device, on the basis of external information.

Further, an object recognition system of the present disclosure for achieving the above object includes:
an event detection device that detects an event;
a controller that controls the detection sensitivity of event detection being performed by the event detection device, on the basis of external information; and
a recognition processing unit that performs object recognition within the angle of view of the event detection device, on the basis of an event signal output from the event detection device.

MODES FOR CARRYING OUT THE INVENTION

Figure 1:
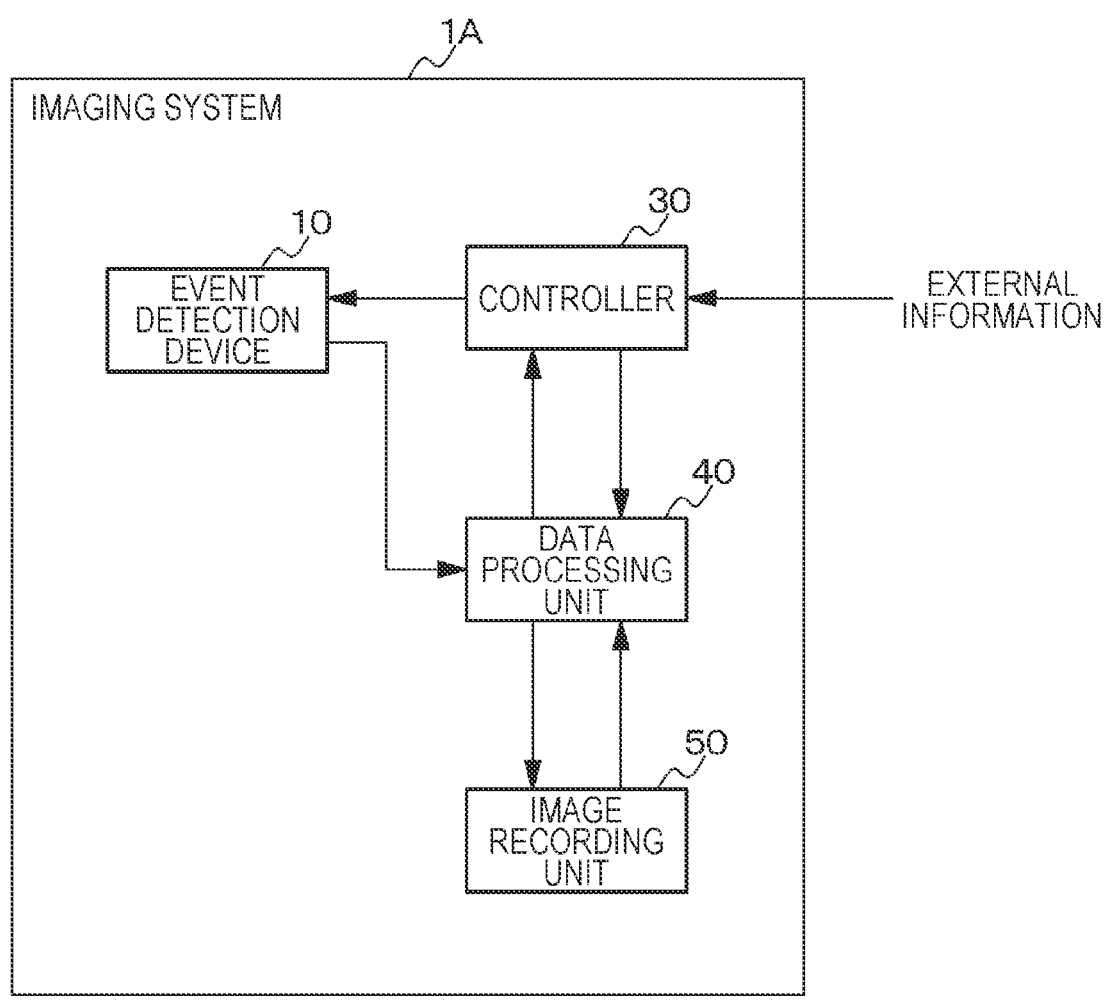
FIG. 1 is a block diagram showing an example system configuration of an imaging system according to a first embodiment of the present disclosure.

The following is a detailed description of modes for carrying out the technology according to the present disclosure (the modes will be hereinafter referred to as "embodiments"), with reference to the accompanying drawings. The technology according to the present disclosure is not limited to the embodiments. In the description below, like components or components having like functions are denoted by like reference numerals, and explanation of them will not be made more than once. Note that explanation will be made in the following order.

1. General description of an imaging system and an object recognition system of the present disclosure
2. First embodiment of the present disclosure
2-1. Example configuration of an imaging system according to the first embodiment
2-2. Example configuration of an event detection device
2-2-1. Example configuration of a pixel array unit
2-2-2. Example configuration of a pixel
2-2-3. Example configuration of an event detection unit
2-2-3-1. Example configuration of a current-voltage conversion unit
2-2-3-2. Example configuration of a subtraction unit and a quantization unit
2-2-4. Example configuration of a chip structure
2-2-5. Example 1 (an example in which the event detection threshold is controlled on the basis of a measurement value of a rain gauge)
2-2-6. Example 2 (an example in which the event detection threshold is controlled with the use of a measurement value of a rain gauge and noise information)
2-3. Example configuration of an object recognition system according to the first embodiment
2-3-1. Example 3 (an example in which an object recognition result is reflected by the event detection threshold)
3. Second embodiment of the present disclosure
3-1. Example configuration of an imaging system according to the second embodiment
3-2. Example configuration of an imaging device
3-2-1. Example configuration of a CMOS image sensor
3-2-2. Example configuration of a pixel
3-2-3. Example configuration of a chip structure
3-2-3-1. Flat chip structure (a so-called flat structure)
3-2-3-2. Stacked chip structure (a so-called stack structure)
3-3. Example configuration of an object recognition system according to the second embodiment
3-3-1. Example 4 (an example in which an object recognition result is reflected by the event detection threshold)
3-3-2. Example 5 (an example in which the event detection threshold is controlled with the use of a measurement value of a rain gauge and noise information)
3-3-3. Example 6 (an example in which an object recognition process is performed twice before and after control of the event detection threshold)
3-3-4. Example 7 (an example in which the event detection threshold is controlled region by region)
4. Modifications
5. Example applications of the technology according to the present disclosure
5-1. Example applications to mobile units
6. Configurations embodying the present disclosure General Description of an Imaging System and an Object Recognition System of the Present Disclosure In an imaging system and an object recognition system of the present disclosure, an event detection device may have a configuration that includes an event detection unit that detects, as an event, that a change in the luminance of a pixel that photoelectrically converts incident light exceeds a detection threshold. Further, the imaging system of the present disclosure is preferably mounted on a mobile unit.

Furthermore, in the imaging system and the object recognition system of the present disclosure including the preferable configuration described above, the controller can be designed to control the detection threshold for the event detection unit on the basis of external information. Specifically, when the external information is information indicating bad weather, the controller can perform control to raise the detection threshold for the event detection unit. When receiving external information indicating that the weather has recovered after raising the detection threshold for the event detection unit, the controller can also perform control to lower the detection threshold for the event detection unit or return the detection threshold for the event detection unit to the initial setting value.

Further, in the imaging system and the object recognition system of the present disclosure including the preferable configuration described above, the event detection unit may have a configuration including a current-voltage conversion unit that converts the photocurrent of a pixel into a voltage corresponding to the photocurrent, and the current-voltage conversion unit can switch between a circuit configuration in which transistors are cascade-connected and a circuit configuration in which the transistors are not cascade-connected. In this case, the controller can control the detection threshold for the event detection unit, by switching the circuit configuration of the current-voltage conversion unit on the basis of external information.

Also, in the imaging system and the object recognition system of the present disclosure including the preferable configuration described above, the event detection unit may have a configuration including a subtraction unit that includes a first capacitive element and a second capacitive element, and calculates a difference signal of a voltage between different timings, the voltage corresponding to the photocurrent of a pixel. In this case, the controller can control the detection threshold for the event detection unit, by changing the capacitance ratio between the first capacitive element and the second capacitive element of the subtraction unit, on the basis of external information.

Also, in the imaging system and the object recognition system of the present disclosure including the preferable configuration described above, the event detection unit may have a configuration including a quantization unit that quantizes the difference signal from the subtraction unit into a digital signal, by comparing the difference signal with a threshold voltage. In this case, the controller can control the detection threshold for the event detection unit, by adjusting the threshold voltage of the quantization unit on the basis of external information.

Further, in the imaging system and the object recognition system of the present disclosure including the preferable configuration described above, the controller can control the detection sensitivity of event detection, on the basis of external information and the number of events detected by the event detection device.

Also, in the object recognition system of the present disclosure, the controller can perform control to raise the detection threshold for the event detection unit to a value within the range in which an object within the angle of view of the event detection device can be recognized, and a recognition processing unit can recognize the object when the area that can be detected as the object within the angle of view is equal to or larger than a predetermined threshold.

Further, the object recognition system of the present disclosure including the preferable configuration described above can include a synchronous imaging device that performs imaging at a fixed frame rate.

Further, in the object recognition system of the present disclosure including the preferable configuration described above, the recognition processing unit can detect an object using information from the imaging device when the event detection device cannot detect the object, and recognize the object when the area that can be detected as the object within the angle of view is equal to or larger than the predetermined threshold. Also, the recognition processing unit can determine that the recognition has been successfully completed when the region of the object with respect to the angle of view is equal to or larger than a certain proportion, and determine that the recognition has failed when the region of the object with respect to the angle of view is smaller than the certain proportion.

Further, in the object recognition system of the present disclosure including the preferable configuration described above, the controller can perform control to raise the detection threshold for the event detection unit, when the external information is information indicating bad weather, and the number of events detected by the event detection device is equal to or larger than a predetermined threshold. Further, after the controller raises the detection threshold for the event detection unit, when a result of recognition performed by the recognition processing unit indicates a success, and the controller receives external information indicating that the weather has recovered, the controller can perform control to lower the detection threshold for the event detection unit or return the detection threshold for the event detection unit to the initial setting value.

Also, in the object recognition system of the present disclosure including the preferable configuration described above, when the external information is information indicating bad weather, and a result of recognition performed by the recognition processing unit indicates a failure, the controller can perform control to raise the detection threshold for the event detection unit. Further, after the controller raises the detection threshold for the event detection unit, when a result of recognition performed by the recognition processing unit indicates a success, and the controller receives external information indicating that the weather has recovered, the controller can perform control to lower the detection threshold for the event detection unit or return the detection threshold for the event detection unit to the initial setting value.

First Embodiment of the Present Disclosure

Example Configuration of an Imaging System According to the First Embodiment

FIG. 1 is a block diagram showing an example system configuration of an imaging system according to a first embodiment of the present disclosure.

As shown in FIG. 1, an imaging system 1A according to the first embodiment includes an event detection device 10, a controller 30, a data processing unit 40, and an image recording unit 50. The imaging system 1A according to the first embodiment can be mounted on a mobile unit such as a vehicle, and be used.

In a case where the imaging system 1A is mounted on a vehicle and is used, for example, the imaging system 1A is disposed and is used at one or more predetermined positions of the vehicle, such as the front end edge of the vehicle, a side mirror, the rear bumper, a rear door, or an upper portion of the front windshield inside the vehicle. Example applications of the technology according to the present disclosure (which is the imaging system 1A according to the first embodiment) will be described later in detail.

As the event detection device 10, an asynchronous imaging device called DVS that detects an event that a change in the luminance of a pixel that photoelectrically converts incident light exceeds a predetermined detection threshold can be used. An asynchronous imaging device is an imaging device that detects an event asynchronously with a vertical synchronization signal, as opposed to a synchronous imaging device that performs imaging in synchronization with a vertical synchronization signal. The event detection device 10 formed with an asynchronous imaging device will be described later in detail.

The controller 30 is formed with a processor (CPU), for example, and controls detection sensitivity of event detection being performed by the event detection device 10, on the basis of external information supplied from the outside. Examples of the external information supplied from the outside include information about an environment sensor for acquiring information regarding the present weather such as rain, snow, and hail.

The environment sensor may be formed with at least one of the following sensors: a rain gauge that measures an amount of rain, a raindrop sensor that detects rain, a fog sensor that detects a fog, a solar radiation sensor that detects a degree of solar radiation, or a snow sensor that detects a snowfall, for example. The environment sensor is disposed at one or more of the following positions: the front end edge of the vehicle, a side mirror, the rear bumper, a rear door, or an upper portion of the front windshield inside the vehicle, for example.

Here, the information about the environment sensor described above has been described as an example of the external information supplied to the controller 30, but the information is not necessarily the information about the environment sensor. In addition to the information about the environment sensor, the external information may include information regarding presence/absence of an operation of the windshield wipers, weather information that can be acquired through the Internet or a global positioning system (GPS), or the like.

Under the control of the controller 30, the data processing unit 40 performs predetermined data processing on an event signal (event data) that is output from the event detection device 10 and indicates the occurrence of an event. Through this data processing unit 40, the controller 30 can recognize that the event detection device 10 has detected an event. The image recording unit 50 records image data processed by the data processing unit 40.

Example Configuration of the Event Detection Device

Figure 2:
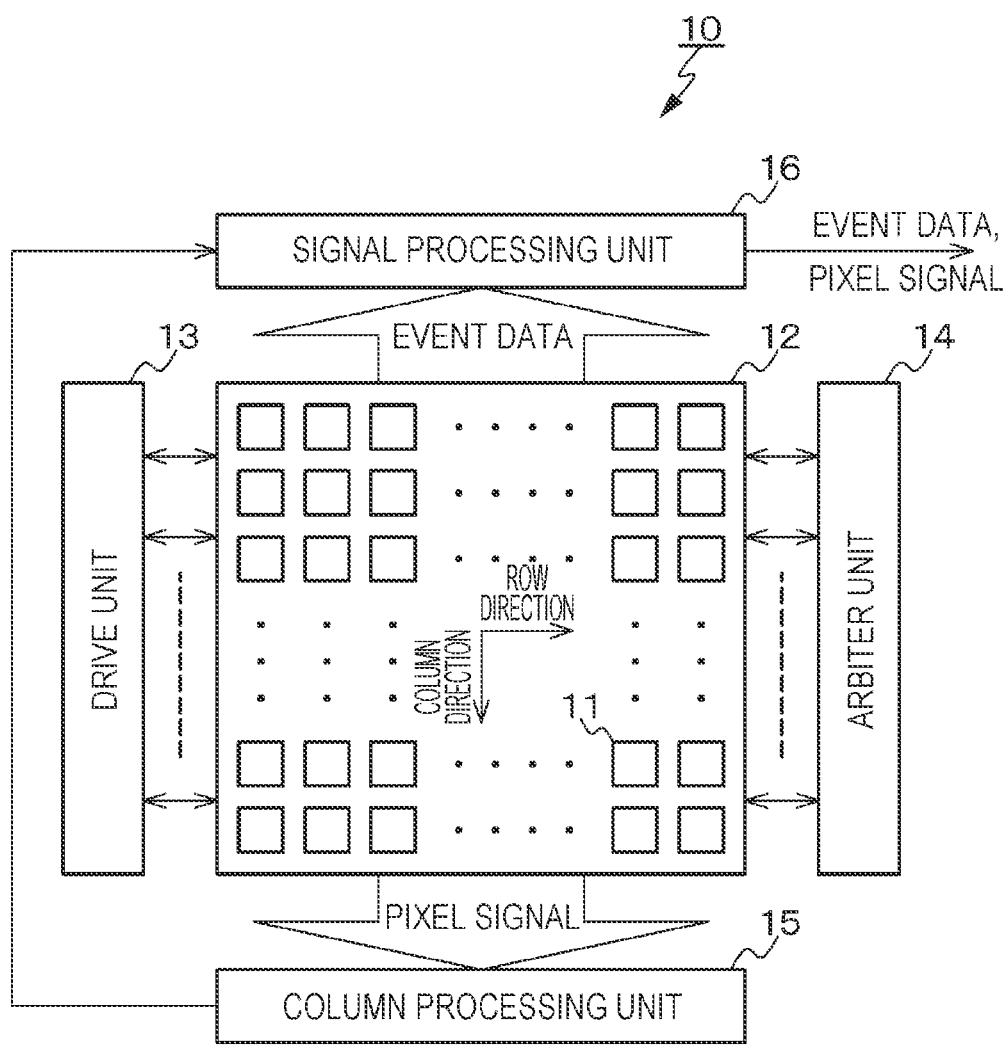
FIG. 2 is a block diagram showing an example configuration of an event detection device in the imaging system according to the first embodiment.

FIG. 2 is a block diagram showing an example configuration of the event detection device 10 in the imaging system 1A according to the first embodiment having the configuration described above.

As shown in FIG. 2, the event detection device 10 includes a pixel array unit 12 in which a plurality of pixels 11 is two-dimensionally arranged in a matrix (array). Each of the plurality of pixels 11 generates, as a pixel signal, an analog signal of a voltage corresponding to a photocurrent as an electric signal generated by photoelectric conversion. Further, each of the plurality of pixels 11 detects the presence/absence of an event, depending on whether or not a change exceeding a predetermined detection threshold has occurred in the photocurrent corresponding to the luminance of incident light. In other words, each of the plurality of pixels 11 detects an event that a change in luminance exceeds a predetermined threshold.

In addition to the plurality of pixel array unit 12, the event detection device 10 includes a drive unit 13, an arbiter unit (arbitration unit) 14, a column processing unit 15, and a signal processing unit 16, as a peripheral circuit unit of the pixel array unit 12.

When having detected an event, each of the plurality of pixels 11 outputs a request for requesting an output of event data indicating the occurrence of the event, to the arbiter unit 14. In a case where each of the plurality of pixels 11 has received, from the arbiter unit 14, a response indicating permission for an output of event data, the event data is then output to the drive unit 13 and the signal processing unit 16. Further, a pixel 11 that has detected an event outputs an analog pixel signal generated by photoelectric conversion, to the column processing unit 15.

The drive unit 13 drives each pixel 11 of the pixel array unit 12. For example, the drive unit 13 detects an event, drives the pixel 11 that has output the event data, and outputs an analog pixel signal of the pixel 11 to the column processing unit 15.

The arbiter unit 14 arbitrates a request for requesting an output of event data supplied from each of the plurality of pixels 11, and transmits, to the pixels 11, a response based on a result of the arbitration (permission/non-permission of an output of event data) and a reset signal for resetting event detection.

The column processing unit 15 includes an analog-digital conversion unit formed with a set of analog-digital converters provided for the respective pixel columns of the pixel array unit 12, for example. The analog-digital converters can be single-slope analog-digital converters, for example.

For each pixel column of the pixel array unit 12, the column processing unit 15 performs a process of converting analog pixel signals output from the pixels 11 in the column into digital signals. The column processing unit 15 can also perform a correlated double sampling (CDS) process on digitized pixel signals.

The signal processing unit 16 performs predetermined signal processing on digitized pixel signals supplied from the column processing unit 15 and the event data output from the pixel array unit 12, and outputs the event data and the pixel signals subjected to the signal processing.

As described above, a change in a photocurrent generated in a pixel 11 can also be regarded as a change (luminance change) in the amount of light entering the pixel 11. Accordingly, an event can also be regarded as a light amount change (luminance change) in the pixel 11 exceeding a predetermined threshold. Event data indicating the occurrence of an event includes at least location information such as the coordinates indicating the position of the pixel 11 in which a light amount change as an event has occurred. The event data can also include the polarity of the light amount change, in addition to the location information.

As for a series of event data output at the timing when an event has occurred at a pixel 11, the event data can implicitly include time information indicating the relative time at which the event occurred, as long as the intervals between the pieces of the event data are maintained as they were at the time of the event occurrence. However, when the intervals between the pieces of event data are no longer maintained as they were at the time of the event occurrence due to the storage of the event data in a memory or the like, the time information implicitly included in the event data will be lost. Therefore, the signal processing unit 16 incorporates the time information indicating the relative time at which the event occurred, such as a time stamp, into the event data, before the intervals between the pieces of the event data are no longer maintained as they were at the time of the event occurrence.

Example Configuration of the Pixel Array Unit

Figure 3:
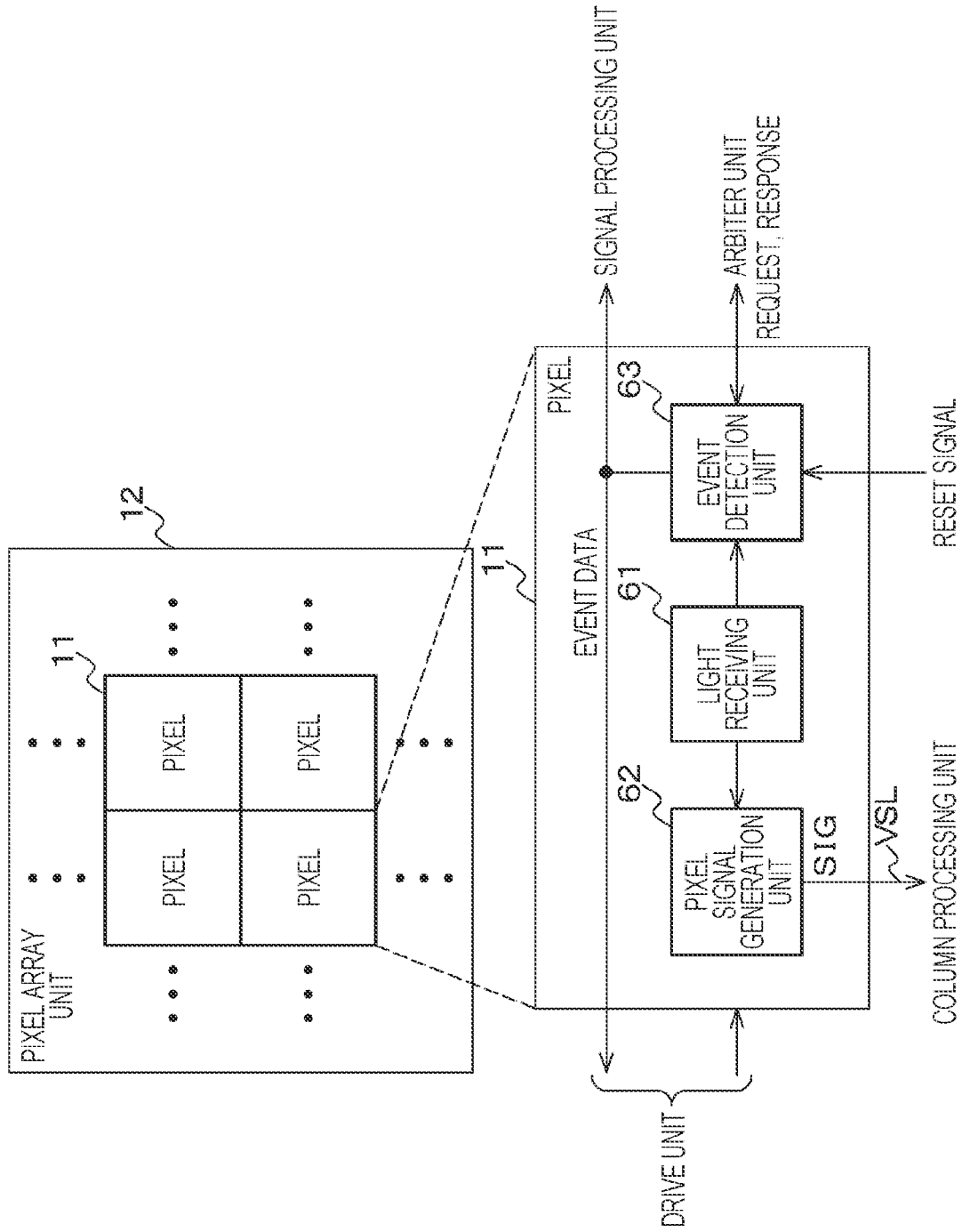
FIG. 3 is a block diagram showing an example configuration of a pixel array unit in the event detection device.

FIG. 3 is a block diagram showing an example configuration of the pixel array unit 12 in the event detection device 10.

In the pixel array unit 12 in which the plurality of pixels 11 is two-dimensionally arranged in a matrix, each of the plurality of pixels 11 includes a light receiving unit 61, a pixel signal generation unit 62, and an event detection unit 63.

In a pixel 11 having the above configuration, the light receiving unit 61 photoelectrically converts incident light, to generate a photocurrent. Under the control of the drive unit 13 (see FIG. 2), the light receiving unit 61 then supplies a signal of the voltage corresponding to the photocurrent generated by photoelectrically converting the incident light, to either the pixel signal generation unit 32 or the event detection unit 63.

The pixel signal generation unit 62 generates the signal of the voltage corresponding to the photocurrent supplied from the light receiving unit 61, as an analog pixel signal SIG. The pixel signal generation unit 62 then supplies the generated analog pixel signal SIG to the column processing unit 15 (see FIG. 2) via a vertical signal line VSL provided for each pixel column of the pixel array unit 12.

The event detection unit 63 detects presence/absence of occurrence of an event, depending on whether or not the amount of change in the photocurrent from each corresponding light receiving unit 61 exceeds a predetermined detection threshold. The event includes an on-event indicating that the amount of change in the photocurrent exceeds the upper limit threshold, and an off-event indicating that the amount of change falls below the lower limit threshold, for example. Further, the event data indicating the occurrence of the event includes one bit indicating a result of on-event detection, and one bit indicating a result of off-event detection, for example. Note that the event detection unit 63 can be designed to detect only an on-event.

When an event has occurred, the event detection unit 63 outputs a request for requesting an output of event data indicating the occurrence of the event, to the arbiter unit 14 (see FIG. 2). In a case where a response to the request is received from the arbiter unit 14, the event detection unit 63 then outputs the event data to the drive unit 13 and the signal processing unit 16.

Example Circuit Configuration of a Pixel

Figure 4:
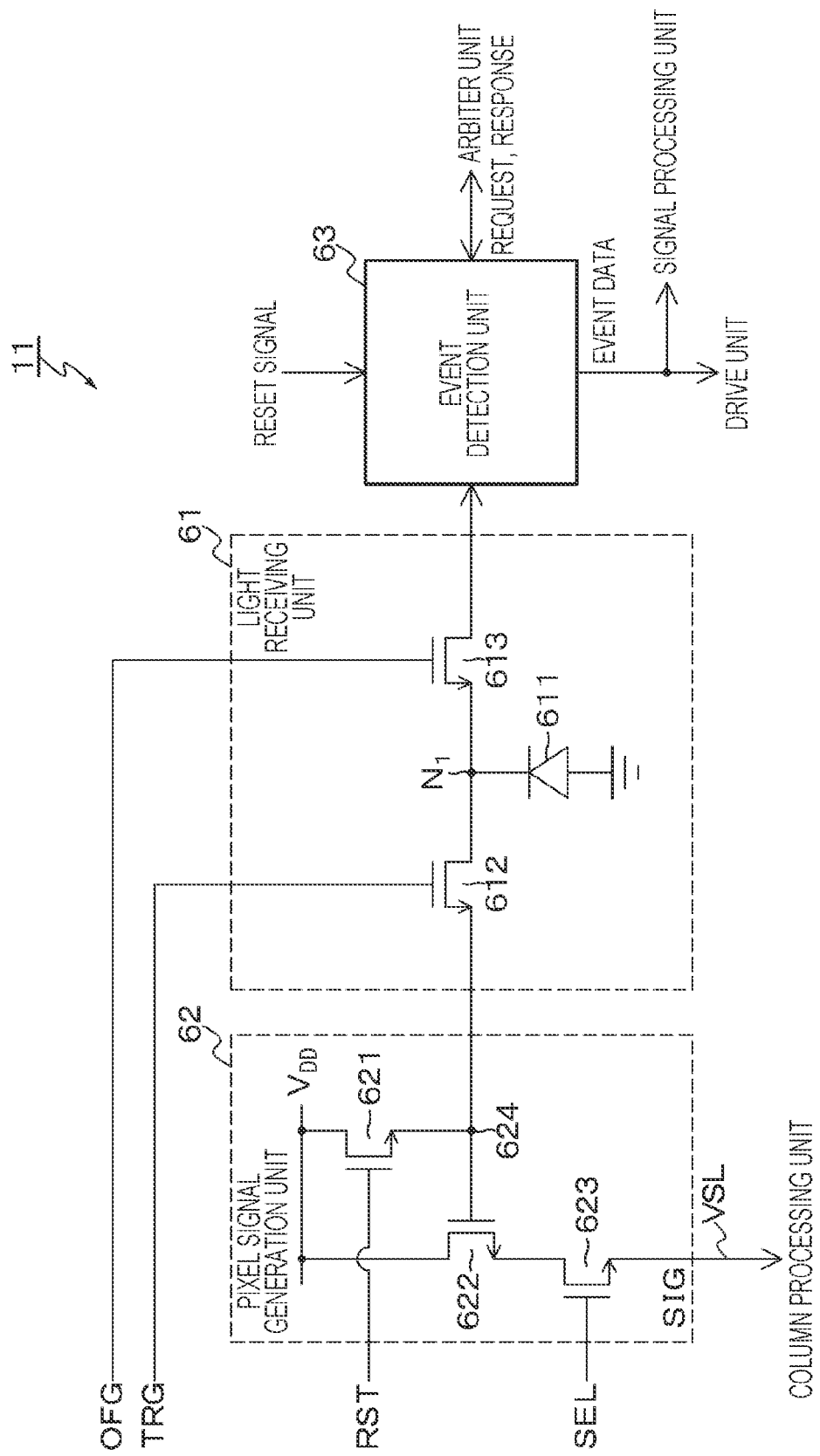
FIG. 4 is a circuit diagram showing an example circuit configuration of a pixel in the event detection device.

FIG. 4 is a circuit diagram showing an example circuit configuration of a pixel 11 of the pixel array unit 12 in the event detection device 10.

As described above, each of the plurality of pixels 11 includes the light receiving unit 61, the pixel signal generation unit 62, and the event detection unit 63.

In the pixel 11 having the above configuration, the light receiving unit 61 includes a light receiving element (a photoelectric conversion element) 611, a transfer transistor 612, and a transfer transistor 613. The transfer transistor 612 and the transfer transistor 613 can be N-type metal oxide semiconductor (MOS) transistors, for example. The transfer transistor 612 and the transfer transistor 613 are connected in series to each other.

The light receiving element 611 is connected between the ground and a common connection node $N_1$ of the transfer transistor 612 and the transfer transistor 613, and photoelectrically converts incident light to generate electric charge of the amount corresponding to the amount of the incident light.

A transfer signal TRG is supplied from the drive unit 13 shown in FIG. 2 to the gate electrode of the transfer transistor 612. The transfer transistor 612 enters an on-state in response to the transfer signal TRG, to supply the pixel signal generation unit 62 with an electric signal generated by the light receiving element 611 performing photoelectric conversion.

A control signal OFG is supplied from the drive unit 13 to the gate electrode of the transfer transistor 613. The transfer transistor 613 enters an on-state in response to the control signal OFG, to supply the event detection unit 63 with an electric signal generated by the light receiving element 611 performing photoelectric conversion. The electric signal supplied to the event detection unit 63 is a photocurrent formed with electric charge.

The pixel signal generation unit 62 includes a reset transistor 621, an amplification transistor 622, a selection transistor 623, and a floating diffusion layer 624. The reset transistor 621, the amplification transistor 622, and the selection transistor 623 can be N-type MOS transistors, for example.

The electric charge photoelectrically converted by the light receiving element 611 of the light receiving unit 61 is supplied to the pixel signal generation unit 62 by the transfer transistor 612. The electric charge supplied from the light receiving unit 61 is accumulated in the floating diffusion layer 624. The floating diffusion layer 624 generates a voltage signal of the voltage value corresponding to the amount of the accumulated electric charge. That is, the floating diffusion layer 624 is a charge-voltage conversion unit that converts electric charge into a voltage.

The reset transistor 621 is connected between the power supply line of a power supply voltage $V_{DD}$ and the floating diffusion layer 624. A reset signal RST is supplied from the drive unit 13 to the gate electrode of the reset transistor 621. The reset transistor 621 enters an on-state in response to the reset signal RST, to initialize (reset) the floating diffusion layer 624.

The amplification transistor 622 is connected in series to the selection transistor 623 between the power supply line of the power supply voltage $V_{DD}$ and the vertical signal line VSL. The amplification transistor 622 amplifies the voltage signal subjected to charge-voltage conversion by the floating diffusion layer 624.

A selection signal SEL is supplied from the drive unit 13 to the gate electrode of the selection transistor 623. The selection transistor 623 enters an on-state in response to the selection signal SEL, to output the voltage signal amplified by the amplification transistor 622 as an analog pixel signal SIG to the column processing unit 15 (see FIG. 2) via the vertical signal line VSL.

In the event detection device 10 including the pixel array unit 12 in which the pixels 11 having the above configuration are two-dimensionally arranged, the drive unit 13 is instructed to start event detection by the controller 30 shown in FIG. 1. Instructed to start event detection, the drive unit 13 then supplies the control signal OFG to the transfer transistor 613 of the light receiving unit 61, to drive the transfer transistor 613 to supply the photocurrent corresponding to the electric charge generated in the light receiving element 611 to the event detection unit 63.

When an event is detected in a pixel 11, the drive unit 13 then turns off the transfer transistor 613 of the pixel 11, to stop the supply of photocurrent to the event detection unit 63. Next, the drive unit 13 supplies the transfer signal TRG to the transfer transistor 612, to drive the transfer transistor 612 to transfer the electric charge photoelectrically converted by the light receiving element 611 to the floating diffusion layer 624.

In this manner, the event detection device 10 including the pixel array unit 12 in which the pixels 11 having the above configuration are two-dimensionally arranged outputs only a pixel signal of the pixel 11 from which an event has been detected, to the column processing unit 15. Thus, power consumption by the event detection device 10 and image processing load can be made lower than those in a case where pixel signals of all the pixels are output, regardless of the presence/absence of an event.

Note that the configuration of a pixel 11 described herein is an example, and is not limited to this example configuration. For example, in a case where there is no need to output a pixel signal, a pixel configuration not including the pixel signal generation unit 62 can be adopted. In the case of this pixel configuration, the transfer transistor 612 is only required to be removed from the light receiving unit 61. Further, the column processing unit 15 in FIG. 2 can be designed not to have an analog-digital conversion function. With a pixel configuration that does not output any pixel signal, the size of the event detection device 10 can be reduced.

Example Configuration of the Event Detection Unit

Figure 5:
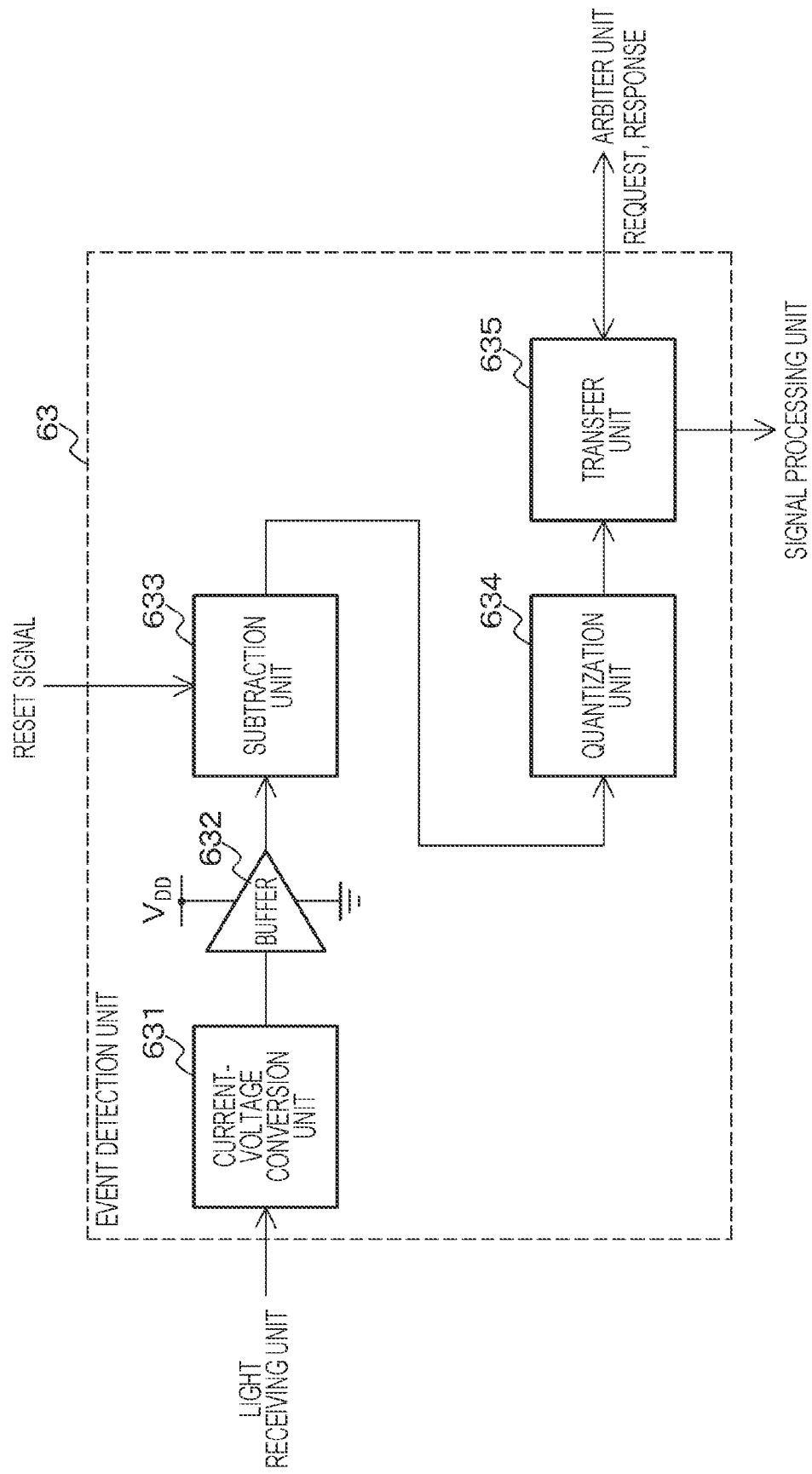
FIG. 5 is a block diagram showing an example circuit configuration of an event detection unit in a pixel in the event detection device.

FIG. 5 is a block diagram showing an example circuit configuration of the event detection unit 63 in a pixel 11 of the event detection device 10.

As shown in FIG. 5, the event detection unit 63 according to this example includes a current-voltage conversion unit 631, a buffer 632, a subtraction unit 633, a quantization unit 634, and a transfer unit 635.

The current-voltage conversion unit 631 converts a photocurrent supplied from the light receiving unit 63 of the pixel 11 into a voltage signal of the logarithm of the photocurrent (this voltage signal will be hereinafter referred to as "optical voltage" in some cases), and supplies the voltage signal to the buffer 632. The buffer 632 buffers the optical voltage supplied from the current-voltage conversion unit 631, and supplies the optical voltage to the subtraction unit 633.

The subtraction unit 633 calculates a difference between the optical voltage at the current time and an optical voltage at a time slightly different from the current time, and supplies a difference signal corresponding to the difference to the quantization unit 634. The quantization unit 634 quantizes the difference signal supplied from the subtraction unit 633 into a digital signal, and supplies the digital value of the difference signal to the transfer unit 635.

When the digital value of the difference signal is supplied from the quantization unit 634, the transfer unit 635 supplies a request for requesting transmission of event data to the arbiter unit 14. Receiving a response to the request, or a response indicating that an output of event data is allowed, from the arbiter unit 14, the transfer unit 635 then supplies event data to the drive unit 13 and the signal processing unit 16 in accordance with the digital value of the difference signal supplied from the quantization unit 634.

Next, example configurations of the current-voltage conversion unit 631, the subtraction unit 633, and the quantization unit 634 in the event detection unit 63 are described.

Example Configuration of the Current-Voltage Conversion Unit

Figure 6:
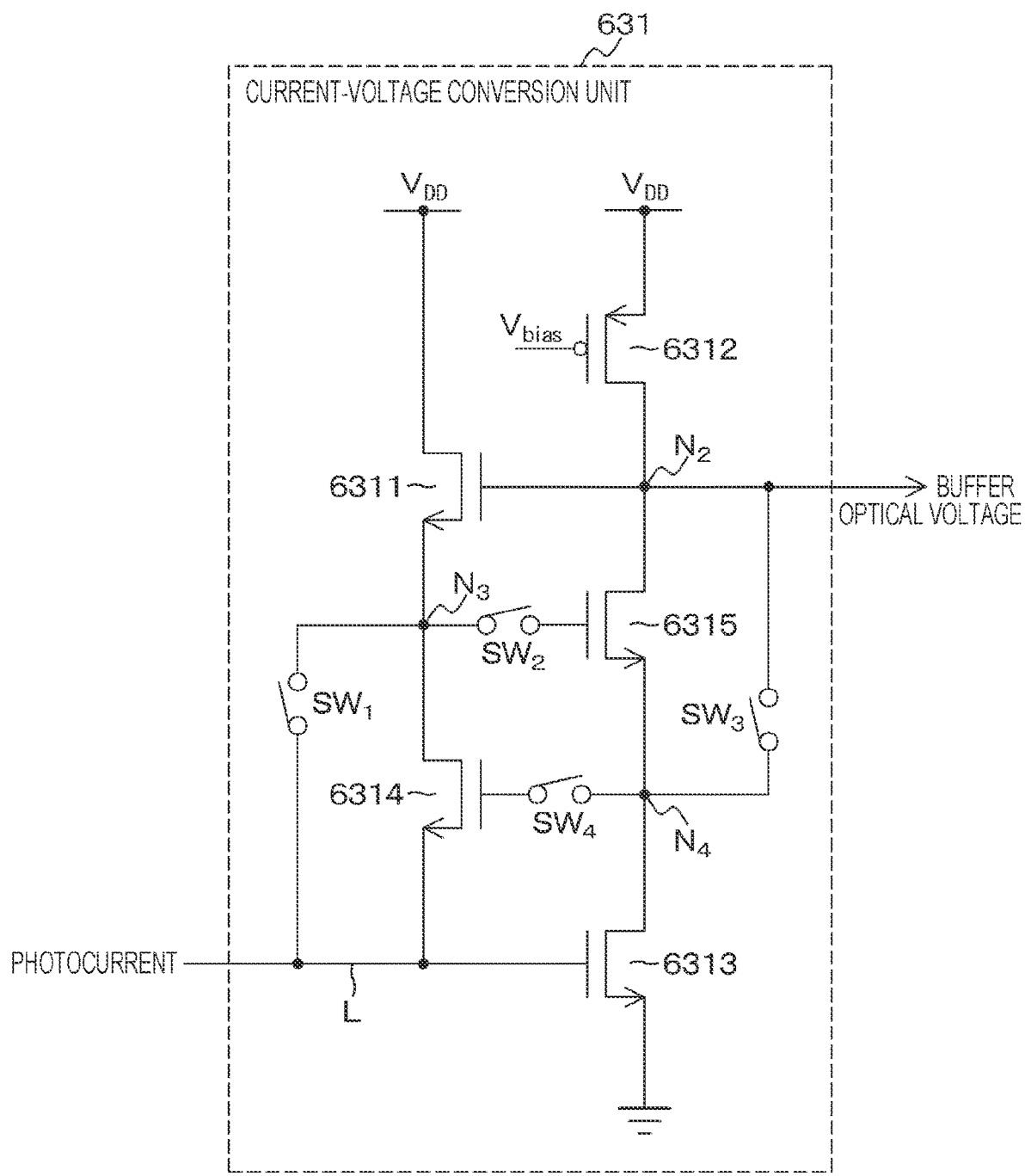
FIG. 6 is a circuit diagram showing an example configuration of a current-voltage conversion unit in the event detection unit.

FIG. 6 is a circuit diagram showing an example configuration of the current-voltage conversion unit 631 in the event detection unit 63.

As shown in FIG. 6, the current-voltage conversion unit 631 according to this example has a circuit configuration that includes a transistor 6311, a transistor 6312, a transistor 6313, a transistor 6314, and a transistor 6315, as well as a switch element $SW_1$, a switch element $SW_2$, a switch element $SW_3$, and a switch element $SW_4$. N-type MOS transistors can be used as the transistor 6311, the transistor 6313, the transistor 6314, and the transistor 6315, and a P-type MOS transistor can be used as the transistor 6312.

The transistor 6311 and the transistor 6314 are connected in series between the power supply line of the power supply voltage $V_{DD}$ and a signal input line L. The transistor 6312, the transistor 6315, and the transistor 6313 are connected in series between the power supply line of the power supply voltage $V_{DD}$ and the ground. Further, the gate electrode of the transistor 6311 and the input terminal of the buffer 632 shown in FIG. 5 are connected to a common connection node $N_2$ of the transistor 6312 and the transistor 6315.

A predetermined bias voltage $V_{bias}$ is applied to the gate electrode of the transistor 6312. As a result, the transistor 6312 supplies a constant current to the transistor 6313. A photocurrent is input from the light receiving unit 61 to the gate electrode of the transistor 6313 through the signal input line L. The drain electrode of the transistor 6311 is connected to the power supply line of the power supply voltage $V_{DD}$, and forms a source follower configuration.

The switch element $SW_1$ is connected between the signal input line L and a common connection node $N_3$ of the transistor 6311 and the transistor 6314. That is, the switch element $SW_1$ is connected in parallel to the transistor 6314. The switch element $SW_2$ is connected between the common connection node $N_3$ of the transistor 6311 and the transistor 6314, and the gate electrode of the transistor 6315.

The switch element $SW_3$ is connected between the common connection node $N_2$ of the transistor 6312 and the transistor 6315, and a common connection node $N_4$ of the transistor 6315 and the transistor 6313. That is, the switch element $SW_3$ is connected in parallel to the transistor 6315. The switch element $SW_4$ is connected between the gate electrode of the transistor 6314 and the common connection node $N_4$ of the transistor 6315 and the transistor 6313.

The gate electrode of the transistor 6313 is connected to the source electrode of the transistor 6311 having a source follower configuration, via the transistor 6314. A photocurrent from the light receiving unit 61 is then converted into an optical voltage corresponding to the logarithm of the photocurrent by the transistor 6311 having a source follower configuration and the transistor 6313.

The current-voltage conversion unit 631 having the above configuration can switch between a circuit configuration in which transistors are cascade-connected and a circuit configuration in which transistors are not cascade-connected, by controlling switching on (closing) and off (opening) of the switch element $SW_1$, the switch element $SW_2$, the switch element $SW_3$, and the switch element $SW_4$. By switching circuit configurations in this manner, the current-voltage conversion unit 631 can then control the detection threshold of the event detection unit 63, which is the detection sensitivity of event detection being performed by the event detection device 10. The circuit configuration switching to be performed by the current-voltage conversion unit 631 will be described later in detail.

Example Configuration of the Subtraction Unit and the Quantization Unit

Figure 7:
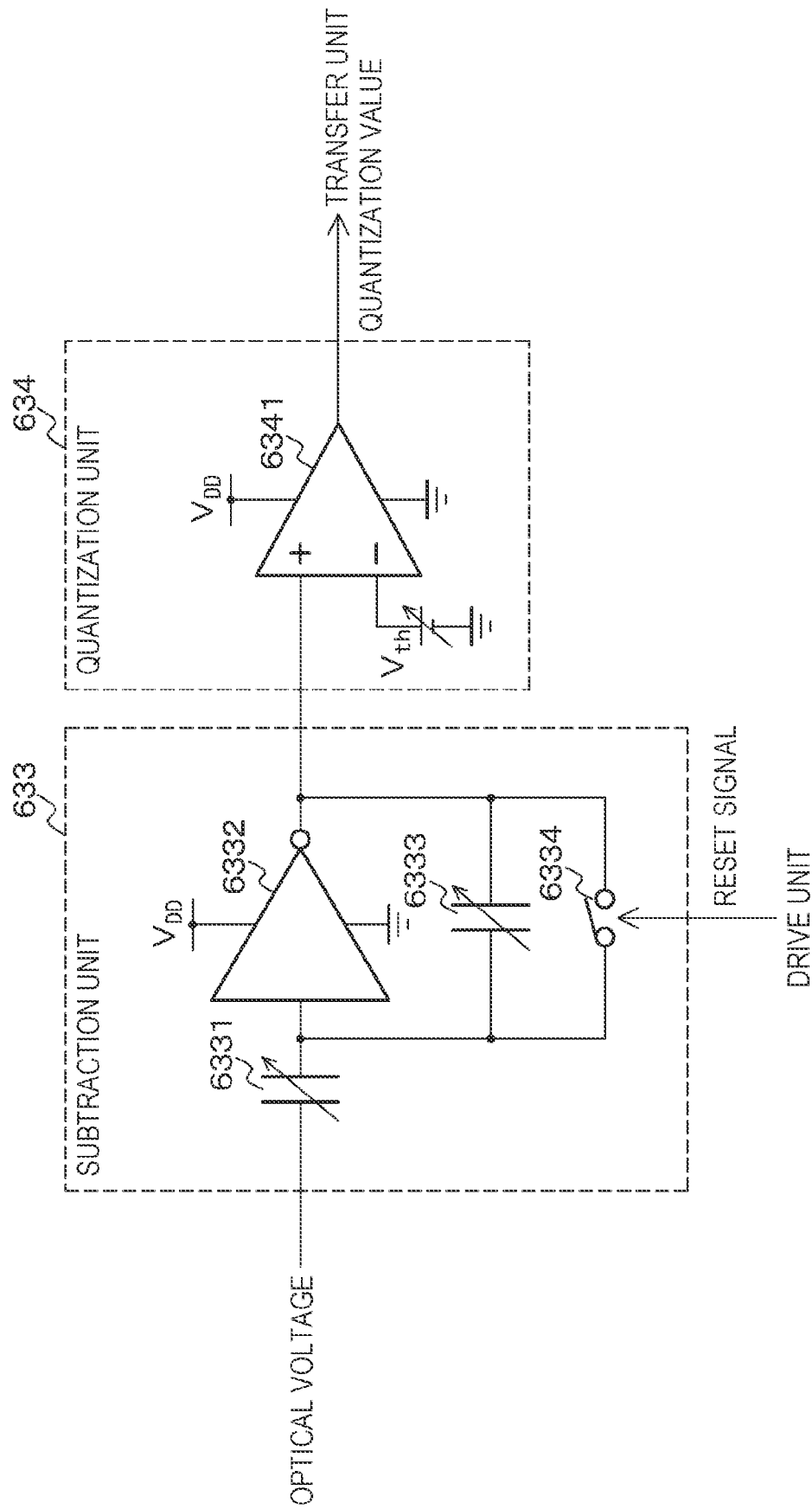
FIG. 7 is a circuit diagram showing an example configuration of a subtraction unit and a quantization unit in the event detection unit.

FIG. 7 is a circuit diagram showing an example configuration of the subtraction unit 633 and the quantization unit 634 in the event detection unit 63.

Example Configuration of the Subtraction Unit

The subtraction unit 633 according to this example includes a capacitive element 6331 as a first capacitive element, an operational amplifier 6332, a capacitive element 6333 as a second capacitive element, and a switch element 6334.

One end of the capacitive element 6331 is connected to the output terminal of the buffer 632 shown in FIG. 5, and the other end of the capacitive element 6331 is connected to the input terminal of the operational amplifier 6332. With this arrangement, an optical voltage supplied from the buffer 632 is input to the input terminal of the operational amplifier 6332 via the capacitive element 6331.

The capacitive element 6333 is connected in parallel to the operational amplifier 6332. The switch element 6334 is connected between both ends of the capacitive element 6333. To the switch element 6334, a reset signal is supplied as a control signal for opening or closing the switch element 6334, from the arbiter unit 14 shown in FIG. 2. In accordance with the reset signal, the switch element 6334 opens or closes the path connecting both ends of the capacitive element 6333.

In the subtraction unit 633 having the above configuration, the optical voltage that is input to the terminal of the capacitive element 6331 on the side of the buffer 632 when the switch element 6334 is turned on (closed) is represented by $V_{init}$. When the optical voltage $V_{init}$ is input to the terminal of the capacitive element 6331 on the side of the buffer 632, the terminal on the opposite side becomes a virtual ground terminal. The potential of this virtual ground terminal is set to zero, for convenience. At this point of time, the electric charge $Q_{init}$ accumulated in the capacitive element 6331 is expressed by Equation (1) shown below, where $C_1$ represents the capacitance value of the capacitive element 6331.

$$Q_{init} = C_1 \times V_{init} \quad (1)$$

Further, in a case where the switch element 6334 is in an on-state, both ends of the capacitive element 6333 are short-circuited, and accordingly, the electric charge accumulated in the capacitive element 6333 is zero. After that, the switch element 6334 is turned off (opened). The optical voltage of the terminal of the capacitive element 6331 on the side of the buffer 632 in a case where the switch element 6334 is in an off-state is represented as $V_{after}$. The electric charge $Q_{after}$ accumulated in the capacitive element 6331 in a case where the switch element 6334 enters an off-state is expressed by Equation (2) shown below.

$$Q_{after} = C_1 \times V_{after} \quad (2)$$

Where the capacitance value of the capacitive element 6333 is represented by $C_2$, and the output voltage of the operational amplifier 6332 is represented by $V_{out}$, the electric charge $Q_2$ accumulated in the capacitive element 6333 is expressed by Equation (3) shown below.

$$Q_2 = -C_2 \times V_{out} \quad (3)$$

Before and after the switch element 6334 is turned off, the total charge amount obtained by combining the charge amount of the capacitive element 6331 and the charge amount of the capacitive element 6333 does not change. Accordingly, Equation (4) shown below is established.

$$Q_{init} = Q_{after} + Q_2 \quad (4)$$

Where Equations (1) to (3) are substituted into Equation (4), Equation (5) shown below is obtained.

$$V_{out} = -(C_1/C_2) \times (V_{after} - V_{init}) \quad (5)$$

According to Equation (5), the subtraction unit 633 performs subtraction between the optical voltage $V_{init}$ and the optical voltage $V_{after}$, which is calculation of a difference signal $V_{out}$ corresponding to the difference ($V_{init} - V_{after}$) between the optical voltage $V_{init}$ and the optical voltage $V_{after}$. Also, according to Equation (5), the subtraction gain of the subtraction unit 633 is $C_1/C_2$. Since it is normally desired to maximize the subtraction gain of the subtraction unit 633, it is preferable to design the capacitance value $C_1$ of the capacitive element 6331 to be large, and the capacitance value $C_2$ of the capacitive element 6333 to be small.

When the capacitance value $C_2$ of the capacitive element 6333 is too small, on the other hand, kTC noise increases, and noise characteristics might deteriorate. Therefore, the reduction of the capacitance value $C_2$ of the capacitive element 6333 is limited within a range in which noise can be tolerated. Further, since the event detection unit 63 including the subtraction unit 633 is mounted in each pixel 11, constraints are imposed on the areas of the capacitive element 6331 and the capacitive element 6333. With these aspects taken into account, the capacitance value $C_1$ of the capacitive element 6331 and the capacitance value $C_2$ of the capacitive element 6333 are determined.

In the subtraction unit 633 having the above configuration, variable capacitive elements each having a variable capacitance value can be used as the capacitive element 6331 that is the first capacitive element, and the capacitive element 6333 that is the second capacitive element. Further, the capacitance ratio ($C_1/C_2$) between the capacitive element 6331 and the capacitive element 6333 is changed, so that the detection threshold of the event detection unit 63, which is the detection sensitivity of the event detection being performed by the event detection device 10, can be controlled.

Example Configuration of the Quantization Unit

In FIG. 7, the quantization unit 634 includes a comparator 6341. The comparator 6341 receives a difference signal from the subtraction unit 430 (which is an output signal of the operational amplifier 6332) as a non-inverting (+) input, and receives a predetermined threshold voltage $V_{th}$ as an inverting (−) input. The comparator 6341 then compares the difference signal $V_{out}$ from the subtraction unit 430 with the predetermined threshold voltage $V_{th}$, and outputs a high level or a low level representing the comparison result as the quantization value of the difference signal $V_{out}$ to the transfer unit 635 shown in FIG. 5.

In the quantization unit 634 having the above configuration, the threshold voltage $V_{th}$ can be variable. Further, the threshold voltage $V_{th}$ for the quantization unit 634 is adjusted, so that the detection threshold for the event detection unit 63, which is the detection sensitivity of the event detection being performed by the event detection device 10, can be controlled.

In a case where the occurrence of a change in the light amount (a change in luminance) as an event is recognized from the quantization value of the difference signal $V_{out}$ from the quantization unit 634, or where the difference signal $V_{out}$ is greater (or smaller) than the predetermined threshold voltage $V_{th}$, the transfer unit 635 outputs high-level event data indicating the occurrence of an event to the signal processing unit 16 in FIG. 2, for example.

In FIG. 2, the signal processing unit 16 outputs the event data supplied from the transfer unit 635, including location information about the pixel 11 that has detected the event indicated by the event data, time information indicating the time when the event has occurred, and further, if necessary, polarity information about the light amount change as the event.

The data format of the event data including the location information about the pixel 11 that has detected the event, the time information indicating the time when the event has occurred, and the polarity information about the light amount change as the event can be a data format called Address Event Representation (AER), for example.

Note that an optical filter such as a color filter that transmits predetermined light is provided in the pixel 11, so that the pixel 11 can receive desired light as incident light. For example, in a case where the pixel 11 receives visible light as incident light, the event data indicates the occurrence of a change in a pixel value in an image showing a visible object. Also, in a case where the pixel 11 is to receive infrared rays, millimeter waves, or the like for distance measurement as incident light, for example, the event data indicates the occurrence of a change in the distance to the object. Further, in a case where the pixel 11 is to receive infrared rays for measuring temperature as incident light, for example, the event data indicates the occurrence of a change in the temperature of the object. In this embodiment, the pixel 11 is to receive visible light as incident light.

Example Configuration of a Chip Structure

Figure 8:
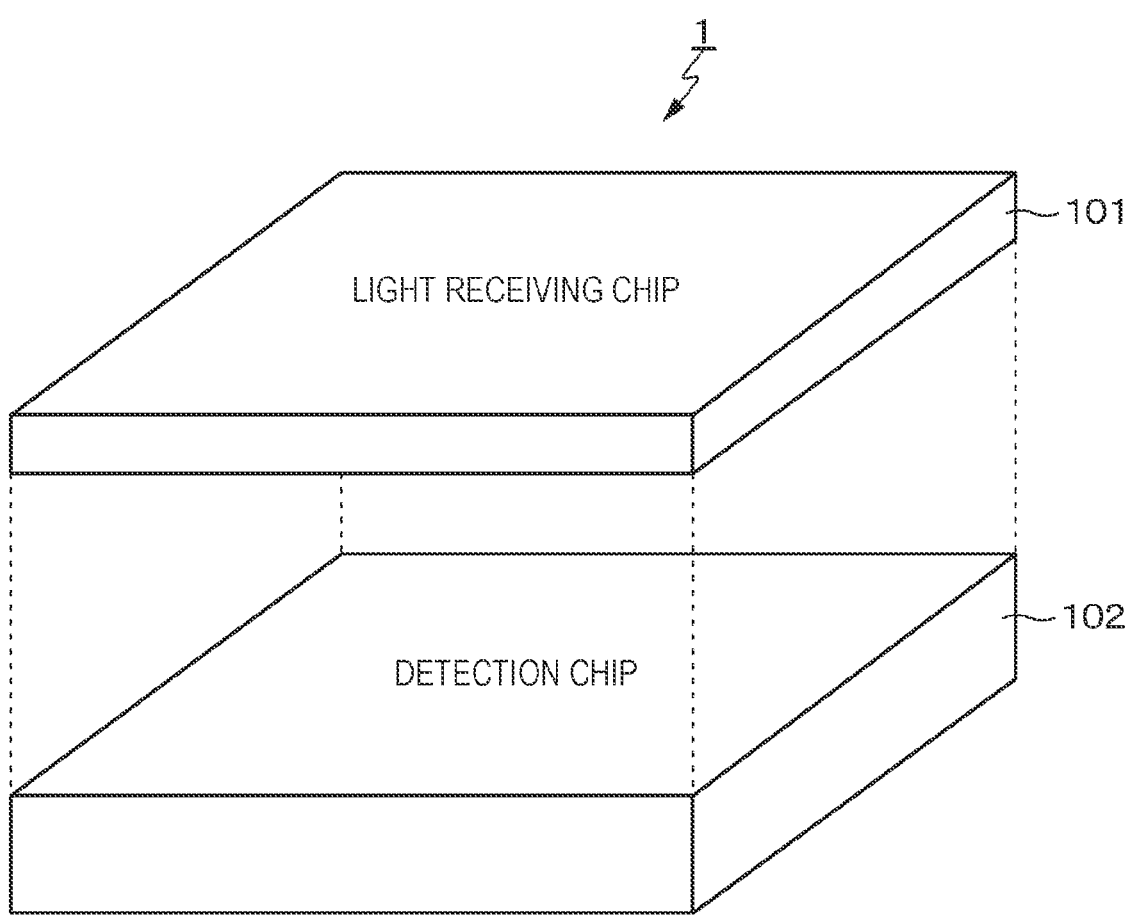
FIG. 8 is an exploded perspective view schematically showing a stacked chip structure of the event detection device.

The chip (semiconductor integrated circuit) structure of the event detection device 10 described above can be a stacked chip structure, for example. FIG. 8 is an exploded perspective view schematically showing a stacked chip structure of the event detection device 10.

As shown in FIG. 8, the stacked chip structure, which is a stack structure, is a structure in which at least two chips that is a light receiving chip 101 as a first chip and a detection chip 102 as a second chip are stacked. Further, in the circuit configuration of the pixels 11 shown in FIG. 4, each light receiving element 611 is disposed on the light receiving chip 101, and all the elements other than the light receiving elements 611, the elements of the other circuit portions of the pixels 11, and the like are disposed on the detection chip 102. The light receiving chip 101 and the detection chip 102 are electrically connected via connecting portions such as vias, Cu—Cu joints, or bumps.

Note that, although an example configuration in which the light receiving elements 611 are disposed on the light receiving chip 101, and the elements other than the light receiving elements 611, the elements of the other circuit portions of the pixels 11, and the like are disposed on the detection chip 102 has been described herein, this embodiment is not limited to this example configuration.

For example, in the circuit configuration of the pixels 11 shown in FIG. 4, each element of the light receiving units 61 may be disposed on the light receiving chip 101, and the elements other than the light receiving units 61, the elements of the other circuit portions of the pixels 11, and the like may be disposed on the detection chip 102. Alternatively, each element of the light receiving units 61, and the reset transistors 621 and the floating diffusion layers 624 of the pixel signal generation units 62 may be disposed on the light receiving chip 101, and the other elements may be disposed on the detection chip 102. Further, some of the elements constituting the event detection units 63, together with the respective elements of the light receiving units 61 and the like, may be disposed on the light receiving chip 101.

In the description below, a specific example of an event detection process to be performed in the imaging system 1A according to the first embodiment having the above configuration will be explained. The event detection described below is basically performed under the control of the controller 30 of the imaging system 1. This aspect applies to each of the examples described later.

Example 1

Example 1 is an example of the imaging system 1A according to the first embodiment in which a rain gauge that measures an amount of rain is used as an environment sensor that provides external information, and the detection threshold for the event detection units 63 (this threshold will be hereinafter simply described as an "event detection threshold" in some cases) is controlled on the basis of a measurement value of the rain gauge. An example flow in an event detection process according to Example 1 is shown in a flowchart in FIG. 9. The event detection process according to Example 1 is an example process according to a control method of the present disclosure, by which the detection sensitivity of event detection being performed by the event detection device is controlled on the basis of external information.

The controller 30 sets a predetermined initial setting value as the detection threshold for the event detection units 63, and causes the event detection device 10 to perform imaging (step S11). The event detection threshold can be set depending on the circuit configuration of the current-voltage conversion unit 631 described above, the capacitance ratio between the capacitive element 6331 and the capacitive element 6333 in the subtraction unit 633, or the threshold voltage $V_{th}$ in the quantization unit 634. This aspect applies to the examples described later.

While imaging is being performed by the event detection device 10, the controller 30 acquires a measurement value of the rain gauge provided as external information (step S12), and then determines whether or not the measurement value of the rain gauge is equal to or greater than a predetermined threshold (step S13). If the measurement value is neither equal to nor greater than the predetermined threshold (NO in S13), the process returns to step S11, and the imaging by the event detection device 10 continues.

If the measurement value of the rain gauge is equal to or greater than the predetermined threshold (YES in S13), the controller 30 performs control to raise the detection threshold for the event detection units 63 by a certain value, for example (step S14). Raising the detection threshold for the event detection units 63 means lowering the detection sensitivity of the event detection being performed by the event detection device 10 (the gain of the event detection device 10). A specific example of the event detection threshold control will be described later.

The measurement value of the rain gauge being equal to or greater than the predetermined threshold means that the amount of rain is large. In a situation where the amount of rain is large, there might be a case where the event detection device 10 detects generation of a large number of water droplets (raindrops) or the like as an event. In this case, there is a possibility that the water droplets (raindrops) or the like detected as an event will become noise for the object (a vehicle, a pedestrian, or the like) originally desired to be detected as an event by the event detection device 10, and lead to a decrease in accuracy of object recognition.

Therefore, the controller 30 performs control to raise the detection threshold for the event detection unit 63. By doing so, the controller 30 performs control to change the detection sensitivity of the event detection being performed by the event detection device 10 (the gain of the event detection device 10) to such sensitivity that generation of water droplets or the like is not detected as noise. Even after the detection threshold for the event detection is raised, the imaging by the event detection device 10 is continued, and, in the event detection device 10, an event detection process is performed with the detection sensitivity changed by the controller 30.

The controller 30 again acquires a measurement value of the rain gauge (step S15), and then determines whether or not the measurement value of the rain gauge is smaller than the predetermined threshold (step S16). If the measurement value of the rain gauge is still equal to or greater than the predetermined threshold (NO in S16), the controller 30 returns to step S15, and repeats the acquisition of a measurement value of the rain gauge. If the measurement value of the rain gauge is smaller than the predetermined threshold (YES in S16), for example, the controller 30 then determines that it has stopped raining, and performs control to lower the event detection threshold by a predetermined value or return the event detection threshold to the initial setting value (step S17).

After performing the control to lower the event detection threshold or return the event detection threshold to the initial setting value, the controller 30 determines whether or not the imaging by the event detection device 10 has ended (step S18). If the imaging has not ended yet (NO in S18), the controller 30 returns to step S11, and repeats the series of processes described above. If the imaging by the event detection device 10 has ended (YES in S18), the controller 30 ends the series of processes for event detection.

Control of the Event Detection Threshold

Here, a specific example of the event detection threshold control to be performed in the process in step S14 or step S17 is described. It is possible to control the event detection threshold for determining the gain of the event detection device 10, by changing the circuit configuration of the current-voltage conversion unit 631, the capacitance ratio between the capacitive element 6331 and the capacitive element 6333 in the subtraction unit 633, or the threshold voltage $V_{th}$ in the quantization unit 634.

Here, the control of the event detection threshold by changing the circuit configuration of the current-voltage conversion unit 631 is specifically described.

In the current-voltage conversion unit 631 having the configuration shown in FIG. 6, a photocurrent supplied from the light receiving unit 61 through the signal input line L is converted into an optical voltage corresponding to the logarithm of the photocurrent. The optical voltage is then output from the common connection node $N_2$ of the transistor 6312 and the transistor 6315 to the buffer 632.

In a case where the switch element $SW_1$ and the switch element $SW_3$ enter an on-state or an off-state in the current-voltage conversion unit 631, the switch element $SW_2$ and the switch element $SW_4$ enter an on-state or an off-state, to change the detection threshold for the event detection unit 63.

Figure 10:
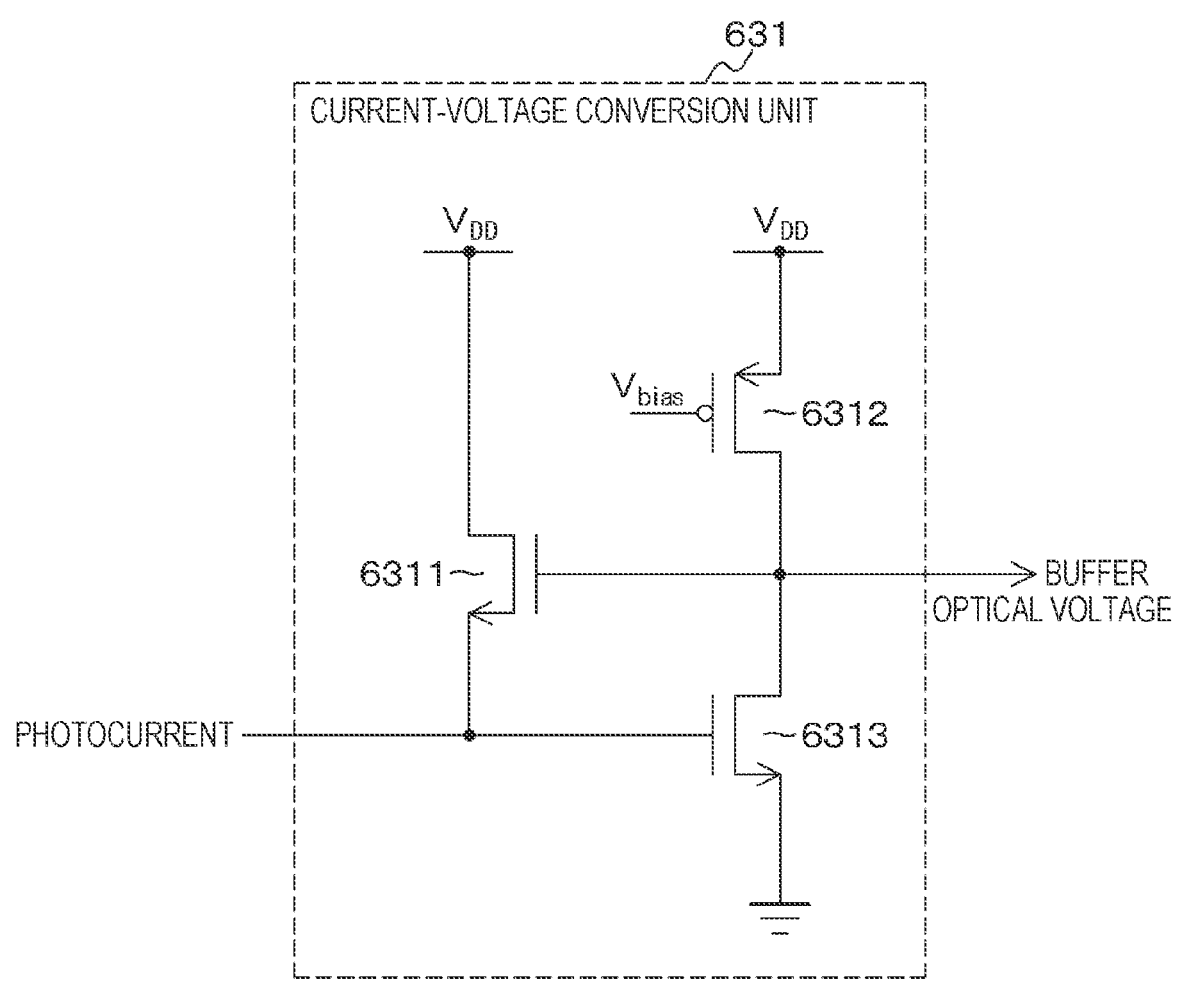
FIG. 10 is an equivalent circuit diagram of a first circuit configuration of a current-voltage conversion unit.

FIG. 10 shows, as a first circuit configuration, the substantial circuit configuration of the current-voltage conversion unit 631 in a case where the switch element $SW_1$ and the switch element $SW_3$ are in an on-state while the switch element $SW_2$ and the switch element $SW_4$ are in an off-state.

Figure 11:
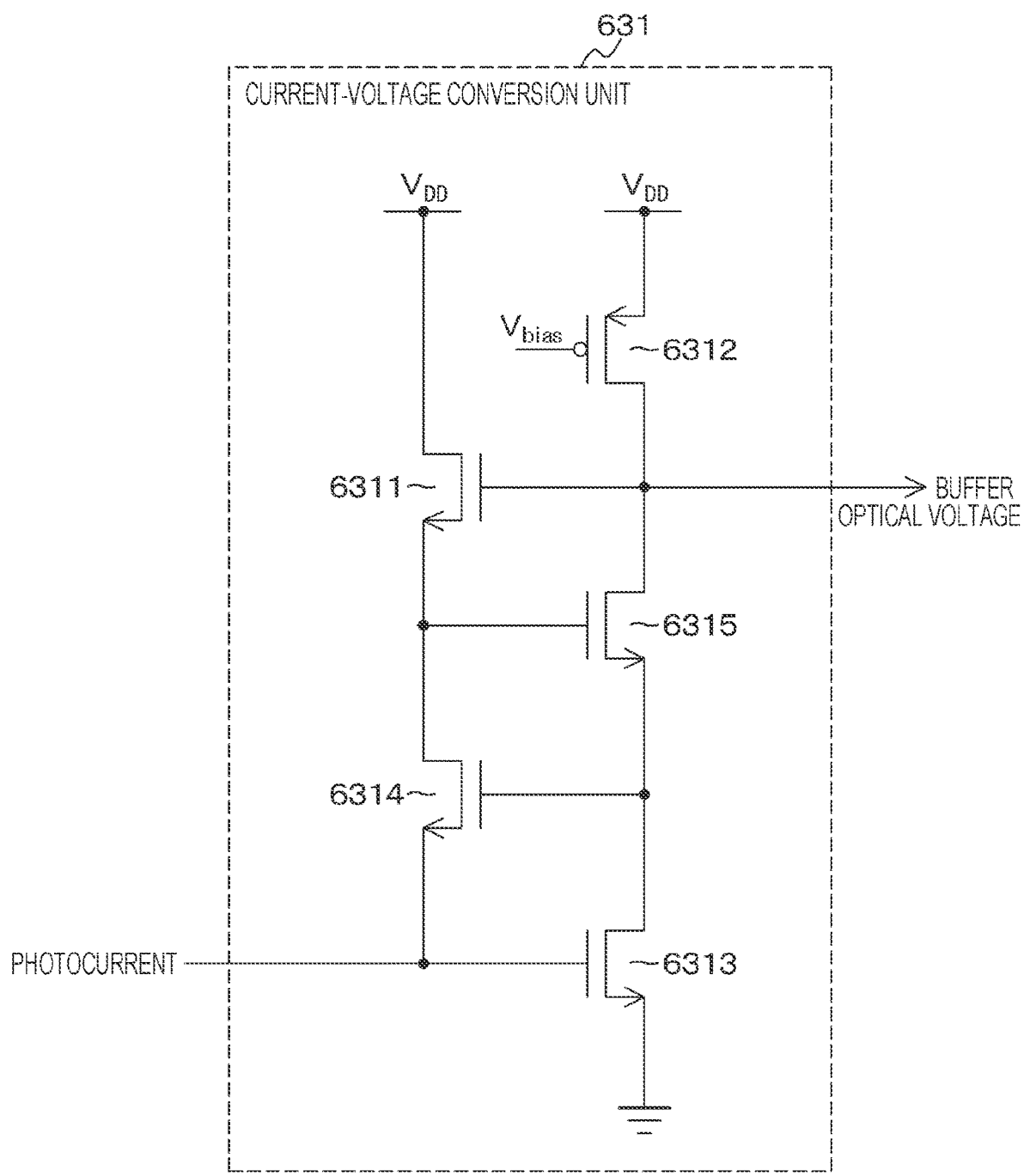
FIG. 11 is an equivalent circuit diagram of a second circuit configuration of a current-voltage conversion unit.

Further, FIG. 11 shows, as a second circuit configuration, the substantial circuit configuration of the current-voltage conversion unit 631 in a case where the switch element $SW_1$ and the switch element $SW_3$ are in an off-state while the switch element $SW_2$ and the switch element $SW_4$ are in an on-state.

In the case of the first circuit configuration in which the switch element $SW_1$ and the switch element $SW_3$ are in an on-state while the switch element $SW_2$ and the switch element $SW_4$ are in an off-state, the current-voltage conversion unit 631 has a circuit configuration in which the transistor 6311 and the transistor 6314 are not cascade-connected, and the transistor 6313 and the transistor 6315 are not cascade-connected either, as shown in FIG. 10.

In the case of the second circuit configuration in which the switch element $SW_1$ and the switch element $SW_3$ are in an off-state while the switch element $SW_2$ and the switch element $SW_4$ are in an on-state, the current-voltage conversion unit 631 has a circuit configuration in which the transistor 6311 and the transistor 6314 are cascade-connected, and the transistor 6313 and the transistor 6315 are also cascade-connected, as shown in FIG. 11.

Here, the transistor 6311 and the transistor 6313, and the transistor 6314 and the transistor 6315 are formed with field effect transistors of the same specification, for example. With this arrangement, the gain (the event detection threshold) of the event detection unit 63 in the case of the second circuit configuration shown in FIG. 11 is about twice as great as that in the case of the first circuit configuration shown in FIG. 10.

Figure 9:
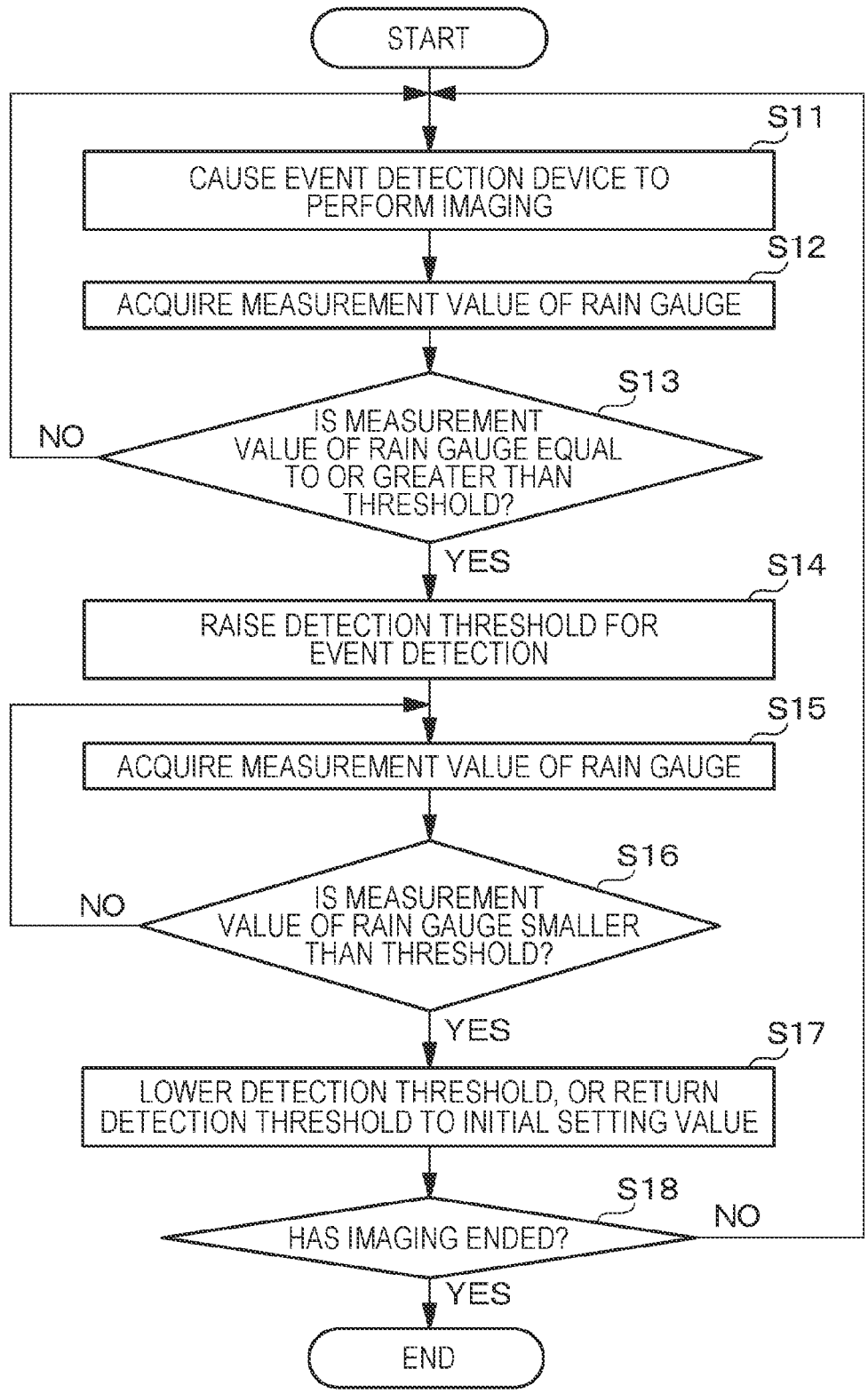
FIG. 9 is a flowchart showing an example of an event detection process according to Example 1.

Therefore, in the process in step S14 in the event detection process according to Example 1 shown in FIG. 9, the circuit configuration of the current-voltage conversion unit 631 is switched from the second circuit configuration shown in FIG. 11 to the first circuit configuration shown in FIG. 10, so that the event detection threshold, which is the detection sensitivity of the event detection, can be lowered.

Note that, in the current-voltage conversion unit 631 having the configuration shown in FIG. 6, a circuit configuration in which the transistors are cascade-connected in two stages has been described as an example. However, this embodiment is not limited to two-stage cascade connection, and a circuit configuration in which the transistors are cascade-connected in three or more stages can be adopted.

Although an example case where the circuit configuration of the current-voltage conversion unit 631 is switched so as to control the event detection threshold has been described herein, it is also possible to control the event detection threshold by changing the capacitance ratio between the capacitive element 6331 and the capacitive element 6333 in the subtraction unit 633, or the threshold voltage $V_{th}$ in the quantization unit 634.

Specifically, in the subtraction unit 633 having the configuration shown in FIG. 7, it is possible to control the event detection threshold by changing the capacitance ratio ($C_1/C_2$) between the capacitive element 6331 as the first capacitive element and the capacitive element 6333 as the second capacitive element. Further, in the quantization unit 634 having the configuration shown in FIG. 7, it is possible to control the event detection threshold by adjusting the threshold voltage $V_{th}$ serving as the inverting (−) input of the comparator 6341.

Example 2

Figure 12:
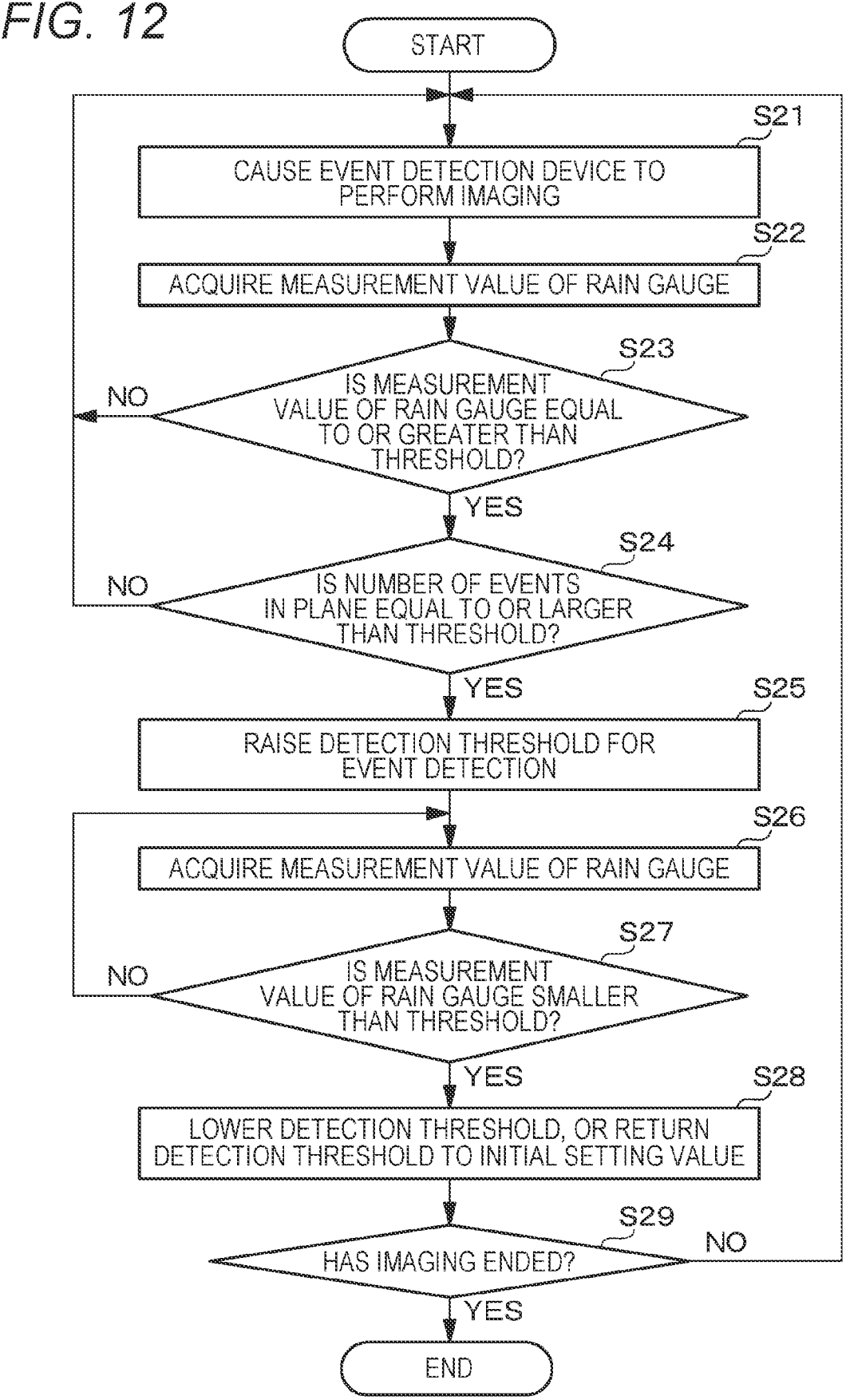
FIG. 12 is a flowchart showing an example of an event detection process according to Example 2.

Example 2 is an example in which the event detection threshold is controlled with the use of a measurement value of a rain gauge and noise information in the imaging system 1A according to the first embodiment. An example flow in an event detection process according to Example 2 is shown in a flowchart in FIG. 12. The event detection process according to Example 2 is an example process according to a control method of the present disclosure, by which the detection sensitivity of the event detection being performed by the event detection device is controlled on the basis of external information.

The controller 30 sets a predetermined initial setting value as the event detection threshold, and causes the event detection device 10 to perform imaging (step S21). While imaging is being performed by the event detection device 10, the controller 30 acquires a measurement value of the rain gauge provided as external information (step S22), and then determines whether or not the measurement value of the rain gauge is equal to or greater than a predetermined threshold (step S23). If the measurement value is neither equal to nor greater than the predetermined threshold (NO in S23), the process returns to step S21, and the imaging by the event detection device 10 continues.

If the measurement value of the rain gauge is equal to or greater than the predetermined threshold (YES in S23), the controller 30 then determines whether or not the number of events in the plane (the number of detected events) is equal to or larger than a predetermined threshold (step S24). If the number of events in the plane is neither equal to nor larger than the threshold (NO in S24), the controller 30 returns to step S21, and causes the event detection device 10 to continue the imaging. Here, "in the plane" means within the imaging area corresponding to the angle of view of the event detection device 10 or within a specific area within the imaging area.

If the number of events in the plane is equal to or larger than the threshold (YES in S24), the controller 30 performs control to raise the detection threshold for the event detection unit 63 by a certain value, for example (step S25). That is, in a case where the measurement value of the rain gauge is equal to or greater than the threshold, and the number of events in the plane is equal to or greater than the threshold, it is determined that there is a large amount of rain, and there is a high possibility that generation of a large number of water droplets or the like will turn into noise for an object (a vehicle, a pedestrian, or the like) originally desired to be detected as an event by the event detection device 10.

Therefore, the controller 30 performs control to raise the detection threshold for the event detection unit 63 (step S25), to change the detection sensitivity of the event detection (the gain of the event detection device 10) to such sensitivity that generation of water droplets or the like is not detected as noise. Even after the event detection threshold is raised, the imaging by the event detection device 10 is continued, and, in the event detection device 10, an event detection process is performed with the detection sensitivity changed by the controller 30.

The controller 30 again acquires a measurement value of the rain gauge (step S26), and then determines whether or not the measurement value of the rain gauge is smaller than the predetermined threshold (step S27). If the measurement value of the rain gauge is still equal to or greater than the predetermined threshold (NO in S27), the controller 30 returns to step S26, and repeats the acquisition of a measurement value of the rain gauge. If the controller 30 determines the measurement value of the rain gauge to be smaller than the predetermined threshold (YES in S27), the controller 30 then performs control to lower the event detection threshold by a predetermined value or return the event detection threshold to the initial setting value (step S28).

After performing the control to lower the event detection threshold or return the event detection threshold to the initial setting value, the controller 30 determines whether or not the imaging by the event detection device 10 has ended (step S29). If the imaging has not ended yet (NO in S29), the controller 30 returns to step S21, and repeats the series of processes described above. If the imaging by the event detection device 10 has ended (YES in S29), the controller 30 ends the series of processes for event detection.

Example Configuration of an Object Recognition System According to the First Embodiment Next, an object recognition system according to the first embodiment that performs object recognition using the imaging system 1A according to the first embodiment having the above configuration is described. Like the imaging system 1A according to the first embodiment, an object recognition system according to the first embodiment can be mounted on a mobile unit such as a vehicle and be used for object recognition in an event.

Figure 13:
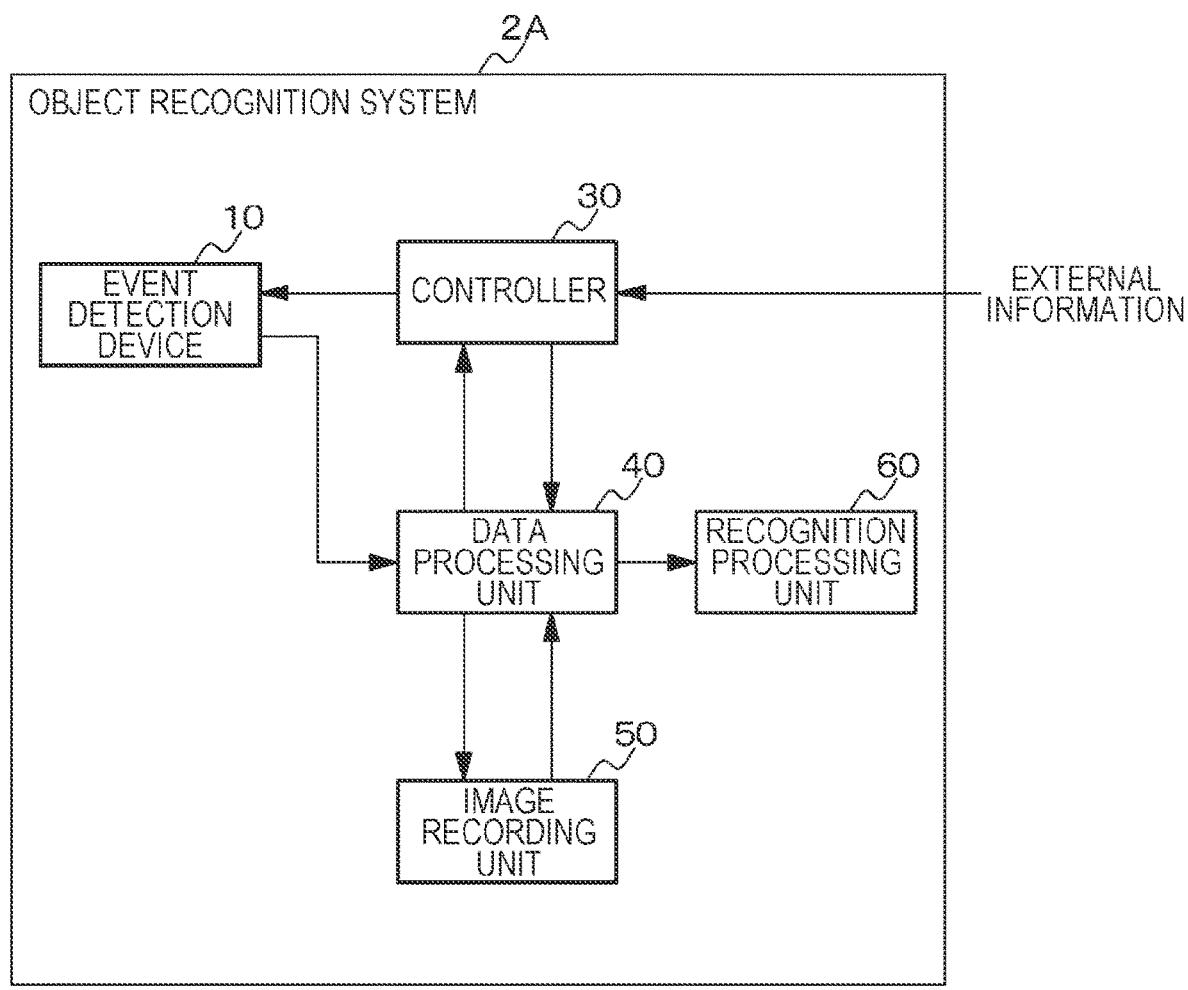
FIG. 13 is a block diagram showing an example system configuration of an object recognition system according to the first embodiment.

FIG. 13 is a block diagram showing an example system configuration of an object recognition system according to the first embodiment.

As shown in FIG. 13, an object recognition system 2A according to the first embodiment includes a recognition processing unit 60, in addition to the event detection device 10, the controller 30, the data processing unit 40, and the image recording unit 50 in the imaging system 1A according to the first embodiment shown in FIG. 1. Details of the event detection device 10, the controller 30, the data processing unit 40, and the image recording unit 50 are as described above.

In the object recognition system 2A according to the first embodiment having the configuration described above, event data processed by the data processing unit 40 is supplied to the recognition processing unit 60. The recognition processing unit 60 performs a process of object recognition in an event, on the basis of the event data supplied from the data processing unit 40. In the object recognition by the recognition processing unit 60, it is possible to use a known pattern recognition technique, such as a technique for performing image recognition by comparing the feature points of an image provided as teacher data with the feature points of a captured image of the object, for example.

Example 3

Figure 14:
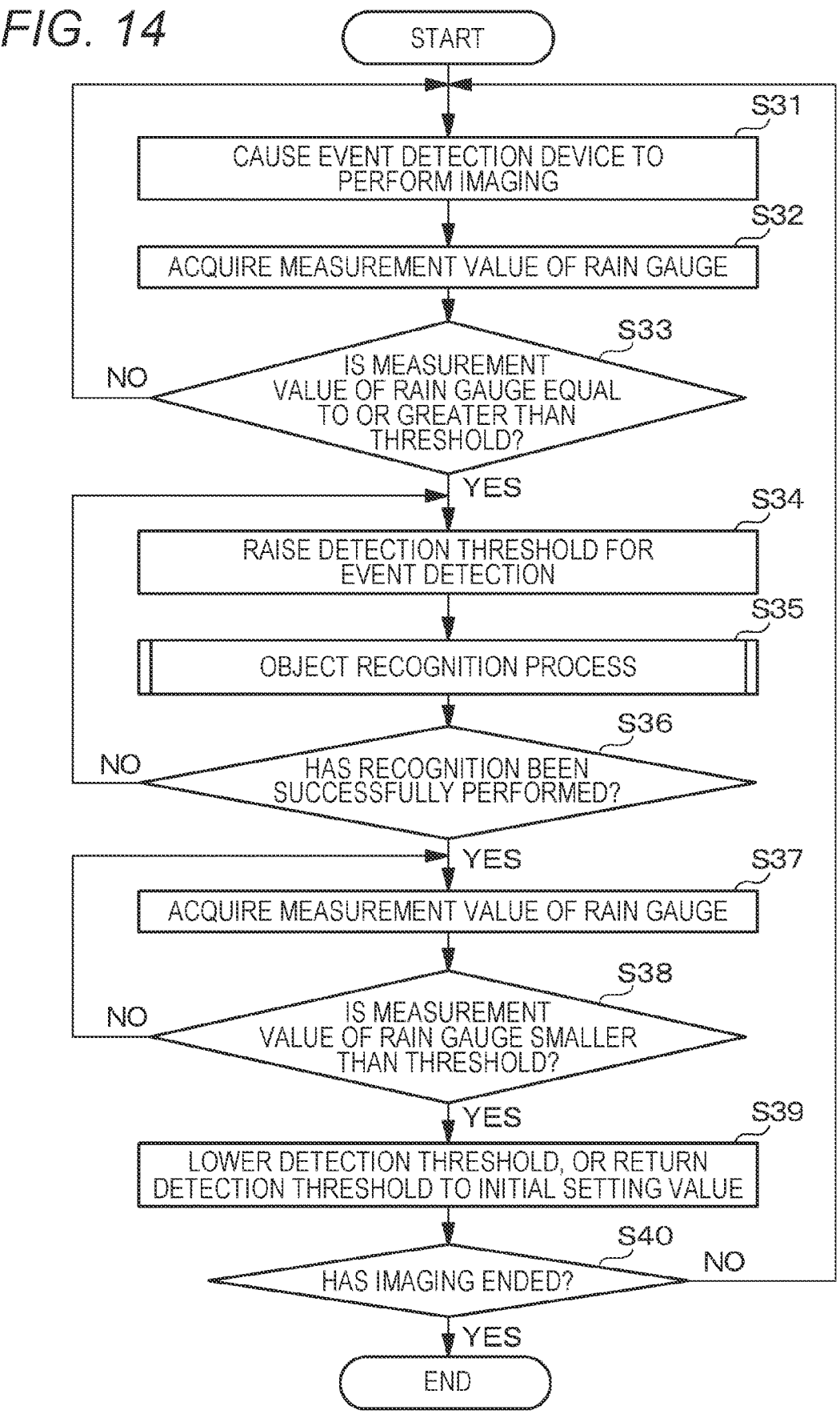
FIG. 14 is a flowchart showing an example of an event detection process according to Example 3.

Example 3 is an example in which an object recognition result is reflected by the control of the event detection threshold in the object recognition system 2A according to the first embodiment. An example flow in an event detection process according to Example 3 is shown in a flowchart in FIG. 14. The event detection process according to Example 3 is an example process according to a control method of the present disclosure, by which the detection sensitivity of the event detection being performed by the event detection device is controlled on the basis of external information.

The controller 30 sets a predetermined initial setting value as the event detection threshold, and causes the event detection device 10 to perform imaging (step S31). While imaging is being performed by the event detection device 10, the controller 30 acquires a measurement value of the rain gauge provided as external information (step S32), and then determines whether or not the measurement value of the rain gauge is equal to or greater than a predetermined threshold (step S33). If the measurement value is neither equal to nor greater than the predetermined threshold (NO in S33), the process returns to step S31, and the imaging by the event detection device 10 continues.

If the measurement value of the rain gauge is equal to or greater than the predetermined threshold (YES in S33), the controller 30 performs control to raise the event detection threshold (step S34), to change the detection sensitivity for event detection to such sensitivity that generation of water droplets or the like is not detected as noise. Even after the event detection threshold is raised, the imaging by the event detection device 10 is continued, and, in the event detection device 10, event detection is performed with the detection sensitivity changed by the controller 30.

Next, the controller 30 performs an object recognition process on the basis of event data indicating the occurrence of an event output from the event detection device 10 (step S35), and then determines whether or not the object recognition has been successfully completed (step S36). A specific example of the object recognition process in step S35 will be described later. Whether or not the object recognition has been successfully completed can be determined depending on whether or not the region of the vehicle with respect to the angle of view is equal to or larger than a certain proportion, for example.

If the object recognition has failed (NO in S36), the controller 30 returns to step S34, and performs control to raise the event detection threshold. That is, a loop process from step S34 to step S35 to step S36 to step S34 is performed, so that control is performed to raise the event detection threshold to a value within the range in which the object can be recognized. As the event detection threshold is raised, the influence of noise caused by water droplets or the like can be reduced.

If the object recognition has been successfully completed (YES in S36), the controller 30 acquires a measurement value of the rain gauge (step S37), and then determines whether or not the measurement value of the rain gauge is smaller than the predetermined threshold (step S38). If the measurement value of the rain gauge is still equal to or greater than the predetermined threshold (NO in S38), the controller 30 returns to step S37, and repeats the acquisition of a measurement value of the rain gauge. If the controller 30 determines the measurement value of the rain gauge to be smaller than the predetermined threshold (YES in S38), the controller 30 then performs control to lower the event detection threshold by a predetermined value or return the event detection threshold to the initial setting value (step S39).

After performing the control to lower the event detection threshold or return the event detection threshold to the initial setting value, the controller 30 determines whether or not the imaging by the event detection device 10 has ended (step S40). If the imaging has not ended yet (NO in S40), the controller 30 returns to step S41, and repeats the series of processes described above. If the imaging by the event detection device 10 has ended (YES in S40), the controller 30 ends the series of processes for event detection.

Figure 15:
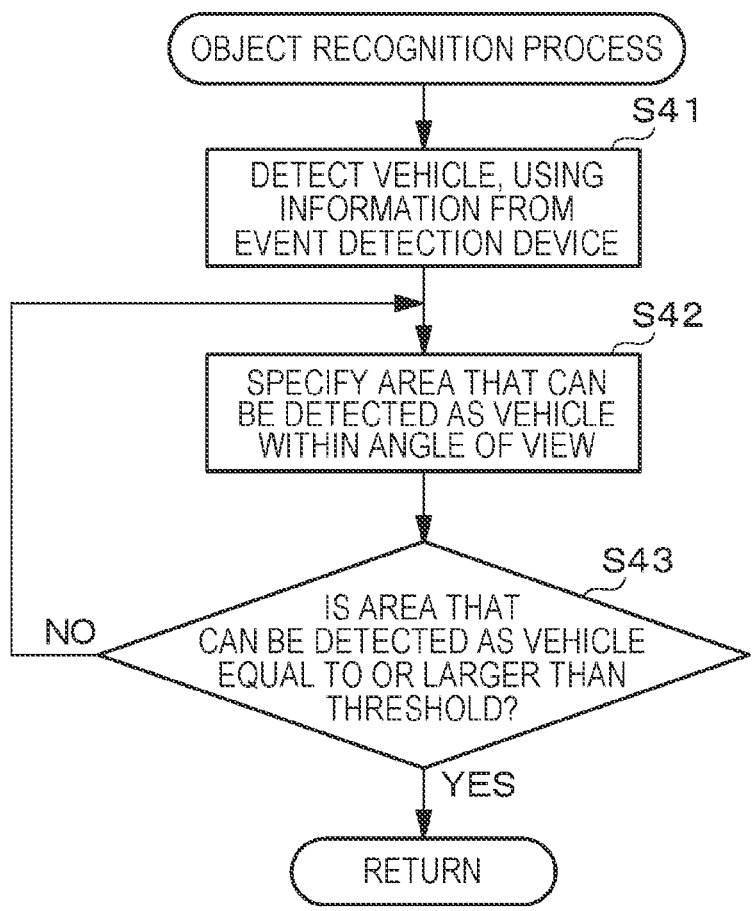
FIG. 15 is a flowchart showing a specific example in which an object recognition process is performed only with the event detection device.

FIG. 15 is a flowchart showing an example process in a specific example of the object recognition process in step S35.

The controller 30 detects an object, such as a vehicle, for example, using information (event data indicating the occurrence of an event, for example) from the event detection device 10 (step S41), and then performs process of specifying the area can be detected as the vehicle within the angle of view (step S42). Next, the controller 30 determines whether or not the area that can be detected as the vehicle is equal to or larger than a predetermined threshold (step S43). If the area is smaller than the predetermined threshold (NO in S43), the controller 30 returns to the process in step S42. If the area is equal to or larger than the predetermined threshold (YES in S43), the controller 30 recognizes the area as the vehicle (object), returns to the flow shown in FIG. 14, and proceeds to the process in step S36.

Note that Example 3 described above is an example case where a technique for causing an object recognition result to be reflected by the control of the event detection threshold is applied to Example 1 in which the event detection threshold is controlled on the basis of a measurement value of a rain gauge. However, the technique of Example 3 can also be applied to Example 2 in which the event detection threshold is controlled with the use of a measurement value of the rain gauge and noise information.

Second Embodiment of the Present Disclosure

Example Configuration of an Imaging System According to the Second Embodiment

Figure 16:
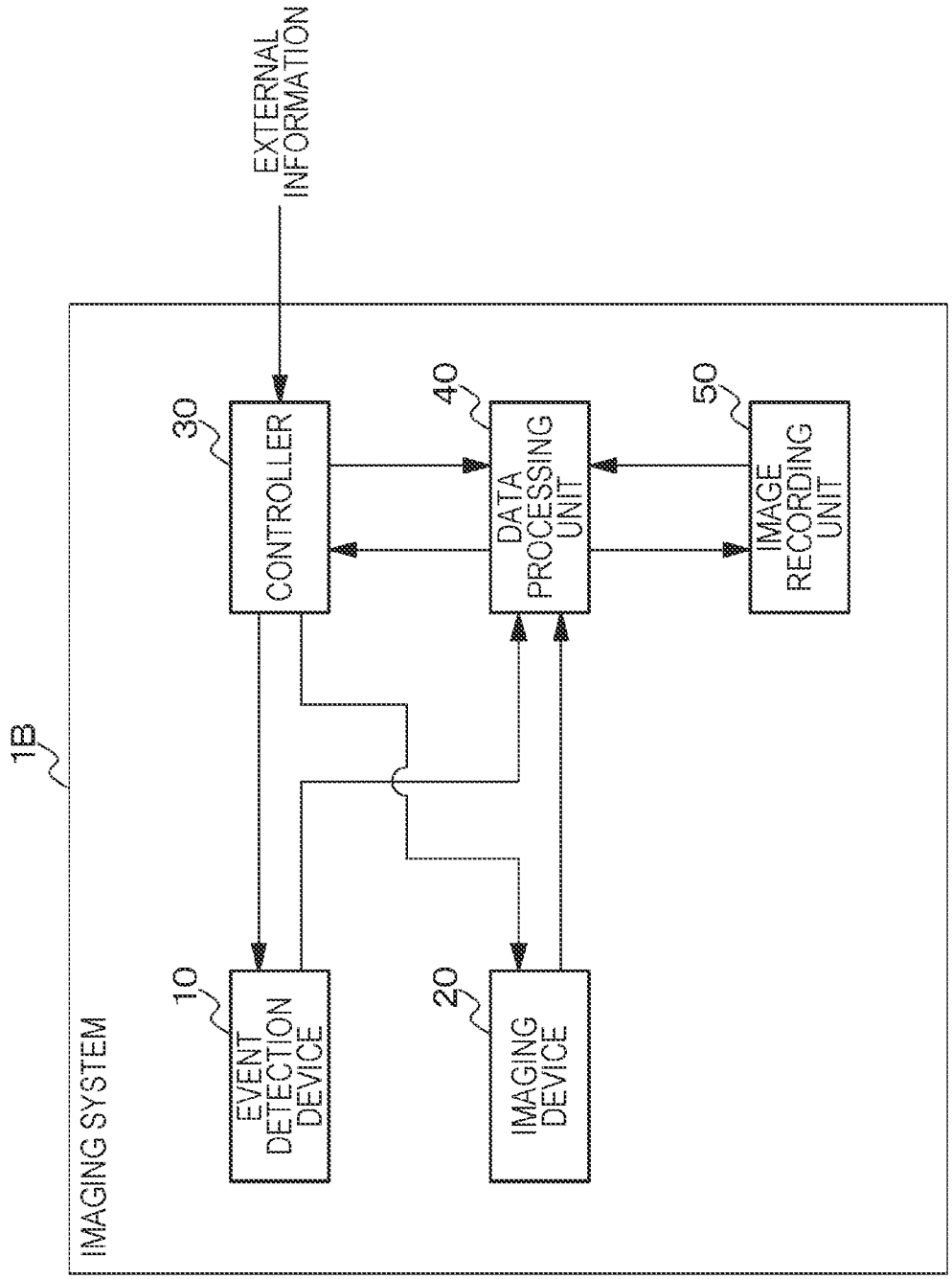
FIG. 16 is a block diagram showing an example system configuration of an imaging system according to a second embodiment of the present disclosure.

FIG. 16 is a block diagram showing an example system configuration of an imaging system according to a second embodiment of the present disclosure.

As shown in FIG. 16, an imaging system 1B according to the second embodiment of the present disclosure includes an event detection device 10, an imaging device 20, a controller 30, a data processing unit 40, and an image recording unit 50. The event detection device 10, the controller 30, the data processing unit 40, and the image recording unit 50 are as explained above in the description of the imaging system 1A according to the first embodiment.

The imaging device 20 can be a synchronous imaging device that performs imaging at a fixed frame rate in synchronization with a vertical synchronization signal, and outputs image data in a frame format. Note that the synchronous imaging device can be a complementary metal oxide semiconductor (CMOS) image sensor, a charge coupled device (CCD) image sensor, or the like, for example.

Example Configuration of the Imaging Device

The basic configuration of the imaging device 20 in the imaging system 1B according to the second embodiment is now described. In this explanation, the imaging device 20 is a CMOS image sensor that is a kind of X-Y address imaging device, for example. A CMOS image sensor is an image sensor manufactured by applying a CMOS process or partially using a CMOS process. However, the imaging device 20 is not necessarily a CMOS image sensor.

Example Configuration of a CMOS Image Sensor

Figure 17:
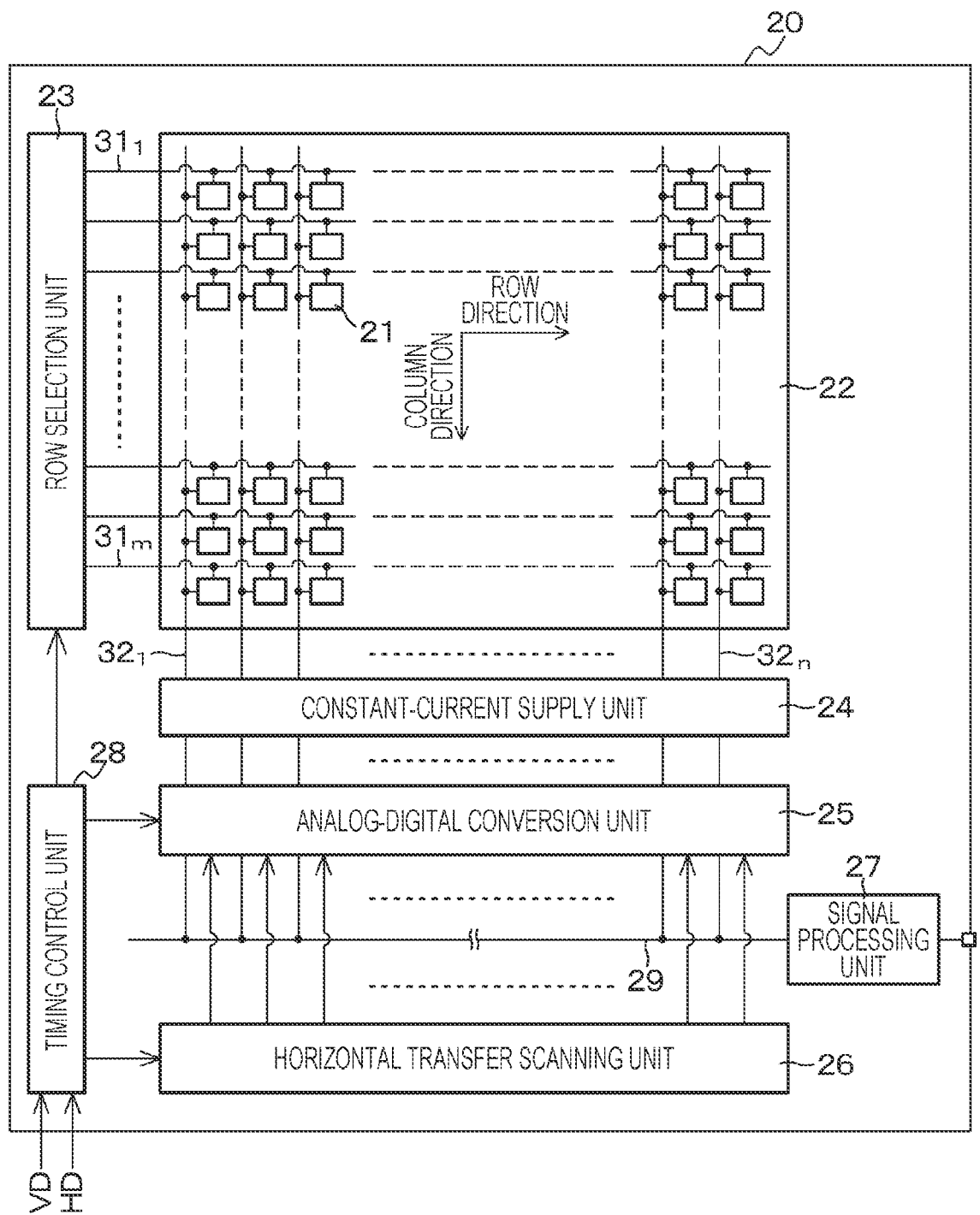
FIG. 17 is a block diagram schematically showing the configuration of a CMOS image sensor that is an example of an imaging device in the imaging system according to the second embodiment.

FIG. 17 is a block diagram schematically showing the configuration of a CMOS image sensor that is an example of the imaging device 20 in the imaging system 1B according to the second embodiment of the present disclosure.

The imaging device 20 according to this example includes a pixel array unit 22 in which pixels 21 each including a light receiving unit (photoelectric conversion unit) are two-dimensionally arranged in the row direction and the column direction, or in a matrix, and a peripheral circuit unit of the pixel array unit 22. Here, the row direction refers to the array direction of the pixels 21 in the pixel rows, and the column direction refers to the array direction of the pixels 21 in the pixel columns. A pixel 21 performs photoelectric conversion to generate and accumulate photoelectric charge corresponding to the amount of received light.

The imaging device 20 according to this example is an RGB sensor in which red (R), green (G), and blue (B) color filters are incorporated in the respective pixels 21 of the pixel array unit 22, for example. However, the imaging device 20 is not necessarily an RGB sensor.

The peripheral circuit unit of the pixel array unit 22 includes a row selection unit 23, a constant-current supply unit 24, an analog-digital conversion unit 25, a horizontal transfer scanning unit 26, a signal processing unit 27, and a timing control unit 28, for example.

In the pixel array unit 22, pixel drive lines $31_1$ to $31_m$ (hereinafter collectively referred to as the "pixel drive lines 31" in some cases) are provided in the row direction for the respective pixel rows in the matrix-like pixel array. Also, vertical signal lines $32_1$ to $32_n$ (hereinafter collectively referred to as the "vertical signal lines 32" in some cases) are provided the column direction for the respective pixel columns. The pixel drive lines 31 transmit drive signals for performing driving when signals are read from the pixels 21. In FIG. 1, each pixel drive line 31 is shown as one wiring line, but is not necessarily one wiring line. One end of each pixel drive line 31 is connected to the output end of the row selection unit 23 corresponding to the respective rows.

In the description below, the respective circuit portions of the peripheral circuit unit of the pixel array unit 22, which are the row selection unit 23, the constant-current supply unit 24, the analog-digital conversion unit 25, the horizontal transfer scanning unit 26, the signal processing unit 27, and the timing control unit 28, are explained.

The row selection unit 23 is formed with a shift register, an address decoder, and the like, and controls scanning of a pixel row and the address of the pixel row, when selecting each pixel 21 of the pixel array unit 22. The configuration of this row selection unit 23 is not specifically shown in the drawing, but normally has a configuration that includes two scanning systems: a read scanning system and a sweep scanning system.

To read pixel signals from the pixels 21, the read scanning system sequentially selects and scans each pixel 21 in the pixel array unit 22 row by row. The pixel signals to be read from the pixels 21 are analog signals. The sweep scanning system performs sweep scanning on the read row on which read scanning is to be performed by the read scanning system, prior to the read scanning by the time equivalent to the shutter speed.

Through the sweep scanning by this sweep scanning system, unnecessary electric charges are swept out of the light receiving units (photoelectric conversion units) of the pixels 21 of the read row, and thus, the light receiving units are reset. As the unnecessary electric charges are swept (reset) by the sweep scanning system, a so-called electronic shutter operation is then performed. Here, an electronic shutter operation is an operation to discard photoelectric charges of the light receiving units, and newly start exposure (start accumulating photoelectric charges).

The constant-current supply unit 24 includes a plurality of current sources I (see FIG. 18) each including a MOS transistor and connected to each of the vertical signal lines $32_1$ to $32_n$ in the respective pixel columns, for example, and supplies a bias current to each pixel 21 of the pixel row selectively scanned by the row selection unit 23 through each of the vertical signal lines $32_1$ to $32_n$.

The analog-digital conversion unit 25 includes a set of a plurality of analog-digital converters provided in accordance with the pixel columns of the pixel array unit 22 (or provided for the respective pixel columns, for example). The analog-digital conversion unit 25 is a column-parallel analog-digital conversion unit that converts analog pixel signals output through the respective vertical signal lines $32_1$ to $32_n$ for the respective pixel columns into digital signals.

Each analog-digital converter in the column-parallel analog-digital conversion unit 25 can be a single-slope analog-digital converter that is an example of a reference-signal-comparison analog-digital converter, for example. However, each analog-digital converter is not necessarily a single-slope analog-digital converter, but can be a sequential-comparison analog-digital converter, a delta-sigma-modulation (AZ-modulation) analog-digital converter, or the like.

This example of the analog-digital converters in the column-parallel analog-digital conversion unit 25 also applies to the analog-digital converters in the analog-digital conversion unit forming the column processing unit 15 (see FIG. 2) of the event detection device 10 described above.

The horizontal transfer scanning unit 26 is formed with a shift register, an address decoder, and the like, and controls scanning of a pixel column and the address of the pixel column, when reading a signal from each pixel 21 in the pixel array unit 22. Under the control of the horizontal transfer scanning unit 26, the pixel signals converted into digital signals by the analog-digital conversion unit 25 are read out to a horizontal transfer line (horizontal output line) 29 on a pixel column basis.

The signal processing unit 27 performs predetermined signal processing on the digital pixel signals supplied through the horizontal transfer line 29, to generate two-dimensional image data. For example, the signal processing unit 27 corrects a vertical line defect or a point defect, clamps signals, or performs digital signal processing such as parallel-serial conversion, compression, encoding, adding, averaging, and intermittent operation. The signal processing unit 27 outputs the generated image data as an output signal of the imaging device 20, to a device in a later stage.

The timing control unit 28 generates various kinds of timing signals, clock signals, control signals, and the like, on the basis of a vertical synchronization signal VD and a horizontal synchronization signal HD supplied from the outside, as well as a master clock MCK (not shown) and the like. On the basis of these generated signals, the timing control unit 28 then performs drive control on the row selection unit 23, the constant-current supply unit 24, the analog-digital conversion unit 25, the horizontal transfer scanning unit 26, the signal processing unit 27, and the like.

Under the control of the timing control unit 28, the imaging device 20 performs imaging in synchronization with a synchronization signal such as the vertical synchronization signal VD. That is, the imaging device 20 is a synchronous imaging device that performs imaging at a fixed frame rate.

Example Circuit Configuration of a Pixel

Figure 18:
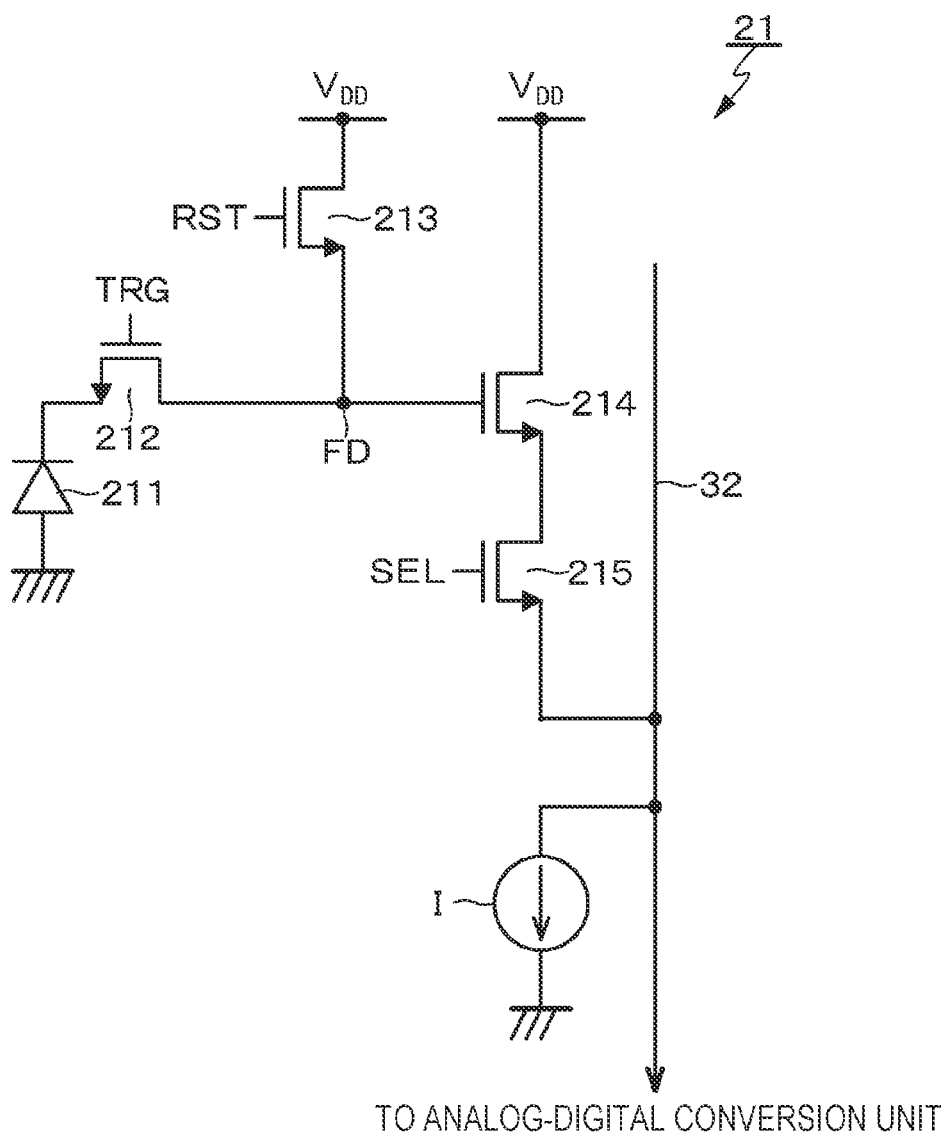
FIG. 18 is a circuit diagram showing an example circuit configuration of a pixel in the imaging device.

FIG. 18 is a circuit diagram showing an example circuit configuration of a pixel 21 of the pixel array unit 22 in the imaging device 20.

The pixel 21 includes a photodiode 211 as a light receiving unit (photoelectric conversion unit), for example. The pixel 21 has a pixel configuration that includes a transfer transistor 212, a reset transistor 213, an amplification transistor 214, and a selection transistor 215, in addition to the photodiode 211.

Note that, although N-type MOS transistors are used as the four transistors of the transfer transistor 212, the reset transistor 213, the amplification transistor 214, and the selection transistor 215 in this example, the combination of the conductivity types of the four transistors 212 to 215 shown herein is merely an example, and is not limited to this combination.

For this pixel 21, a plurality of pixel drive lines is provided as the above pixel drive lines 31 for the respective pixels 21 in the same pixel row. The plurality of pixel drive lines is connected, on a pixel row basis, to the output ends of the row selection unit 23 corresponding to the respective pixel rows. The row selection unit 23 outputs a transfer signal TRG, a reset signal RST, and a selection signal SEL to the plurality of pixel drive lines, as appropriate.

In the photodiode 211, the anode electrode is connected to a power supply on the lower potential side (the ground, for example), received light (incident light) is photoelectrically converted into photoelectric charge (photoelectrons herein) with a charge amount corresponding to the light amount, and the photoelectric charge is accumulated. The cathode electrode of the photodiode 211 is electrically connected to the gate electrode of the amplification transistor 214 via the transfer transistor 212. Here, the region to which the gate electrode of the amplification transistor 214 is electrically connected is a floating diffusion (floating diffusion region/impurity diffusion region) FD. The floating diffusion FD is a charge-voltage conversion unit that converts electric charge into voltage.

The transfer signal TRG that is active at the high level (the $V_{DD}$ level, for example) is supplied from the row selection unit 23 to a gate electrode of the transfer transistor 212. The transfer transistor 212 enters an on-state in response to the transfer signal TRG, and transfers the photoelectric charge that has been photoelectrically converted by the photodiode 211 and is accumulated in the photodiode 211, to the floating diffusion FD.

The reset transistor 213 is connected between the power supply line of the power supply voltage $V_{DD}$ and the floating diffusion FD. To the gate electrode of the reset transistor 213, the reset signal RST that is high at the high level is supplied from the row selection unit 23. The reset transistor 213 enters an on-state in response to the reset signal RST, and resets the floating diffusion FD by discarding the electric charge in the floating diffusion FD to a node of the power supply voltage $V_{DD}$.

The gate electrode of the amplification transistor 214 is connected to the floating diffusion FD, and the drain electrode is connected to the power supply line of the power supply voltage $V_{DD}$. The amplification transistor 214 serves as an input unit of a source follower that reads a signal obtained through photoelectric conversion performed by the photodiode 211. The source electrode of the amplification transistor 214 is connected to the vertical signal line 32 via the selection transistor 215. The amplification transistor 214 and the current source I connected to one end of the vertical signal line 32 then constitute a source follower that converts the voltage of the floating diffusion FD into the potential of the vertical signal line 32.

The selection transistor 215 has its drain electrode connected to the source electrode of the amplification transistor 214, and its source electrode connected to the vertical signal line 32. The selection signal SEL that is active at the high level is supplied from the row selection unit 23 to the gate electrode of the selection transistor 215. The selection transistor 215 enters an on-state in response to the selection signal SEL, to put the pixel 21 into a selected state and transmit a signal output from the amplification transistor 214 to the vertical signal line 32.

Note that a 4Tr configuration formed with the four transistors (Tr) of the transfer transistor 212, the reset transistor 213, the amplification transistor 214, and the selection transistor 215 has been described as an example of the pixel circuit of a pixel 21, but this embodiment is not limited this example. For example, the selection transistor 215 may be excluded, and the amplification transistor 214 may be provided with the functions of the selection transistor 25 so that a 3Tr configuration is formed. If necessary, the number of transistors may be increased to form a 5Tr or higher configuration.

Example Configuration of a Chip Structure

The chip (semiconductor integrated circuit) structure of the imaging device 20 having the above configuration can be a flat chip structure or a stacked chip structure, for example. In the imaging device 20 having either a flat chip structure or a stacked chip structure, when the substrate face on which the wiring layers are disposed is the front surface (the front face), the pixel 21 can have a front-illuminated pixel structure that captures light emitted from the front surface side, or can have a back-illuminated pixel structure that captures light emitted from the back surface side, which is the opposite side from the front surface side. In the description below, a flat chip structure and a stacked chip structure are explained.

(Flat Chip Structure)

Figure 19:
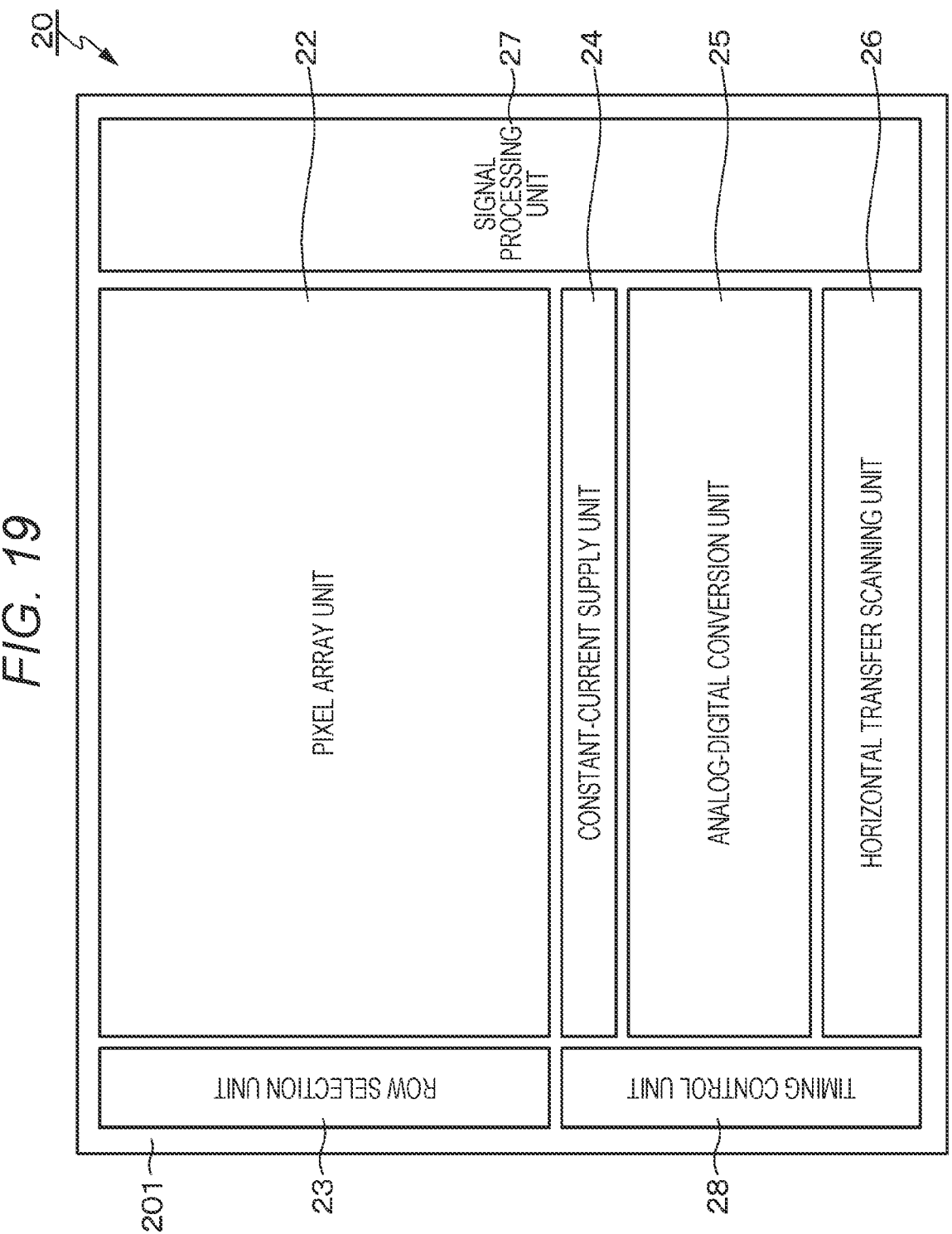
FIG. 19 is a plan view schematically showing a flat chip structure of the imaging device.

FIG. 19 is a plan view schematically showing a flat chip structure of the imaging device 20.

As shown in FIG. 19, a flat chip structure (a so-called flat structure) is a structure in which the circuit portions around the pixel array unit 22 are formed on the same semiconductor substrate 201 as that of the pixel array unit 22 in which the pixels 21 are arranged in a matrix. Specifically, the row selection unit 23, the constant-current supply unit 24, the analog-digital conversion unit 25, the horizontal transfer scanning unit 26, the signal processing unit 27, the timing control unit 28, and the like are formed on the same semiconductor substrate 201 as that of the pixel array unit 22.

(Stacked Chip Structure)

Figure 20:
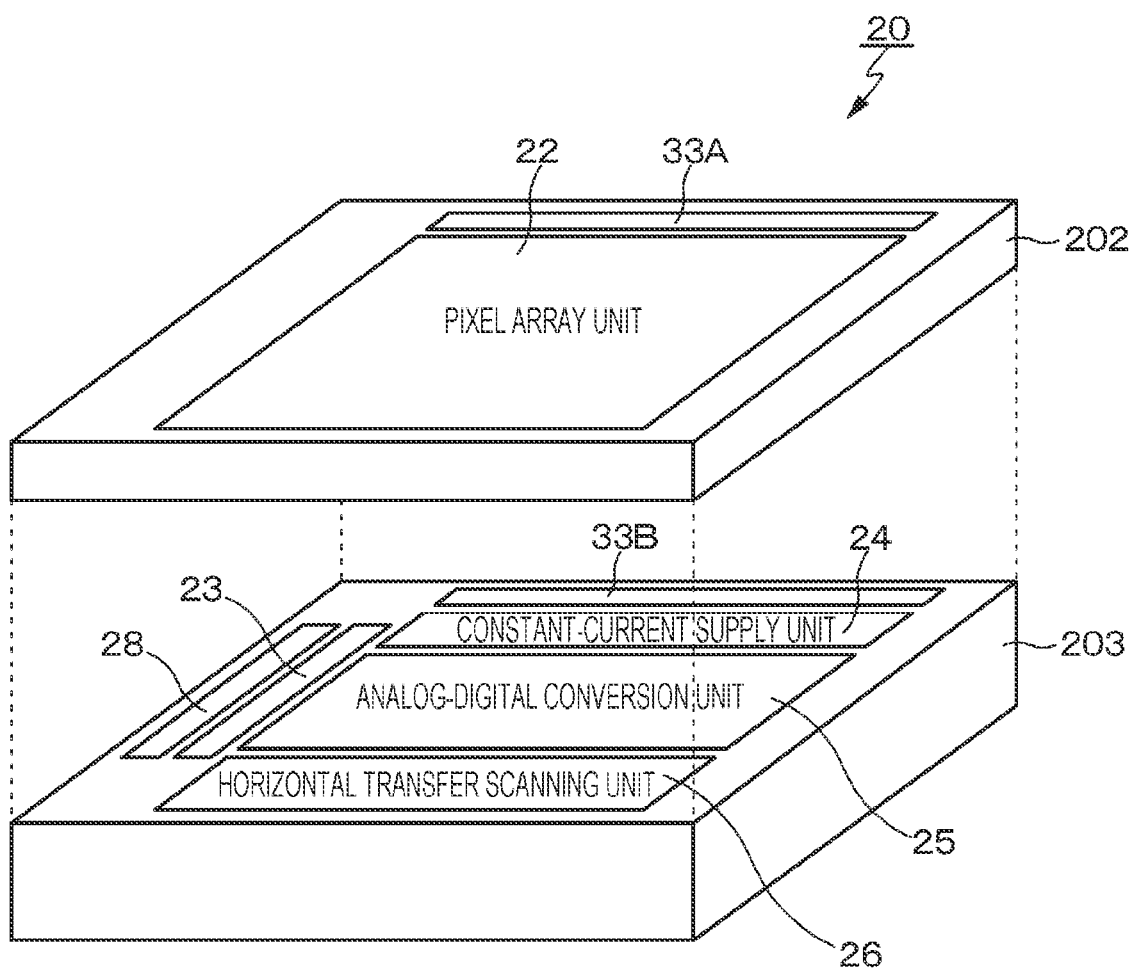
FIG. 20 is a plan view schematically showing a stacked chip structure of the imaging device.

FIG. 20 is an exploded perspective view schematically showing a stacked chip structure of the imaging device 20.

As shown in FIG. 20, a stacked chip structure (a so-called stack structure) is a structure in which at least two semiconductor substrates including a first semiconductor substrate 202 and a second semiconductor substrate 203 are stacked. In this stack structure, the pixel array unit 22 is formed on the first semiconductor substrate 202 that is the first layer. Further, the circuit portions such as the row selection unit 23, the constant-current supply unit 24, the analog-digital conversion unit 25, the horizontal transfer scanning unit 26, the signal processing unit 27, and the timing control unit 28 are formed on the second semiconductor substrate 203 that is the second layer. Further, the first semiconductor substrate 202 as the first layer and the second semiconductor substrate 203 as the second layer are electrically connected through connecting portions 33A and 33B such as vias or Cu—Cu joints.

With the imaging device 20 having this stack structure, a process suitable for manufacturing the pixels 21 can be applied to the first semiconductor substrate 202 as the first layer, and a process suitable for manufacturing the circuit portions can be applied to the second semiconductor substrate 203 as the second layer. Thus, the process can be optimized in manufacturing the imaging device 20. In particular, a state-of-the-art process can be adopted in manufacturing the circuit portions.

Note that, although a stack structure having a two-layer structure formed by stacking the first semiconductor substrate 202 and the second semiconductor substrate 203 has been described as an example, the stack structure is not necessarily a two-layer structure, but may be a structure formed with three or more layers. Further, in the case of a stack structure formed with three or more layers, the circuit portions such as the row selection unit 23, the constant-current supply unit 24, the analog-digital conversion unit 25, the horizontal transfer scanning unit 26, and the signal processing unit 27 can be formed in a distributed manner on the semiconductor substrates of the second and subsequent layers.

Example System Configuration of an Object Recognition System According to the Second Embodiment Next, an object recognition system according to the second embodiment that performs object recognition using the imaging system 1B according to the second embodiment having the above configuration is described. Like the imaging system 1B according to the second embodiment, an object recognition system according to the second embodiment can be mounted on a mobile unit such as a vehicle and be used for object recognition in an event.

Figure 21:
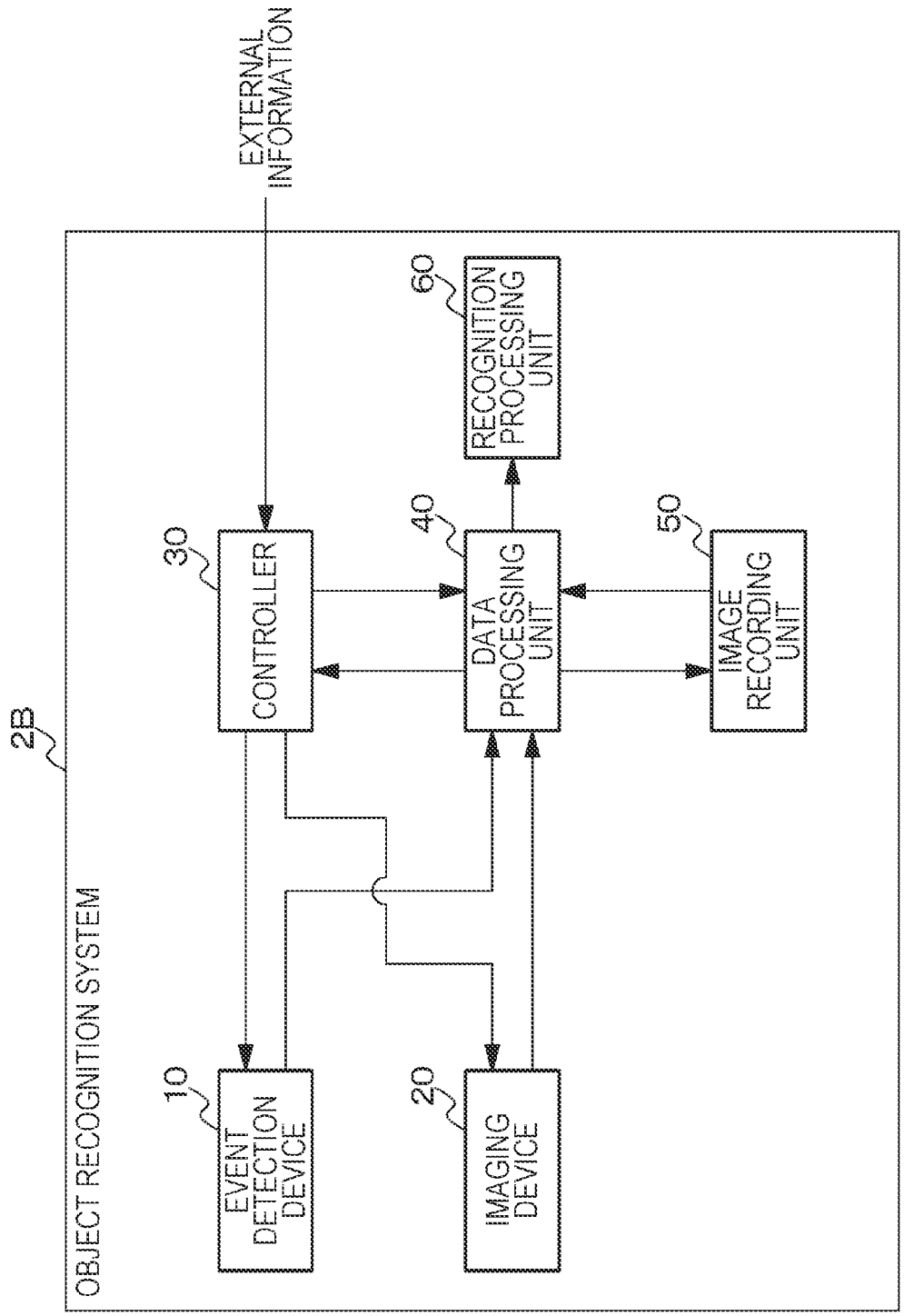
FIG. 21 is a block diagram showing an example system configuration of an object recognition system according to the second embodiment.

FIG. 21 is a block diagram showing an example system configuration of an object recognition system according to the second embodiment.

As shown in FIG. 21, an object recognition system 2B according to the second embodiment includes a recognition processing unit 60, in addition to the event detection device 10, the imaging device 20, the controller 30, the data processing unit 40, and the image recording unit 50 in the imaging system 1B according to the second embodiment shown in FIG. 16. Details of the event detection device 10, the imaging device 20, the controller 30, the data processing unit 40, and the image recording unit 50 are as described above.

In the object recognition system 2B according to the second embodiment having the above configuration, event data that is output from the event detection device 10, and image data that is output from the imaging device 20 are subjected to predetermined data processing in the data processing unit 40, and are then supplied to the recognition processing unit 60. The recognition processing unit 60 performs a process of object recognition in an event, on the basis of the event data or the image data supplied from the data processing unit 40. In the object recognition by the recognition processing unit 60, it is possible to use a known pattern recognition technique, such as a technique for performing image recognition by comparing the feature points of an image provided as teacher data with the feature points of a captured image of the object, for example.

In the description below, a specific example of event detection to be performed in the object recognition system 2B according to the second embodiment having the above configuration will be explained. In the object recognition system 2B according to the second embodiment, an object recognition process for an object such as a vehicle is performed on the basis of event data that is output from the event detection device 10, and image data that is output from the imaging device 20.

Note that the event detection device 10 formed with an asynchronous imaging device has a pixel configuration including an event detection unit 63. Therefore, the pixel size in the event detection device 10 has to be larger than that in the synchronous imaging device 20, and therefore, the resolution of the event detection device 10 is lower than that of the imaging device 20 that performs imaging at a fixed frame rate. On the other hand, the imaging device 20 formed with a synchronous imaging device has a higher resolution than that of an asynchronous imaging device.

Example 4

Figure 22:
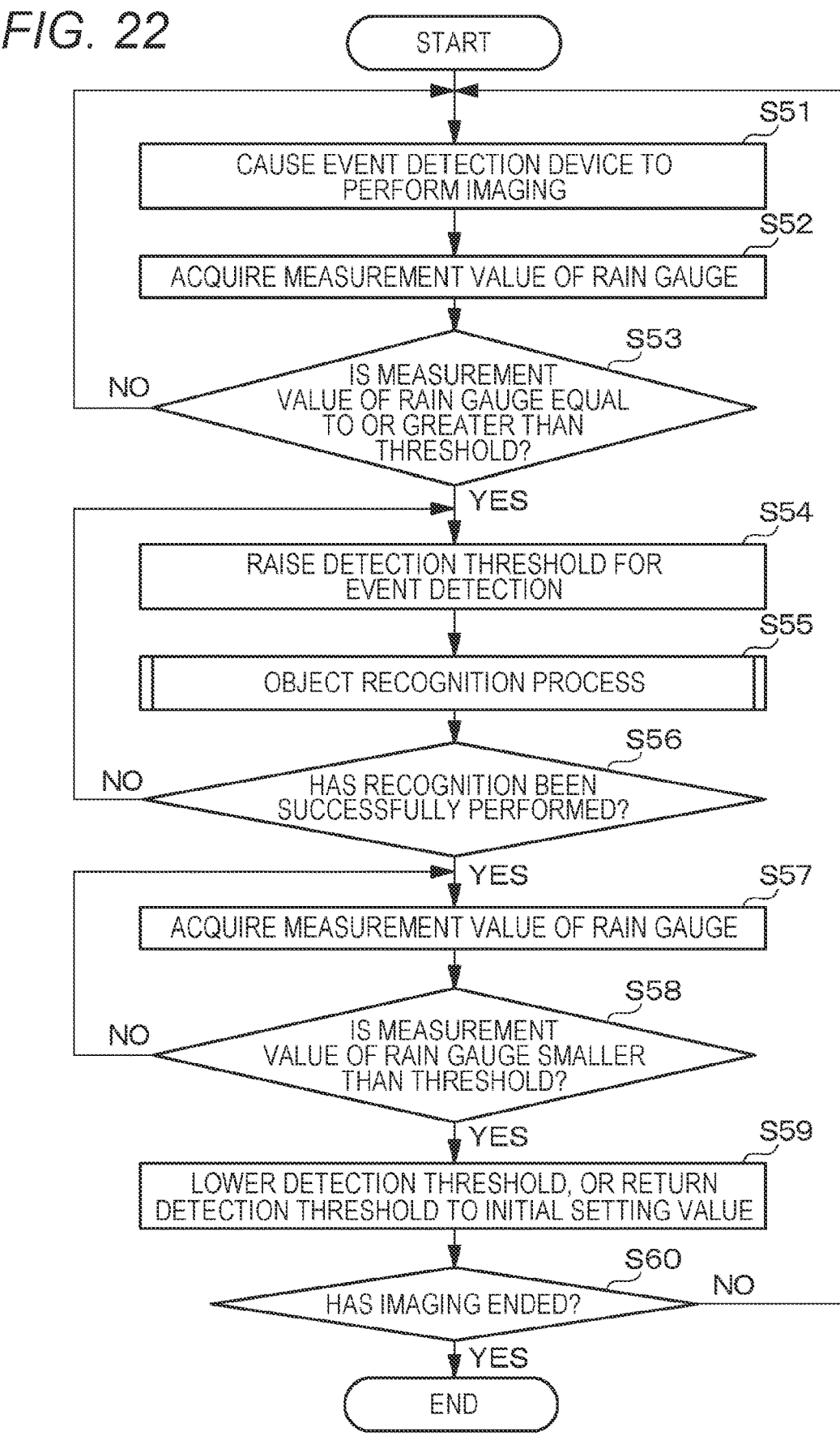
FIG. 22 is a flowchart showing an example of an event detection process according to Example 4.

Example 4 is an example in which an object recognition result is reflected by the control of the event detection threshold in the object recognition system 2B according to the second embodiment. An example flow in an event detection process according to Example 4 is shown in a flowchart in FIG. 22.

The controller 30 sets a predetermined initial setting value as the event detection threshold, and causes the event detection device 10 to perform imaging (step S51). While imaging is being performed by the event detection device 10, the controller 30 acquires a measurement value of the rain gauge provided as external information (step S52), and then determines whether or not the measurement value of the rain gauge is equal to or greater than a predetermined threshold (step S53). If the measurement value is neither equal to nor greater than the predetermined threshold (NO in S53), the process returns to step S51, and the imaging by the event detection device 10 continues.

If the measurement value of the rain gauge is equal to or greater than the predetermined threshold (YES in S53), the controller 30 performs control to raise the event detection threshold (step S54), to change the detection sensitivity for event detection to such sensitivity that generation of water droplets or the like is not detected as noise. Even after the event detection threshold is raised, the imaging by the event detection device 10 is continued, and, in the event detection device 10, event detection is performed with the detection sensitivity changed by the controller 30.

Next, the controller 30 performs an object recognition process for determining whether or not the region of the vehicle with respect to the angle of view is equal to or larger than a certain proportion (step S55), and then determines whether or not the object recognition has been successfully completed (step S56). If the object recognition fails (NO in S56), the controller 30 returns to step S54, and performs control to raise the event detection threshold. That is, a loop process from step S54 to step S55 to step S56 to step S54 is performed, so that control is performed to raise the event detection threshold to a value within the range in which the object can be recognized. As the event detection threshold is raised, the influence of noise caused by water droplets or the like can be reduced. A specific example of the object recognition process in step S55 will be described later.

If the object recognition has been successfully completed (YES in S56), the controller 30 acquires a measurement value of the rain gauge (step S57), and then determines whether or not the measurement value of the rain gauge is smaller than the predetermined threshold (step S58). If the measurement value of the rain gauge is still equal to or greater than the predetermined threshold (NO in S58), the controller 30 returns to step S57, and repeats the acquisition of a measurement value of the rain gauge. If the controller 30 determines that the measurement value of the rain gauge is smaller than the predetermined threshold, and the weather has recovered (YES in S58), the controller 30 then performs control to lower the event detection threshold or return the event detection threshold to the initial setting value (step S59).

After performing the control to lower the event detection threshold or return the event detection threshold to the initial setting value, the controller 30 determines whether or not the imaging by the event detection device 10 has ended (step S60). If the imaging has not ended yet (NO in S60), the controller 30 returns to step S51, and repeats the series of processes described above. If the imaging by the event detection device 10 has ended (YES in S60), the controller 30 ends the series of processes for event detection.

Figure 23:
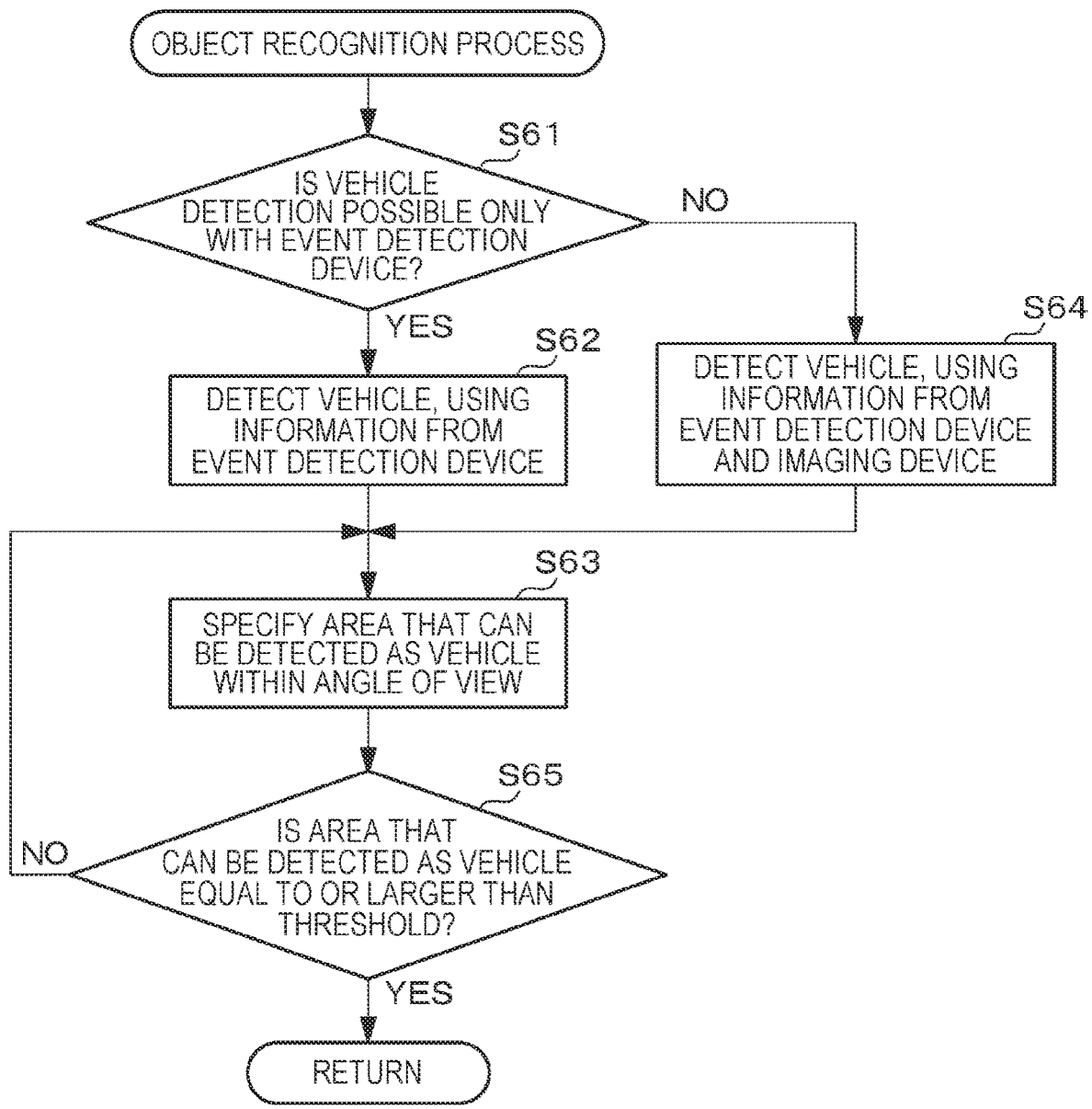
FIG. 23 is a flowchart showing a specific example in which an object recognition process is performed with an event detection device and the imaging device.

FIG. 23 is a flowchart showing a specific example of the object recognition process in step S55.

The controller 30 determines whether or not the object, which is a vehicle, for example, can be detected only with information from the event detection device 10 formed with an asynchronous imaging device (step S61). If the object can be detected (YES in S61), the object, which is a vehicle, for example, is detected with the use of information (event data indicating the occurrence of an event, for example) from the event detection device 10 (step S62).

Next, the controller 30 specifies the area that can be detected as the vehicle within the angle of view (step S63). If it is not possible to detect the vehicle only with the event detection device 10 (NO in S61), the controller 30 detects the vehicle, using the information from the event detection device 10 and information from the imaging device 20 having a higher resolution than that of the event detection device 10 (step S64), and after that, proceeds to the process in step S63.

Next, the controller 30 determines whether or not the area that can be detected as the vehicle is equal to or larger than a predetermined threshold (step S65). If the area is smaller than the predetermined threshold (NO in S65), the controller 30 returns to the process in step S63. If the area is equal to or larger than the predetermined threshold (YES in S65), the controller 30 recognizes the area as the vehicle (object), returns to the flow shown in FIG. 22, and proceeds to the process in step S56.

As described above, in a case where a vehicle cannot be detected only with the event detection device 10 in an object recognition process, the imaging device 20 that has a higher resolution than that of an asynchronous imaging device is used. Thus, an object recognition process can be performed with higher accuracy, even in the case of bad weather such as rainy weather, for example.

Example 5

Figure 24:
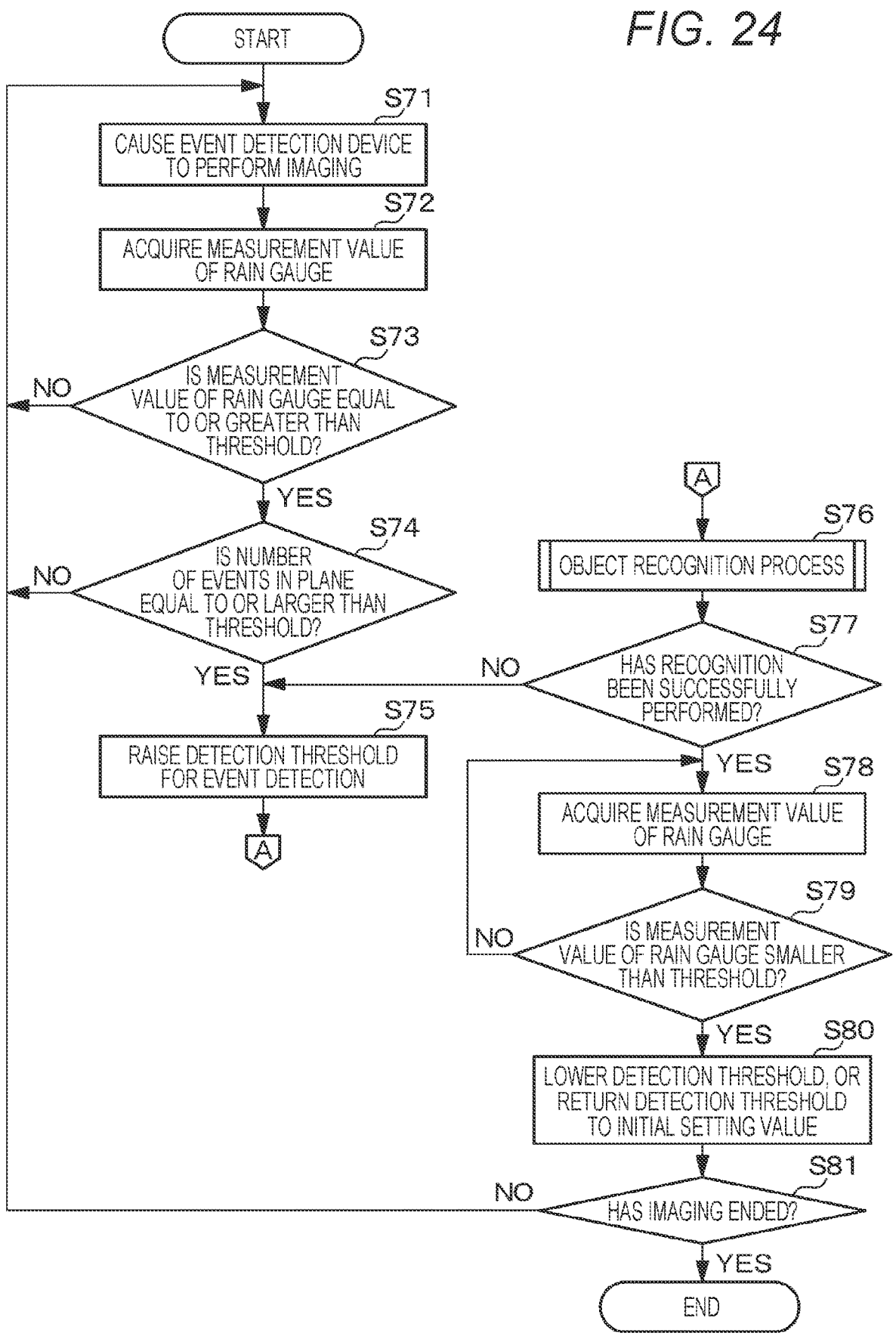
FIG. 24 is a flowchart showing an example of an event detection process according to Example 5.

Example 5 is an example in which the event detection threshold is controlled with the use of a measurement value of a rain gauge and noise information in the object recognition system 2B according to the second embodiment. An example flow in an event detection process according to Example 5 is shown in a flowchart in FIG. 24.

The controller 30 sets a predetermined initial setting value as the event detection threshold, and causes the event detection device 10 to perform imaging (step S71). While imaging is being performed by the event detection device 10, the controller 30 acquires a measurement value of the rain gauge provided as external information (step S72), and then determines whether or not the measurement value of the rain gauge is equal to or greater than a predetermined threshold (step S73). If the measurement value is neither equal to nor greater than the predetermined threshold (NO in S73), the process returns to step S71, and the imaging by the event detection device 10 continues.

If the measurement value of the rain gauge is equal to or greater than the predetermined threshold (YES in S73), the controller 30 then determines whether or not the number of events (the number of detected events) in the plane of the front windshield, for example, is equal to or larger than a predetermined threshold (step S74). If the number of events in the plane is neither equal to nor larger than the threshold (NO in S74), the controller 30 returns to step S71, and causes the event detection device 10 to continue the imaging.

If the number of events in the plane is equal to or larger than the threshold (YES in S74), the controller 30 performs control to raise the event detection threshold (step S75). That is, in a case where the measurement value of the rain gauge is equal to or greater than the threshold, and the number of events in the plane is equal to or greater than the threshold, it is determined that there is a large amount of rain, and there is a high possibility that generation of a large number of water droplets or the like will turn into noise for an object (a vehicle, a pedestrian, or the like) originally desired to be detected as an event by the event detection device 10.

Therefore, the controller 30 performs control to raise the event detection threshold (step S75), to change the detection sensitivity of the event detection to such sensitivity that generation of water droplets or the like is not detected as noise. Even after the event detection threshold is raised, the imaging by the event detection device 10 is continued, and, in the event detection device 10, an event detection process is performed with the detection sensitivity changed by the controller 30.

Next, the controller 30 performs an object recognition process (the object recognition process in FIG. 23) (step S76), and then determines whether or not the object recognition has been successfully completed (step S77). If the object recognition has failed, or if the region of the vehicle with respect to the angle of view is smaller than a certain proportion (NO in S77), the controller 30 returns to step S75, and performs control to raise the event detection threshold. That is, a loop process from step S75 to step S76 to step S77 to step S75 is performed, so that control is performed to raise the event detection threshold to a value within the range in which the object can be recognized. As the event detection threshold is raised, the influence of noise caused by water droplets or the like can be reduced.

If the object recognition has been successfully completed, or if the region of the vehicle with respect to the angle of view is equal to or larger than the certain proportion (YES in S77), the controller 30 acquires a measurement value of the rain gauge (step S78), and then determines whether or not the measurement value of the rain gauge is smaller than the predetermined threshold (step S79). If the measurement value of the rain gauge is still equal to or greater than the predetermined threshold (NO in S79), the controller 30 returns to step S78, and repeats the acquisition of a measurement value of the rain gauge. If the controller 30 determines that the measurement value of the rain gauge is smaller than the predetermined threshold, and the weather has recovered (YES in S79), the controller 30 then performs control to lower the event detection threshold or return the event detection threshold to the initial setting value (step S80).

After performing the control to lower the event detection threshold or return the event detection threshold to the initial setting value, the controller 30 determines whether or not the imaging by the event detection device 10 has ended (step S81). If the imaging has not ended yet (NO in S81), the controller 30 returns to step S71, and repeats the series of processes described above. If the imaging by the event detection device 10 has ended (YES in S81), the controller 30 ends the series of processes for event detection.

Example 6

Figure 25:
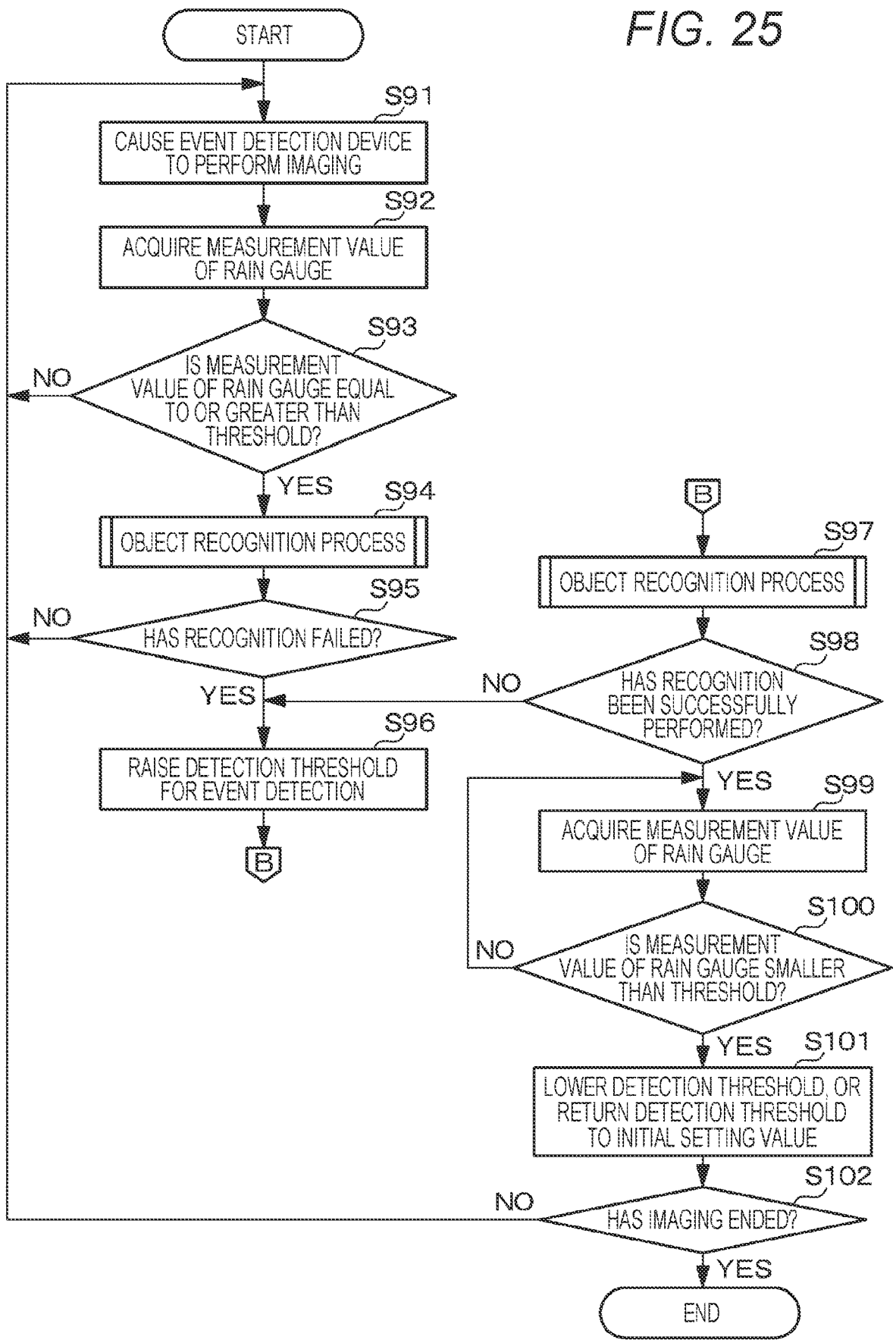
FIG. 25 is a flowchart showing an example of an event detection process according to Example 6.

Example 6 is an example in which an object recognition process is performed twice before and after the control of the event detection threshold in the object recognition system 2B according to the second embodiment. An example flow in an event detection process according to Example 6 is shown in a flowchart in FIG. 25.

The controller 30 sets a predetermined initial setting value as the event detection threshold, and causes the event detection device 10 to perform imaging (step S91). While imaging is being performed by the event detection device 10, the controller 30 acquires a measurement value of the rain gauge provided as external information (step S92), and then determines whether or not the measurement value of the rain gauge is equal to or greater than a predetermined threshold (step S93). If the measurement value is neither equal to nor greater than the predetermined threshold (NO in S93), the process returns to step S91, and the imaging by the event detection device 10 continues.

If the measurement value of the rain gauge is equal to or greater than the predetermined threshold (YES in S 93), the controller 30 performs an object recognition process (the object recognition process in FIG. 23) (step S95). If the object recognition has been successfully completed, or if the region of the vehicle with respect to the angle of view is equal to or greater than a certain proportion (NO in S95), the controller 30 determines that object recognition is possible even in a situation where there is a large amount of rain. The controller 30 then returns to step S91, and repeats the processes described above.

If the object recognition fails (YES in S95), the controller 30 determines that it is difficult to perform the object recognition because of the large amount of rain, and performs control to raise the event detection threshold (step S96). Even after the event detection threshold is raised, the imaging by the event detection device 10 is continued, and, in the event detection device 10, an event detection process is performed with the detection sensitivity changed by the controller 30.

After raising the event detection threshold, the controller 30 again performs the object recognition process (the object recognition process in FIG. 23) (step S97), and then determines whether or not the object recognition has been successfully completed (step S98). If the object recognition has failed, or if the region of the vehicle with respect to the angle of view is smaller than the certain proportion (NO in S98), the controller 30 returns to step S96, and performs control to raise the event detection threshold. That is, a loop process from step S96 to step S97 to step S98 to step S96 is performed, so that control is performed to raise the event detection threshold to a value within the range in which the object can be recognized. As the event detection threshold is raised, the influence of noise caused by water droplets or the like can be reduced.

If the object recognition has been successfully completed (YES in S98), the controller 30 acquires a measurement value of the rain gauge (step S99), and then determines whether or not the measurement value of the rain gauge is smaller than the predetermined threshold (step S100). If the measurement value of the rain gauge is still equal to or greater than the predetermined threshold (NO in S100), the controller 30 returns to step S99, and repeats the acquisition of a measurement value of the rain gauge. If the controller 30 determines that the measurement value of the rain gauge is smaller than the predetermined threshold, and the weather has recovered (YES in S100), the controller 30 then performs control to lower the event detection threshold or return the event detection threshold to the initial setting value (step S101).

After performing the control to lower the event detection threshold or return the event detection threshold to the initial setting value, the controller 30 determines whether or not the imaging by the event detection device 10 has ended (step S102). If the imaging has not ended yet (NO in S102), the controller 30 returns to step S91, and repeats the series of processes described above. If the imaging by the event detection device 10 has ended (YES in S102), the controller 30 ends the series of processes for event detection.

Example 7

Figure 26A:
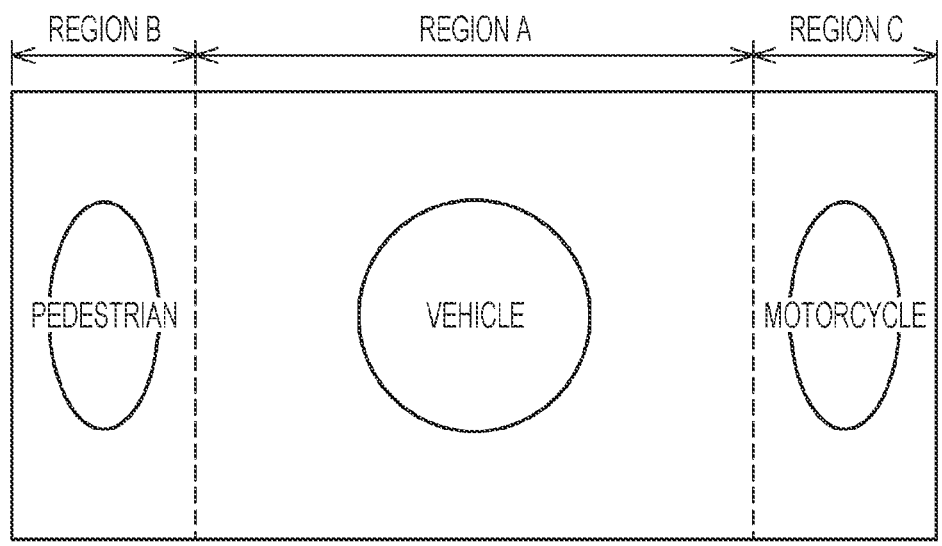
FIG. 26A is a diagram showing a state in which there is a plurality of objects desired to be detected as events.
Figure 26B:
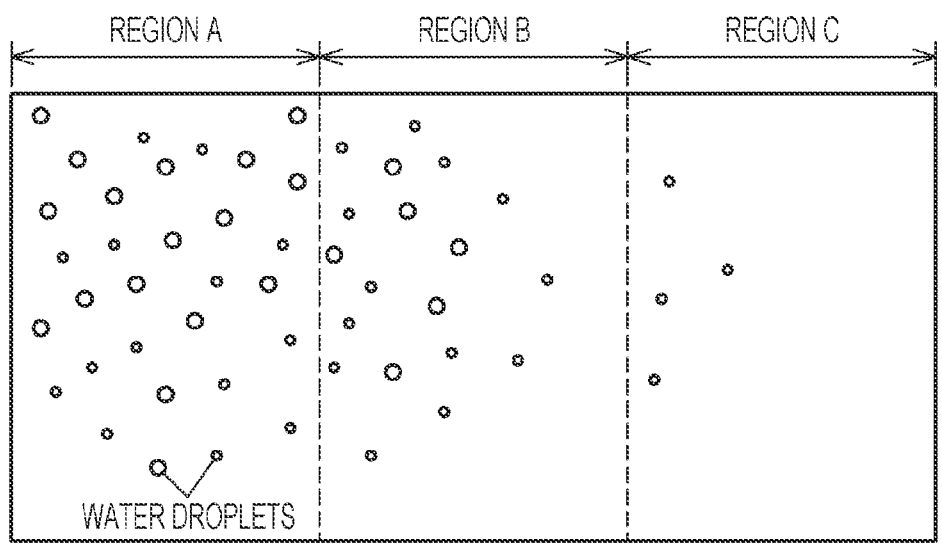
FIG. 26B is a diagram showing a state in which many water droplets adhere or do not adhere at all.

While a vehicle is traveling, there is a plurality of objects to be detected as events by the event detection device 10 in some cases. While a vehicle is traveling in rainy weather, there might be adhesion of many water droplets or adhesion of no water droplets, depending on regions on the front windshield. FIG. 26A shows a situation where there is a plurality of objects to be detected as events. FIG. 26B shows a situation where there is adhesion of many water droplets or adhesion of no water droplets.

FIG. 26A illustrates an example case where the region in which an event is to be detected is divided into three regions: a region A including a vehicle traveling forward, a region B including a pedestrian walking on the left side in the traveling direction, and a region C including a motorcycle traveling on the left side in the traveling direction. FIG. 26B illustrates an example case where the subject region is divided into three regions: a region A in which many water droplets adhere to the front windshield, a region B in which some water droplets adhere to the front windshield, and a region C in which very few water droplets adhere to the front windshield or no water droplets adhere to the front windshield.

Figure 27:
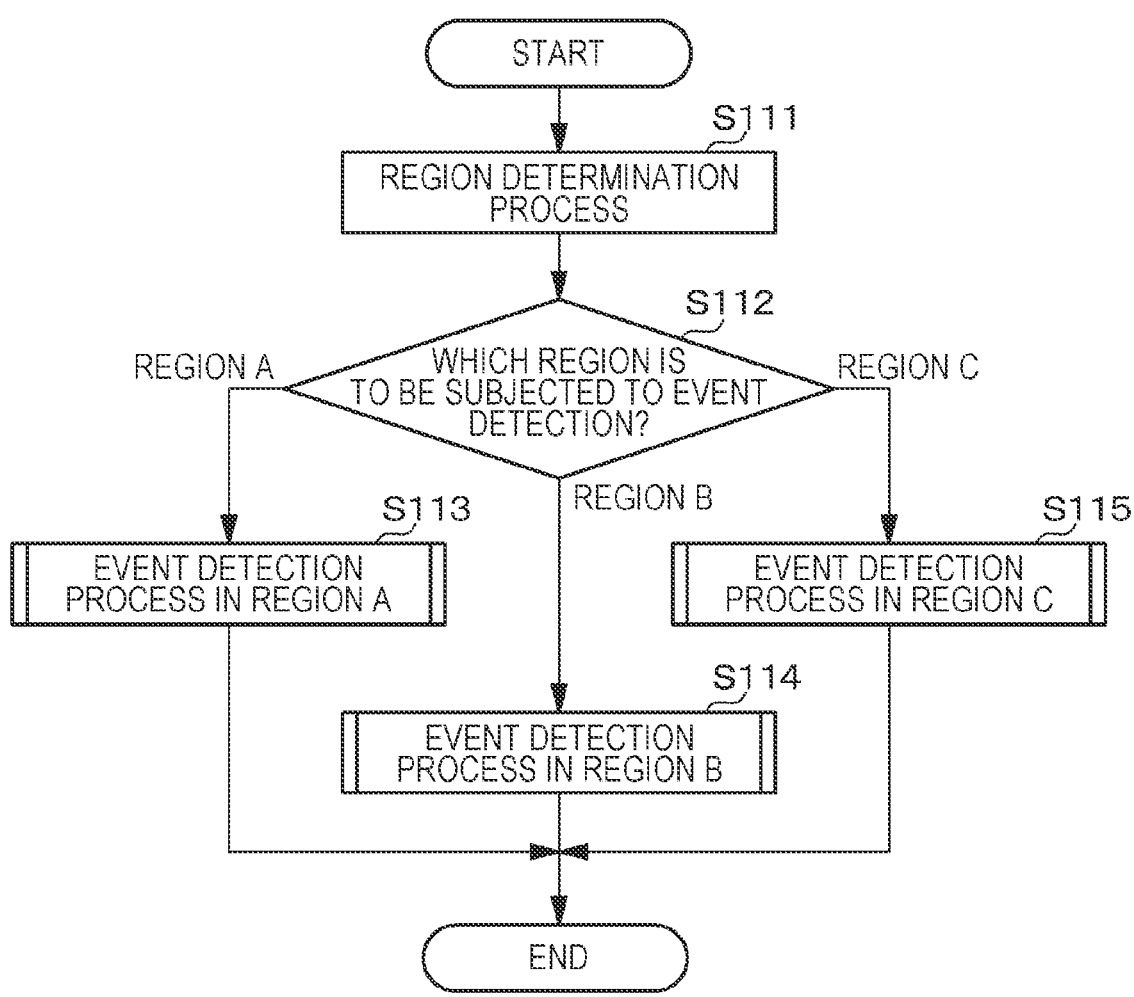
FIG. 27 is a flowchart showing an example of an event detection process according to Example 7.

Example 7 is an example in which the event detection threshold is controlled region by region in a situation illustrated in FIG. 26A or 26B. An example flow in an event detection process according to Example 7 is shown in a flowchart in FIG. 27.

For example, in the object recognition system 2B according to the second embodiment shown in FIG. 21, the controller 30 first performs a process of determining regions (step S111). In the region determination process in step S111, the region A including a vehicle, the region B including a pedestrian, and the region C including a motorcycle in FIG. 26A can be determined by a known pattern recognition technique, such as a technique for performing image recognition by comparing the feature points of an image provided as teacher data with the feature points of a captured image of the object, for example. Meanwhile, the region A to which a large number of water droplets adhere, the region B to which a small number of water droplets adhere, and the region C to which very few water droplets adhere as shown in FIG. 26B can be determined on the basis of the number of events that are water droplets detected as events by the event detection device 10, for example.

Next, the controller 30 determines the region to be subjected to event detection, on the basis of the result of the region determination process performed in step S111 (step S112). The controller 30 then performs an event detection process suitable for the region A in the case of the region A (step S113), performs an event detection process suitable for the region B in the case of the region B (step S114), and performs an event detection process suitable for the region C in the case of the region C (step S115).

For example, the event detection processes according to Examples 4 to 6 described above can be applied to the event detection processes in steps S 113, S 114, and S 115. The control of the event detection thresholds in the region A to which a large number of water droplets adhere, the region B to which a small number of water droplets adhere, and the region C to which very few water droplets adhere as shown in FIG. 26B is now described, for example. In this case, the initial setting value of the event detection threshold is set at the values corresponding to the regions A, B, and C, for example, so that event detection threshold control suitable for the respective regions can be performed. As a result, for example, it is possible to increase the accuracy of recognition of an object such as a vehicle, a pedestrian, or a motorcycle included in the region A to which many water droplets adhere. Note that, as another example of an event detection process, the region determination process may be performed after determination as to whether or not the weather is bad, in the event detection processes according to Examples 4 to 6 described above.

Modifications

Although the technology according to the present disclosure has been described so far on the basis of the preferred embodiments, the technology according to the present disclosure is not limited to these embodiments. The configurations and structures of the imaging systems and the object recognition systems described in the above embodiments are examples, and can be modified. For example, in the above embodiments, the pixel signal generation unit 62 is provided for each light receiving unit 61 to form the pixels 11.

However, it is also possible to adopt a configuration in which a plurality of light receiving units 31 is formed into a block as a unit, one pixel signal generation unit 62 is provided for each pixel block, and the pixel signal generation unit 62 is shared among the plurality of light receiving units 61 in each pixel block.

Example Applications of the Technology According to the Present Disclosure

The technology according to the present disclosure may be applied to various products. In the description below, more specific example applications are described. For example, the technology according to the present disclosure may be embodied as an imaging system or an object recognition system that is mounted on any type of mobile unit, such as an automobile, an electrical vehicle, a hybrid electrical vehicle, a motorcycle, a bicycle, a personal mobility device, an airplane, a drone, a vessel, a robot, a construction machine, or an agricultural machine (a tractor).

Mobile Unit

Figure 28:
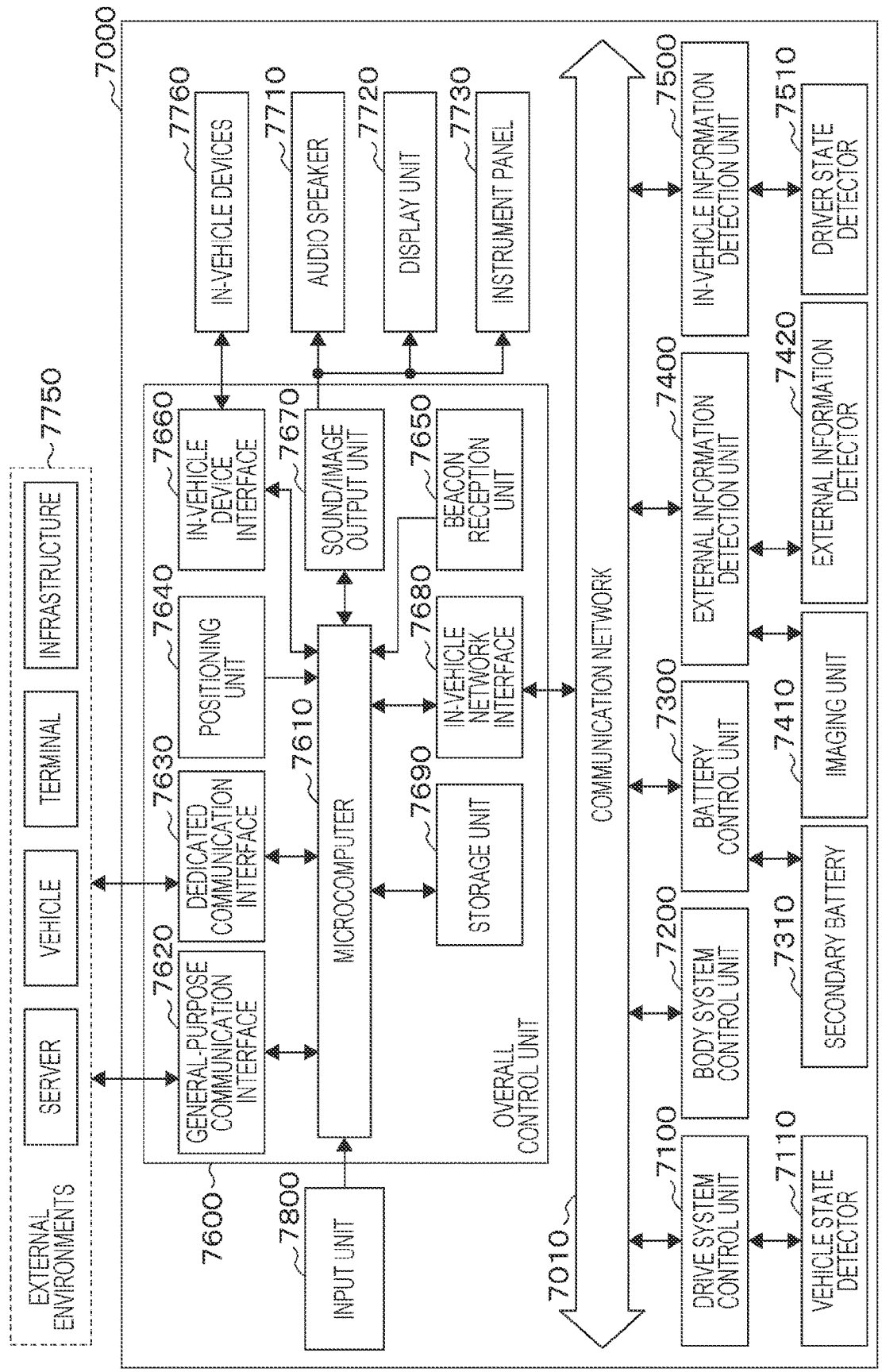
FIG. 28 is a block diagram schematically showing an example configuration of a vehicle control system that is an example of a mobile unit control system to which the technology according to the present disclosure can be applied.

FIG. 28 is a block diagram schematically showing an example configuration of a vehicle control system 7000 that is an example of a mobile unit control system to which the technology according to the present disclosure can be applied. The vehicle control system 7000 includes a plurality of electronic control units connected via a communication network 7010. In the example shown in FIG. 28, the vehicle control system 7000 includes a drive system control unit 7100, a body system control unit 7200, a battery control unit 7300, an external information detection unit 7400, an in-vehicle information detection unit 7500, and an overall control unit 7600. The communication network 7010 connecting the plurality of control units may be an in-vehicle communication network compliant with an appropriate standard, such as a controller area network (CAN), a local interconnect network (LIN), a local area network (LAN), or FlexRay (registered trademark), for example.

Each of the control units includes: a microcomputer that performs arithmetic processing according to various programs; a storage unit that stores the programs to be executed by the microcomputer, the parameters to be used for various calculations, or the like; and a drive circuit that drives the current device to be subjected to various kinds of control. Each of the control units includes a communication interface for performing communication through wired communication or wireless communication with an external device or a sensor or the like, as well as a network interface for communicating with another control unit via the communication network 7010. In FIG. 28, a microcomputer 7610, a general-purpose communication interface 7620, a dedicated communication interface 7630, a positioning unit 7640, a beacon reception unit 7650, an in-vehicle device interface 7660, a sound/image output unit 7670, an in-vehicle network interface 7680, and a storage unit 7690 are shown as the functional components of the overall control unit 7600. Likewise, the other control units each include a microcomputer, a communication interface, a storage unit, and the like.

The drive system control unit 7100 controls operations of the devices related to the drive system of the vehicle according to various programs. For example, the drive system control unit 7100 functions as control devices such as a driving force generation device for generating a driving force of the vehicle such as an internal combustion engine or a driving motor, a driving force transmission mechanism for transmitting the driving force to the wheels, a steering mechanism for adjusting the steering angle of the vehicle, and a braking device for generating a braking force of the vehicle. The drive system control unit 7100 may also have functions as a control device such as an antilock brake system (ABS) or an electronic stability control (ESC).

A vehicle state detector 7110 is connected to the drive system control unit 7100. For example, the vehicle state detector 7110 includes at least one of the following components: a gyroscope sensor that detects an angular velocity of axial rotation motion of the vehicle body; an acceleration sensor that detects an acceleration of the vehicle; and a sensor for detecting an operation amount of the gas pedal, an operation amount of the brake pedal, a steering angle of the steering wheel, an engine rotation speed, a wheel rotation speed, or the like. The drive system control unit 7100 performs arithmetic processing using a signal input from the vehicle state detector 7110, and controls the internal combustion engine, the driving motor, the electrical power steering device, the brake device, or the like.

The body system control unit 7200 controls operations of the various devices mounted on the vehicle body according to various programs. For example, the body system control unit 7200 functions as a keyless entry system, a smart key system, a power window device, or a control device for various lamps such as a headlight, a backup light, a brake light, a turn signal light, or a fog light. In this case, the body system control unit 7200 can receive radio waves transmitted from a portable device that substitutes for a key, or signals from various switches. The body system control unit 7200 receives inputs of these radio waves or signals, and controls the door lock device, the power window device, the lights, and the like of the vehicle.

The battery control unit 7300 controls a secondary battery 7310 that is a power supply source for the driving motor, according to various programs. For example, the battery control unit 7300 receives information, such as a battery temperature, a battery output voltage, or a remaining capacity of the battery, from a battery device including the secondary battery 7310. The battery control unit 7300 performs arithmetic processing using these signals, to control temperature adjustment of the secondary battery 7310 or to control a cooling device or the like provided in the battery device.

The external information detection unit 7400 detects information outside the vehicle equipped with the vehicle control system 7000. For example, an imaging unit 7410 and/or an external information detector 7420 is connected to the external information detection unit 7400. The imaging unit 7410 includes at least one of the following cameras: a time-of-flight (ToF) camera, a stereo camera, a monocular camera, an infrared camera, or other cameras. The external information detector 7420 includes an environment sensor for detecting the current weather or meteorological phenomenon, and/or an ambient information detection sensor for detecting another vehicle, an obstacle, a pedestrian, or the like around the vehicle equipped with the vehicle control system 7000, for example.

The environment sensor may be formed with at least one of the following sensors: a raindrop sensor that detects rain, a fog sensor that detects a fog, a solar radiation sensor that detects a degree of solar radiation, or a snow sensor that detects a snowfall, for example. The ambient information detection sensor may be at least one of the following devices: an ultrasonic sensor, a radar device, or a light detection and ranging, laser imaging detection and ranging (LIDAR) device. The imaging unit 7410 and the external information detector 7420 may be provided as an independent device and an independent sensor, respectively, or may be provided as a device in which a plurality of sensors or devices is integrated.

Figure 29:
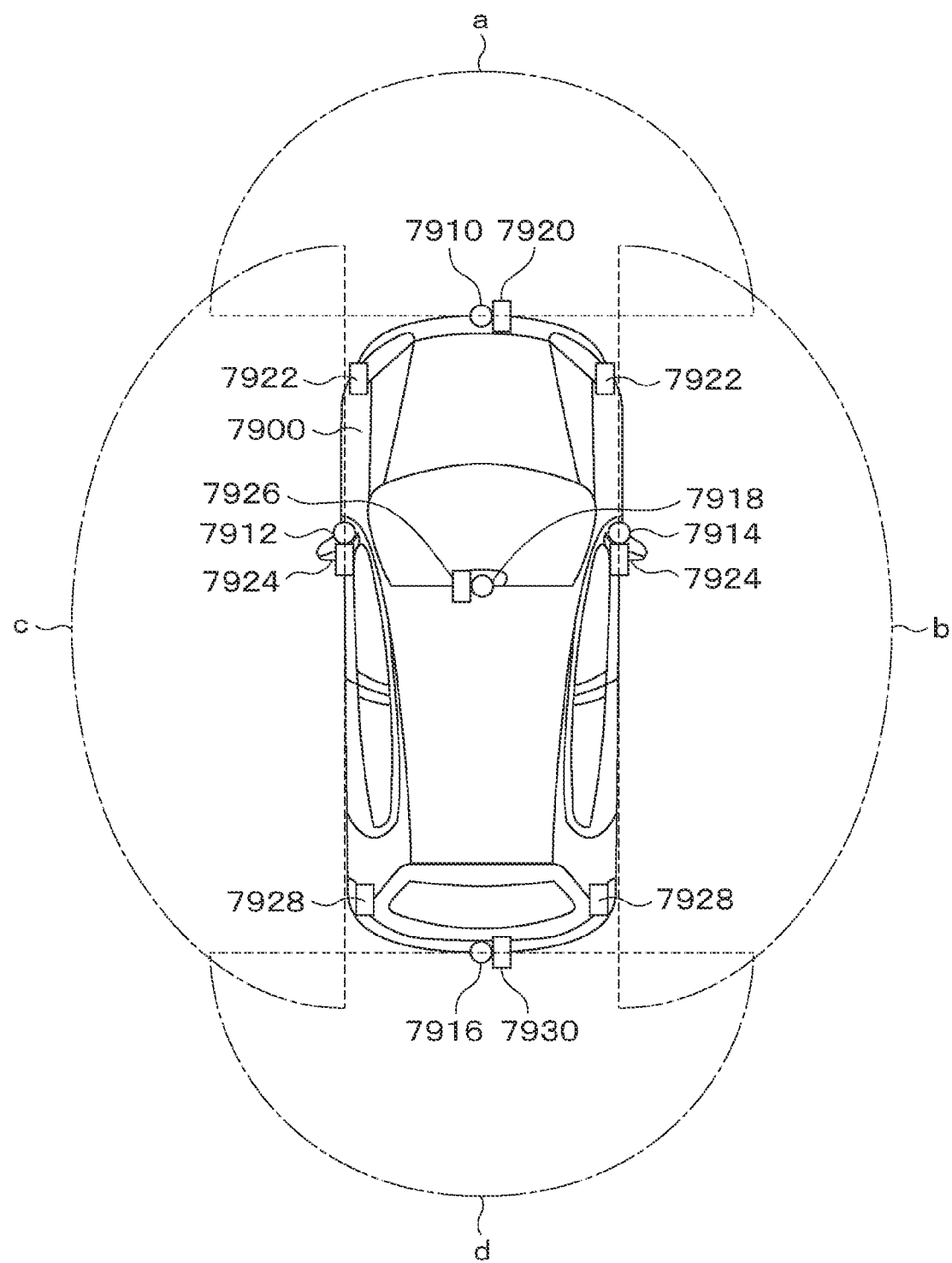
FIG. 29 is a diagram showing an example of installation positions of imaging units in the vehicle control system.

Here, FIG. 29 shows an example of installation positions of imaging units 7410 and external information detectors 7420. Imaging units 7910, 7912, 7914, 7916, and 7918 are provided at at least one of the following positions: the front end edge of a vehicle 7900, a side mirror, the rear bumper, a rear door, or an upper portion of the front windshield inside the vehicle, for example. The imaging unit 7910 provided on the front end edge and the imaging unit 7918 provided on the upper portion of the front windshield inside the vehicle mainly capture images ahead of the vehicle 7900. The imaging units 7912 and 7914 provided on the side mirrors mainly capture images on the sides of the vehicle 7900. The imaging unit 7916 provided on the rear bumper or a rear door mainly captures images behind the vehicle 7900. The imaging unit 7918 provided on the upper portion of the front windshield inside the vehicle is mainly used for detection of a vehicle running in front of the vehicle, a pedestrian, an obstacle, a traffic signal, a traffic sign, a lane, or the like.

Note that FIG. 29 shows an example of the imaging range of each of the imaging units 7910, 7912, 7914, and 7916. An imaging range a indicates the imaging range of the imaging unit 7910 provided on the front end edge, imaging ranges b and c indicate the imaging ranges of the imaging units 7912 and 7914 provided on the respective side mirrors, and an imaging range d indicates the imaging range of the imaging unit 7916 provided on the rear bumper or a rear door. For example, image data captured by the imaging units 7910, 7912, 7914, and 7916 are superimposed on one another, so that an overhead image of the vehicle 7900 viewed from above is obtained.

External information detectors 7920, 7922, 7924, 7926, 7928, and 7930 provided on the front, the rear, the sides, and the corners of the vehicle 7900, and an upper portion of the front windshield inside the vehicle may be ultrasonic sensors or radar devices, for example. The external information detectors 7920, 7926, and 7930 provided on the front end edge of the vehicle 7900, the rear bumper, and the rear doors, and the upper portion of the front windshield inside the vehicle may be LIDAR devices, for example. These external information detectors 7920 through 7930 are mainly used for detecting a vehicle running in front of the vehicle 7900, a pedestrian, an obstacle, or the like.

Referring back to FIG. 28, the explanation is continued. The external information detection unit 7400 causes the imaging unit 7410 to capture an image of the outside of the vehicle, and receives the captured image data. The external information detection unit 7400 also receives detection information from the external information detector 7420 connected thereto. In a case where the external information detector 7420 is an ultrasonic sensor, a radar device, or a LIDAR device, the external information detection unit 7400 causes the external information detector 7420 to transmit ultrasonic waves, or electromagnetic waves, or the like, and receive information about received reflected waves. On the basis of the received information, the external information detection unit 7400 may perform an object detection process for detecting a person, a vehicle, an obstacle, a sign, characters on the road surface, or the like, or perform a distance detection process. On the basis of the received information, the external information detection unit 7400 may also perform an environment recognition process for recognizing a rainfall, a fog, a road surface condition, or the like. On the basis of the received information, the external information detection unit 7400 may also calculate the distance to an object outside the vehicle.

Further, on the basis of the received image data, the external information detection unit 7400 may perform an image recognition process for recognizing a person, a vehicle, an obstacle, a sign, characters on the road surface, or the like, or a distance detection process. The external information detection unit 7400 may also perform processing such as distortion correction or positioning on the received image data, and combine the image data captured by different imaging units 7410, to generate an overhead image or a panoramic image. The external information detection unit 7400 may also perform a viewpoint conversion process, using image data captured by different imaging units 7410.

The in-vehicle information detection unit 7500 detects information about the inside of the vehicle. For example, a driver state detector 7510 that detects the state of the driver is connected to the in-vehicle information detection unit 7500. The driver state detector 7510 may include a camera that captures images of the driver, a biometric sensor that detects biological information about the driver, a microphone that collects sounds inside the vehicle, or the like. The biometric sensor is provided on the seating surface or the steering wheel or the like, for example, and detects biological information about a passenger sitting on a seat or the driver holding the steering wheel. On the basis of the detection information input from the driver state detector 7510, the in-vehicle information detection unit 7500 may calculate the degree of fatigue or the degree of concentration of the driver, or determine whether the driver is dozing off. The in-vehicle information detection unit 7500 may also perform a noise cancel process or the like on the collected sound signals.

The overall control unit 7600 controls the entire operation in the vehicle control system 7000 according to various programs. An input unit 7800 is connected to the overall control unit 7600. The input unit 7800 is formed with a device on which a passenger can perform an input operation, such as a touch panel, buttons, a microphone, a switch, or a lever, for example. The overall control unit 7600 may receive data obtained by performing speech recognition on sound input through a microphone. For example, the input unit 7800 may be a remote control device using infrared rays or some other radio waves, or an external connection device such as a portable telephone or a personal digital assistant (PDA) compatible with operations on the vehicle control system 7000. The input unit 7800 may be a camera, for example, and in that case, a passenger can input information by gesture. Alternatively, data obtained by detecting movement of a wearable device worn by a passenger may be input. Further, the input unit 7800 may include an input control circuit or the like that generates an input signal on the basis of information input by a passenger or the like using the above input unit 7800, for example, and outputs the input signal to the overall control unit 7600. By operating this input unit 7800, a passenger or the like inputs various data to the vehicle control system 7000 or issues a processing operation instruction to the vehicle control system 7000.

The storage unit 7690 may include a read only memory (ROM) that stores various programs to be executed by the microcomputer, and a random access memory (RAM) that stores various parameters, calculation results, sensor values, or the like. Also, the storage unit 7690 may be formed with a magnetic storage device such as a hard disc drive (HDD), a semiconductor storage device, an optical storage device, a magneto-optical storage device, or the like.

The general-purpose communication interface 7620 is a general communication interface that mediates communication with various devices existing in external environments 7750. The general-purpose communication interface 7620 may implement a cellular communication protocol such as Global System of Mobile communications (GSM) (registered trademark), WiMAX, Long Term Evolution (LTE), or LTE-Advanced (LTE-A), or some other wireless communication protocol such as wireless LAN (also called Wi-Fi (registered trademark)) or Bluetooth (registered trademark). The general-purpose communication interface 7620 may be connected to a device (an application server or a control server, for example) existing in an external network (the Internet, a cloud network, or a company-specific network, for example) via a base station or an access point, for example. Alternatively, the general-purpose communication interface 7620 may be connected to a terminal (a terminal of a driver, a pedestrian, or a shop, or a machine type communication (MTC) terminal, for example) existing in the vicinity of the vehicle, using the peer-to-peer (P2P) technology, for example.

The dedicated communication interface 7630 is a communication interface that supports a communication protocol formulated for use in a vehicle. The dedicated communication interface 7630 may implement a standard protocol such as Wireless Access in Vehicle Environment (WAVE), which is a combination of IEEE802.11p as the lower layer and IEEE1609 as the upper layer, Dedicated Short Range Communications (DSRC), or a cellular communication protocol, for example. Typically, the dedicated communication interface 7630 conducts V2X communication, which is a concept including at least one of the following kinds of communication: vehicle-to-vehicle communication, vehicle-to-infrastructure communication, vehicle-to-home communication, and vehicle-to-pedestrian communication.

The positioning unit 7640 receives a GNSS signal (a GPS signal from a global positioning system (GPS) satellite, for example) from a global navigation satellite system (GNSS) satellite, performs positioning, and generates location information including the latitude, the longitude, and the altitude of the vehicle, for example. Note that the positioning unit 7640 may identify the current location by exchanging signals with a wireless access point, or may acquire the location information from a terminal having a positioning function, such as a portable telephone, a PHS, or a smartphone.

The beacon reception unit 7650 receives radio waves or electromagnetic waves transmitted from a wireless station or the like installed on a road, for example, and acquires information about the current location, traffic congestion, closing of a road, a required time, or the like. Note that the functions of the beacon reception unit 7650 may be included in the dedicated communication interface 7630 described above.

The in-vehicle device interface 7660 is a communication interface that mediates connection between the microcomputer 7610 and various in-vehicle devices 7760 existing in the vehicle. The in-vehicle device interface 7660 may establish a wireless connection, using a wireless communication protocol such as wireless LAN, Bluetooth (registered trademark), Near Field Communication (NFC), or wireless USB (WUSB). Further, the in-vehicle device interface 7660 may establish a wired connection to a universal serial bus (USB), a high-definition multimedia interface (HDMI), a mobile high-definition link (MHL), or the like via a connecting terminal (not shown) (and a cable, if necessary). The in-vehicle devices 7760 may include a mobile device or a wearable device owned by a passenger, and/or an information device installed in or attached to the vehicle, for example. The in-vehicle devices 7760 may also include a navigation device that searches for a route to a desired destination. The in-vehicle device interface 7660 exchanges control signals or data signals with these in-vehicle devices 7760.

The in-vehicle network interface 7680 is an interface that mediates communication between the microcomputer 7610 and the communication network 7010. The in-vehicle network interface 7680 transmits and receives signals and the like, according to a predetermined protocol supported by the communication network 7010.

The microcomputer 7610 of the overall control unit 7600 controls the vehicle control system 7000 according to various programs, on the basis of information acquired via at least one of the following components: the general-purpose communication interface 7620, the dedicated communication interface 7630, the positioning unit 7640, the beacon reception unit 7650, the in-vehicle device interface 7660, and the in-vehicle network interface 7680. For example, on the basis of acquired external and internal information, the microcomputer 7610 may calculate the control target value of the driving force generation device, the steering mechanism, or the braking device, and output a control command to the drive system control unit 7100. For example, the microcomputer 7610 may perform cooperative control to achieve the functions of an advanced driver assistance system (ADAS), including vehicle collision avoidance or impact mitigation, follow-up running based on the distance between vehicles, vehicle speed maintenance running, vehicle collision warning, vehicle lane deviation warning, or the like. The microcomputer 7610 may also perform cooperative control to conduct automatic driving or the like for autonomously running not depending on the operation of the driver, by controlling the driving force generation device, the steering mechanism, the braking device, or the like on the basis of acquired information about the surroundings of the vehicle.

The microcomputer 7610 may generate information about the three-dimensional distance between the vehicle and an object such as a nearby architectural structure or a person, and create local map information including surroundings information about the current location of the vehicle, on the basis of information acquired via at least one of the following components: the general-purpose communication interface 7620, the dedicated communication interface 7630, the positioning unit 7640, the beacon reception unit 7650, the in-vehicle device interface 7660, and the in-vehicle network interface 7680. The microcomputer 7610 may also generate a warning signal by predicting danger such as a collision of the vehicle, an approach of a pedestrian or the like, or entry to a closed road, on the basis of acquired information. The warning signal may be a signal for generating an alarm sound or for turning on a warning lamp, for example.

The sound/image output unit 7670 transmits an audio output signal and/or an image output signal to an output device that is capable of visually or audibly notifying the passenger(s) of the vehicle or the outside of the vehicle of information. In the example shown in FIG. 28, an audio speaker 7710, a display unit 7720, and an instrument panel 7730 are shown as output devices. The display unit 7720 may include an on-board display and/or a head-up display, for example. The display unit 7720 may have an augmented reality (AR) display function. An output device may be some device other than the above devices, such as a wearable device like a headphone set or an eyeglass-type display to be worn by a passenger, a projector, or a lamp. In a case where the output device is a display device, the display device visually displays results obtained through various processes performed by the microcomputer 7610, or information received from other control units, in various forms such as text, an image, a table, or a graph. Further, in a case where the output device is a sound output device, the sound output device converts an audio signal formed with reproduced sound data, acoustic data, or the like into an analog signal, and audibly outputs the analog signal.

Note that, in the example shown in FIG. 28, at least two control units connected via the communication network 7010 may be integrated into one control unit. Alternatively, each control unit may be formed with a plurality of control units. Further, the vehicle control system 7000 may include another control unit that is not shown in the drawing. Also, in the above description, some or all of the functions of one of the control units may be provided by some other control unit. That is, as long as information is transmitted and received via the communication network 7010, predetermined arithmetic processing may be performed by any control unit. Likewise, a sensor or a device connected to any control unit may be connected to another control unit, and a plurality of control units may transmit and receive detection information to and from one another via the communication network 7010.

An example of a vehicle control system to which the technology according to the present disclosure can be applied has been described above. The technology according to the present disclosure can be applied to the imaging units 7910, 7912, 7914, 7916, and 7918, and the like among the components described above, for example. Specifically, an imaging system of the present disclosure can be applied to these imaging units. An imaging system of the present disclosure can accurately recognize an object in an event without being affected by bad weather such as rain or snow, and thus, contribute to realization of safe vehicle traveling.

Configurations Embodying the Present Disclosure

Note that the present disclosure may also be embodied in the configurations described below.

<A. Imaging System>

[A-1] An imaging system including:
an event detection device that detects an event; and
a controller that controls the event detection device,
in which the controller controls detection sensitivity of event detection being performed by the event detection device, on the basis of external information.

[A-2] The imaging system according to [A-1], in which
the event detection device includes an event detection unit that detects, as an event, that a change in the luminance of a pixel that photoelectrically converts incident light exceeds a detection threshold.

[A-3] The imaging system according to [A-2], which is mounted on a mobile unit and is used.

[A-4] The imaging system according to [A-3], in which the controller controls the detection threshold for the event detection unit, on the basis of the external information.

[A-5] The imaging system according to [A-4], in which, when the external information is information indicating bad weather, the controller performs control to raise the detection threshold for the event detection unit.

[A-6] The imaging system according to [A-5], in which, when receiving the external information indicating that weather has recovered after raising the detection threshold for the event detection unit, the controller performs control to lower the detection threshold for the event detection unit or return the detection threshold for the event detection unit to an initial setting value.

[A-7] The imaging system according to any one of [A-4] to [A-6], in which
the event detection unit includes a current-voltage conversion unit that converts a photocurrent of a pixel into a voltage corresponding to the photocurrent,
the current-voltage conversion unit is capable of switching between a circuit configuration in which transistors are cascade-connected and a circuit configuration in which the transistors are not cascade-connected, and
the controller controls the detection threshold for the event detection unit, by switching the circuit configuration of the current-voltage conversion unit, on the basis of the external information.

[A-8] The imaging system according to any one of [A-4] to [A-6], in which
the event detection unit includes a subtraction unit that includes a first capacitive element and a second capacitive element, and calculates a difference signal of a voltage at different timings, the voltage corresponding to a photocurrent of a pixel, and
the controller controls the detection threshold for the event detection unit, by changing a capacitance ratio between the first capacitive element and the second capacitive element of the subtraction unit, on the basis of the external information.

[A-9] The imaging system according to [A-8], in which
the event detection unit includes a quantization unit that quantizes a difference signal from the subtraction unit into a digital signal by comparing the difference signal with a threshold voltage, and
the controller controls the detection threshold for the event detection unit, by adjusting the threshold voltage of the quantization unit on the basis of the external information.

[A-10] The imaging system according to any one of [A-1] to [A-9], in which
the controller controls the detection sensitivity of the event detection, on the basis of the external information and the number of events detected by the event detection device.

<B. Object Recognition System>

[B-1] An object recognition system including:
an event detection device that detects an event;
a controller that controls detection sensitivity of event detection being performed by the event detection device, on the basis of external information; and
a recognition processing unit that performs object recognition within an angle of view of the event detection device, on the basis of an event signal output from the event detection device.

[B-2] The imaging system according to [B-1], in which
the controller performs control to raise a detection threshold for an event detection unit to a value within a range in which an object within the angle of view of the event detection device can be recognized.

[B-3] The object recognition system according to [B-1], in which
the recognition processing unit recognizes an object when an area that can be detected as the object within the angle of view is equal to or larger than a predetermined threshold.

[B-4] The object recognition system according to [B-1], further including
a synchronous imaging device that performs imaging at a fixed frame rate.

[B-5] The object recognition system according to [B-4], in which,
when the object cannot be detected by the event detection device, the recognition processing unit detects the object using information from the imaging device, and recognizes the object when an area that can be detected as the object within the angle of view is equal to or larger than a predetermined threshold.

[B-6] The object recognition system according to [B-4] or [B-5], in which
the recognition processing unit determines that recognition has been successfully performed when a region of the object with respect to the angle of view is equal to or larger than a certain proportion, and determines that recognition has failed when the region is smaller than the certain proportion.

[B-7] The object recognition system according to any one of [B-4] to [B-6], in which,
when the external information is information indicating bad weather, and the number of events detected by the event detection device is equal to or greater than a predetermined threshold, the controller performs control to raise the detection threshold for the event detection unit.

[B-8] The object recognition system according to [B-7], in which,
after the controller raises the detection threshold for the event detection unit, when a result of recognition performed by the recognition processing unit indicates a success, and the controller receives the external information indicating that weather has recovered, the controller performs control to lower the detection threshold for the event detection unit or return the detection threshold for the event detection unit to an initial setting value.

[B-9] The object recognition system according to any one of [B-4] to [B-6], in which,
when the external information is information indicating bad weather, and a result of recognition performed by the recognition processing unit indicates a failure, the controller performs control to raise the detection threshold for the event detection unit.

[B-10] The object recognition system according to [B-9], in which,
after the controller raises the detection threshold for the event detection unit, when a result of recognition performed by the recognition processing unit indicates a success, and the controller receives the external information indicating that weather has recovered, the controller performs control to lower the detection threshold for the event detection unit or return the detection threshold for the event detection unit to an initial setting value.

REFERENCE SIGNS LIST

1A Imaging system according to the first embodiment
1B Imaging system according to the second embodiment
2A Object recognition system according to the first embodiment
2B Object recognition system according to the second embodiment
10 Event detection device
11 Pixel
12 Pixel array unit
13 Drive unit
14 Arbiter unit (arbitration unit)
15 Column processing unit
16 Signal processing unit
Imaging device
21 Pixel
22 Pixel array unit
23 Row selection unit
24 Constant-current supply unit
25 Analog-digital conversion unit
26 Horizontal transfer scanning unit
27 Signal processing unit
28 Timing control unit
30 Controller
40 Data processing unit
50 Image recording unit
60 Recognition processing unit
61 Light receiving unit
62 Pixel signal generation unit
63 Event detection unit

The invention claimed is:
1. An imaging system, comprising:
an event detection device configured to detect an event, wherein
the event detection device includes an event detection unit configured to detect, as the event, a change in luminance of a pixel that photoelectrically converts incident light exceeding a detection threshold,
the event detection unit includes a current-voltage conversion unit configured to:
convert a photocurrent of the pixel into a voltage corresponding to the photocurrent; and
switch configuration between a circuit configuration in which transistors are cascade-connected and a circuit configuration in which the transistors are not cascade-connected, and
the imaging system is on a mobile unit; and
a controller configured to:
control, based on external information, detection sensitivity of the event detection performed by the event detection device; and
control, based on the external information, the detection threshold for the event detection unit, by the switch of the configuration of the current-voltage conversion unit, on a basis of external information.

2. The imaging system according to claim 1, wherein, in a case where the external information that indicates bad weather, the controller is further configured to perform control to raise the detection threshold for the event detection unit.

3. The imaging system according to claim 2, wherein, in a case where the external information indicates that weather has recovered after the raise of the detection threshold for the event detection unit, the controller is further configured to perform control to lower the detection threshold for the event detection unit or return the detection threshold for the event detection unit to an initial setting value.

4. The imaging system according to claim 1, wherein the event detection unit further includes a subtraction unit that includes a first capacitive element and a second capacitive element,
the subtraction unit is configured to calculate a difference signal of a voltage corresponding to the photocurrent of the pixel at different timings, and the controller is further configured to control, based on the external information, the detection threshold for the event detection unit, by change of a capacitance ratio between the first capacitive element and the second capacitive element of the subtraction unit.

5. The imaging system according to claim 4, wherein the event detection unit further includes a quantization unit configured to quantize the difference signal into a digital signal based on comparison of the difference signal with a threshold voltage, and
the controller is further configured to control, based on the external information, the detection threshold for the event detection unit by adjustment of the threshold voltage of the quantization unit.

6. The imaging system according to claim 1, wherein the controller is further configured to control the detection sensitivity of the event detection based on the external information and a number of events detected by the event detection device.

7. A method, comprising:
detecting, as an event, a change in luminance of a pixel that photoelectrically converts incident light exceeding a detection threshold;
converting a photocurrent of the pixel into a voltage corresponding to the photocurrent;
switching configuration of a current-voltage conversion unit between a circuit configuration in which transistors are cascade-connected and a circuit configuration in which the transistors are not cascade-connected;
controlling, based on external information, detection sensitivity of the event detection; and
controlling, based on the external information, the detection threshold by the switching of the configuration of the current-voltage conversion unit.

8. An object recognition system, comprising:
an event detection device configured to:
  detect at least one event; and
  output an event signal based on each of the detected at least one event;
a controller configured to control, based on external information, detection sensitivity of the event detection performed by the event detection device;
a recognition processing unit configured to perform object recognition within an angle of view of the event detection device, based on the outputted event signal; and
a synchronous imaging device configured to perform imaging at a fixed frame rate, wherein
  in a case where the external information is information that indicates bad weather and a number of events in the detected at least one event is equal to or greater than a first threshold, the controller is further configured to raise a detection threshold for the event detection device, and
  after the detection threshold is raised for the event detection device, the controller is further configured to lower the detection threshold for the event detection device or return the detection threshold for the event detection device to an initial setting value, based on a result of the object recognition performed by the recognition processing unit indicates a success and the external information indicates that weather has recovered.

9. The object recognition system according to claim 8, wherein
the controller is further configured to perform control to raise the detection threshold for the event detection device to a value within a range in which an object within the angle of view of the event detection device can be recognized.

10. The object recognition system according to claim 8, wherein
the recognition processing unit is further configured to recognize an object when an area that can be detected as the object within the angle of view is equal to or larger than a second threshold.

11. The object recognition system according to claim 8, wherein
based on an object that is undetectable by the event detection device, the recognition processing unit is further configured to detect the object based on information from the synchronous imaging device, and
the recognition processing unit is further configured to recognize the object based on an area that can be detected as the object within the angle of view is equal to or larger than a second threshold.

12. The object recognition system according to claim 8, where the recognition processing unit is further configured to:
determine the object recognition as successful in a case where a region of an object with respect to the angle of view is equal to or larger than a certain proportion; and
determine the recognition as failed in a case where the region is smaller than the certain proportion.

13. The object recognition system according to claim 8, wherein,
in a case where the external information indicates bad weather, and the result of the object recognition performed by the recognition processing unit indicates a failure, the controller is further configured to raise the detection threshold for the event detection device.

* * * * *